(12) United States Patent
Joshi et al.

(10) Patent No.: US 7,398,311 B2
(45) Date of Patent: *Jul. 8, 2008

(54) SELECTIVE CACHE FLUSHING IN IDENTITY AND ACCESS MANAGEMENT SYSTEMS

(75) Inventors: Vrinda S. Joshi, Mountain View, CA (US); Praveen R. Swadi, Santa Clara, CA (US); Robert L. Summers, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/542,311

(22) Filed: Oct. 3, 2006

(65) Prior Publication Data

US 2007/0027986 A1 Feb. 1, 2007

Related U.S. Application Data

(63) Continuation of application No. 09/792,911, filed on Feb. 26, 2001, now Pat. No. 7,124,203.

(60) Provisional application No. 60/216,955, filed on Jul. 10, 2000.

(51) Int. Cl.
| | |
|---|---|
| G06F 15/16 | (2006.01) |
| G06F 15/177 | (2006.01) |
| G06F 1/24 | (2006.01) |
| G06F 7/58 | (2006.01) |
| G06F 17/30 | (2006.01) |
| G06K 19/00 | (2006.01) |
| H04L 9/32 | (2006.01) |
| H03M 1/68 | (2006.01) |
| H04N 7/16 | (2006.01) |
| G06F 15/173 | (2006.01) |
| G06F 9/00 | (2006.01) |
| G06F 7/04 | (2006.01) |
| G06F 7/00 | (2006.01) |
| G06F 12/00 | (2006.01) |
| G06K 9/00 | (2006.01) |
| H04L 9/00 | (2006.01) |
| H04K 1/00 | (2006.01) |

(52) U.S. Cl. .................. 709/225; 709/219; 709/229; 709/248; 709/249; 726/6; 726/30; 707/8; 707/203

(58) Field of Classification Search ................ 709/203, 709/218–221, 223–229, 248, 249; 713/100; 726/4–6, 30; 707/8, 9, 201, 203, 206
See application file for complete search history.

(56) References Cited

U.S. PATENT DOCUMENTS 4,484,306 A 11/1984 Kulczyckyj et al.

(Continued)

OTHER PUBLICATIONS

Wahl, M. et al. "Authentication Methods for LDAP," RFC 2829, May 2000, pp. 1-16.*

(Continued)

*Primary Examiner*—Jason Cardone
*Assistant Examiner*—Melvin H Pollack
(74) *Attorney, Agent, or Firm*—Townsend and Townsend and Crew LLP

(57) ABSTRACT

The present invention provides cache flushing of selected data while leaving remaining cached data intact. Data can be flushed from caches distributed across various components of a network-based computer system. These caches can contain various types of data. In one embodiment, the caches exist in an Access System and contain user identity profile information. In another embodiment, the caches exist in an Access Management System and contain authentication, authorization, or auditing rules. A system in accordance with the invention detects a change to data residing on a server and transmits a synchronization record to a component of the system. The synchronization record identifies the changed data. The system flushes the changed data identified by the synchronization record from caches of the component.

37 Claims, 46 Drawing Sheets

U.S. PATENT DOCUMENTS

| | | | |
|---|---|---|---|
| 4,956,769 A | 9/1990 | Smith | |
| 4,961,224 A | 10/1990 | Yung | |
| 5,077,666 A | 12/1991 | Brimm et al. | |
| 5,113,499 A | 5/1992 | Ankney et al. | |
| 5,226,143 A | 7/1993 | Baird et al. | |
| 5,428,795 A | 6/1995 | Johnson et al. | |
| 5,455,953 A | 10/1995 | Russell | |
| 5,530,861 A | 6/1996 | Diamant et al. | |
| 5,557,742 A | 9/1996 | Smaha et al. | |
| 5,581,691 A | 12/1996 | Hsu et al. | |
| 5,678,041 A | 10/1997 | Baker et al. | |
| 5,689,679 A | 11/1997 | Jouppi | |
| 5,692,125 A | 11/1997 | Schloss et al. | |
| 5,708,780 A | 1/1998 | Levergood et al. | |
| 5,757,920 A | 5/1998 | Misra et al. | |
| 5,764,890 A | 6/1998 | Glasser et al. | |
| 5,765,153 A | 6/1998 | Benantar et al. | |
| 5,793,966 A | 8/1998 | Amstein et al. | |
| 5,802,518 A | 9/1998 | Karaev et al. | |
| 5,812,776 A | 9/1998 | Gifford | |
| 5,819,271 A | 10/1998 | Mahoney et al. | |
| 5,826,029 A | 10/1998 | Gore, Jr. et al. | |
| 5,842,212 A | 11/1998 | Ballurio et al. | |
| 5,872,969 A | 2/1999 | Copeland et al. | |
| 5,875,461 A | 2/1999 | Lindholm | |
| 5,889,952 A | 3/1999 | Hunnicutt et al. | |
| 5,892,903 A | 4/1999 | Klaus | |
| 5,893,149 A | 4/1999 | Hagersten et al. | |
| 5,903,878 A | 5/1999 | Talati et al. | |
| 5,907,621 A | 5/1999 | Bachman et al. | |
| 5,908,469 A | 6/1999 | Botz et al. | |
| 5,924,096 A | 7/1999 | Draper et al. | |
| 5,940,394 A | 8/1999 | Killian | |
| 5,944,780 A | 8/1999 | Chase et al. | |
| 5,944,824 A | 8/1999 | He | |
| 5,978,779 A | 11/1999 | Stein et al. | |
| 5,991,771 A | 11/1999 | Falls et al. | |
| 5,991,810 A | 11/1999 | Shapiro et al. | |
| 5,991,881 A | 11/1999 | Conklin et al. | |
| 5,999,911 A | 12/1999 | Berg et al. | |
| 6,005,571 A | 12/1999 | Pachauri | |
| 6,012,059 A | 1/2000 | Neimat et al. | |
| 6,014,667 A * | 1/2000 | Jenkins et al. | 707/10 |
| 6,026,474 A | 2/2000 | Carter et al. | |
| 6,028,605 A | 2/2000 | Conrad et al. | |
| 6,029,195 A | 2/2000 | Herz | |
| 6,032,227 A | 2/2000 | Shaheen et al. | |
| 6,041,357 A | 3/2000 | Kunzelman et al. | |
| 6,055,637 A * | 4/2000 | Hudson et al. | 726/20 |
| 6,058,381 A | 5/2000 | Nelson | |
| 6,058,480 A | 5/2000 | Brown | |
| 6,061,799 A | 5/2000 | Eldridge et al. | |
| 6,064,656 A | 5/2000 | Angal et al. | |
| 6,073,109 A | 6/2000 | Flores et al. | |
| 6,073,174 A | 6/2000 | Montgomerie et al. | |
| 6,081,518 A | 6/2000 | Bowman-Amuah | |
| 6,088,679 A | 7/2000 | Barkley | |
| 6,088,796 A | 7/2000 | Cianfrocca et al. | |
| 6,098,056 A | 8/2000 | Rusnak et al. | |
| 6,119,167 A | 9/2000 | Boyle et al. | |
| 6,131,120 A | 10/2000 | Reid | |
| 6,133,916 A | 10/2000 | Bukszar et al. | |
| 6,134,658 A | 10/2000 | Multerer et al. | |
| 6,138,104 A | 10/2000 | Marchak et al. | |
| 6,141,778 A | 10/2000 | Kane et al. | |
| 6,151,531 A | 11/2000 | Frankel et al. | |
| 6,154,741 A | 11/2000 | Feldman | |
| 6,157,925 A | 12/2000 | Jenkins et al. | |
| 6,157,942 A | 12/2000 | Chu et al. | |
| 6,158,010 A | 12/2000 | Moriconi et al. | |
| 6,163,844 A | 12/2000 | Duncan et al. | |
| 6,170,013 B1 | 1/2001 | Murata | |
| 6,178,418 B1 | 1/2001 | Singer | |
| 6,182,086 B1 | 1/2001 | Lomet et al. | |
| 6,182,142 B1 * | 1/2001 | Win et al. | 709/229 |
| 6,185,608 B1 * | 2/2001 | Hon et al. | 709/216 |
| 6,185,650 B1 | 2/2001 | Boonie et al. | |
| 6,192,476 B1 | 2/2001 | Gong | |
| 6,208,986 B1 | 3/2001 | Schneck et al. | |
| 6,212,558 B1 | 4/2001 | Antur et al. | |
| 6,212,640 B1 | 4/2001 | Abdelnur et al. | |
| 6,216,199 B1 | 4/2001 | DeKoning et al. | |
| 6,226,752 B1 | 5/2001 | Gupta et al. | |
| 6,230,185 B1 | 5/2001 | Salas et al. | |
| 6,233,576 B1 | 5/2001 | Lewis | |
| 6,233,618 B1 | 5/2001 | Shannon | |
| 6,240,360 B1 | 5/2001 | Phelan | |
| 6,240,414 B1 | 5/2001 | Beizer et al. | |
| 6,243,816 B1 | 6/2001 | Fang et al. | |
| 6,253,248 B1 | 6/2001 | Nakai et al. | |
| 6,256,739 B1 | 7/2001 | Skopp et al. | |
| 6,266,420 B1 | 7/2001 | Langford et al. | |
| 6,275,916 B1 | 8/2001 | Weldon, Jr. et al. | |
| 6,275,944 B1 | 8/2001 | Kao et al. | |
| 6,279,001 B1 | 8/2001 | DeBettencourt et al. | |
| 6,282,546 B1 | 8/2001 | Gleichauf et al. | |
| 6,286,098 B1 | 9/2001 | Wenig et al. | |
| 6,289,462 B1 | 9/2001 | McNabb et al. | |
| 6,301,668 B1 | 10/2001 | Gleichauf et al. | |
| 6,311,269 B2 | 10/2001 | Luckenbaugh et al. | |
| 6,314,492 B1 | 11/2001 | Allen et al. | |
| 6,321,338 B1 | 11/2001 | Porras et al. | |
| 6,324,656 B1 | 11/2001 | Gleichauf et al. | |
| 6,338,097 B1 | 1/2002 | Krenzke et al. | |
| 6,339,423 B1 | 1/2002 | Sampson et al. | |
| 6,345,266 B1 | 2/2002 | Ganguly et al. | |
| 6,347,312 B1 | 2/2002 | Byrne et al. | |
| 6,347,374 B1 | 2/2002 | Drake et al. | |
| 6,357,010 B1 | 3/2002 | Viets et al. | |
| 6,366,913 B1 | 4/2002 | Fitler, Jr. et al. | |
| 6,370,528 B1 * | 4/2002 | Landresse | 707/8 |
| 6,374,359 B1 | 4/2002 | Shrader et al. | |
| 6,381,579 B1 | 4/2002 | Gervais et al. | |
| 6,385,653 B1 | 5/2002 | Sitaraman et al. | |
| 6,393,569 B1 | 5/2002 | Orenshteyn | |
| 6,415,321 B1 | 7/2002 | Gleichauf et al. | |
| 6,421,682 B1 | 7/2002 | Craig et al. | |
| 6,421,781 B1 | 7/2002 | Fox et al. | |
| 6,430,688 B1 | 8/2002 | Kohl et al. | |
| 6,434,531 B1 | 8/2002 | Lancelot et al. | |
| 6,442,567 B1 | 8/2002 | Retallick et al. | |
| 6,453,342 B1 | 9/2002 | Himmel et al. | |
| 6,457,047 B1 | 9/2002 | Chandra et al. | |
| 6,460,141 B1 | 10/2002 | Olden | |
| 6,463,418 B1 | 10/2002 | Todd | |
| 6,463,509 B1 | 10/2002 | Teoman et al. | |
| 6,466,932 B1 | 10/2002 | Dennis et al. | |
| 6,470,386 B1 | 10/2002 | Combar et al. | |
| 6,487,663 B1 | 11/2002 | Jaisimha et al. | |
| 6,499,107 B1 | 12/2002 | Gleichauf et al. | |
| 6,507,847 B1 | 1/2003 | Fleischman | |
| 6,513,056 B1 | 1/2003 | Copeland et al. | |
| 6,519,643 B1 | 2/2003 | Foulkes et al. | |
| 6,519,648 B1 | 2/2003 | Eyal | |
| 6,526,438 B1 | 2/2003 | Bienvenu et al. | |
| 6,526,447 B1 | 2/2003 | Giammaria | |
| 6,539,379 B1 | 3/2003 | Vora et al. | |
| 6,539,382 B1 | 3/2003 | Byrne et al. | |
| 6,539,396 B1 | 3/2003 | Bowman-Amuah | |
| 6,542,993 B1 | 4/2003 | Erfani | |
| 6,543,353 B1 * | 4/2003 | Ohlhauser et al. | 101/224 |
| 6,557,039 B1 | 4/2003 | Leong et al. | |
| 6,564,232 B1 * | 5/2003 | Cole et al. | 707/203 |
| 6,567,818 B1 * | 5/2003 | Frey et al. | 707/103 R |

| | | |
|---|---|---|
| 6,578,147 B1 | 6/2003 | Shanklin et al. |
| 6,584,548 B1 | 6/2003 | Bourne et al. |
| 6,584,569 B2 | 6/2003 | Reshef et al. |
| 6,591,347 B2 | 7/2003 | Tischler et al. |
| 6,598,058 B2 | 7/2003 | Bird et al. |
| 6,609,205 B1 | 8/2003 | Bernhard et al. |
| 6,615,218 B2 | 9/2003 | Mandal et al. |
| 6,618,806 B1 | 9/2003 | Brown et al. |
| 6,625,623 B1 * | 9/2003 | Midgley et al. ............. 707/204 |
| 6,629,132 B1 * | 9/2003 | Ganguly et al. ............. 709/213 |
| 6,636,891 B1 | 10/2003 | LeClair et al. |
| 6,640,307 B2 | 10/2003 | Viets et al. |
| 6,647,393 B1 | 11/2003 | Dietterich et al. |
| 6,668,322 B1 | 12/2003 | Wood et al. |
| 6,675,261 B2 | 1/2004 | Shandony |
| 6,678,828 B1 | 1/2004 | Zhang et al. |
| 6,680,942 B2 | 1/2004 | Mead et al. |
| 6,691,232 B1 | 2/2004 | Wood et al. |
| 6,694,336 B1 * | 2/2004 | Multer et al. ............... 707/201 |
| 6,697,849 B1 | 2/2004 | Carlson |
| 6,697,857 B1 * | 2/2004 | Dixon et al. ................ 709/224 |
| 6,708,170 B1 | 3/2004 | Byrne et al. |
| 6,711,632 B1 | 3/2004 | Chow et al. |
| 6,711,686 B1 * | 3/2004 | Barrett ....................... 709/221 |
| 6,718,328 B1 | 4/2004 | Norris |
| 6,741,992 B1 | 5/2004 | McFadden |
| 6,742,126 B1 | 5/2004 | Mann et al. |
| 6,745,221 B1 | 6/2004 | Ronca |
| 6,748,447 B1 | 6/2004 | Basani et al. |
| 6,754,696 B1 * | 6/2004 | Kamath et al. ............. 709/213 |
| 6,757,708 B1 * | 6/2004 | Craig et al. ................. 709/203 |
| 6,763,370 B1 | 7/2004 | Schmeidler et al. |
| 6,765,864 B1 | 7/2004 | Natarajan et al. |
| 6,771,646 B1 * | 8/2004 | Sarkissian et al. ........... 370/392 |
| 6,772,214 B1 * | 8/2004 | McClain et al. ............ 709/229 |
| 6,775,704 B1 | 8/2004 | Watson et al. |
| 6,779,120 B1 | 8/2004 | Valente et al. |
| 6,782,379 B2 | 8/2004 | Lee |
| 6,792,424 B1 * | 9/2004 | Burns et al. .................... 707/9 |
| 6,804,221 B1 | 10/2004 | Magret et al. |
| 6,859,834 B1 | 2/2005 | Arora et al. |
| 6,868,406 B1 | 3/2005 | Ogg et al. |
| 6,879,995 B1 | 4/2005 | Chinta et al. |
| 6,901,433 B2 * | 5/2005 | San Andres et al. ......... 709/216 |
| 6,925,477 B1 * | 8/2005 | Champagne et al. ........ 707/203 |
| 6,957,237 B1 | 10/2005 | Traversat et al. |
| 7,003,587 B1 | 2/2006 | Battat et al. |
| 7,080,077 B2 | 7/2006 | Ramamurthy et al. |
| 7,124,203 B2 | 10/2006 | Joshi et al. |
| 7,134,137 B2 | 11/2006 | Joshi et al. |
| 7,185,364 B2 | 2/2007 | Knouse |
| 7,194,764 B2 | 3/2007 | Martherus |
| 7,231,661 B1 | 6/2007 | Villavicencio |
| 7,249,369 B2 | 7/2007 | Knouse |
| 7,272,815 B1 * | 9/2007 | Eldridge et al. ............. 717/101 |
| 2001/0037469 A1 | 11/2001 | Gupta et al. |
| 2001/0054153 A1 | 12/2001 | Wheeler et al. |
| 2002/0026563 A1 | 2/2002 | Chamberlain et al. |
| 2002/0032684 A1 | 3/2002 | Kobayashi et al. |
| 2002/0042829 A1 * | 4/2002 | Mizuhara et al. ............ 709/229 |
| 2002/0091745 A1 | 7/2002 | Ramamurthy et al. |
| 2002/0091798 A1 | 7/2002 | Joshi et al. |
| 2002/0099671 A1 | 7/2002 | Crosbie et al. |
| 2002/0112083 A1 | 8/2002 | Joshi et al. |
| 2002/0112155 A1 | 8/2002 | Martherus et al. |
| 2002/0112185 A1 | 8/2002 | Hodges |
| 2002/0116642 A1 | 8/2002 | Joshi et al. |
| 2002/0120599 A1 | 8/2002 | Knouse et al. |
| 2002/0124082 A1 * | 9/2002 | San Andres et al. ......... 709/225 |
| 2002/0129116 A1 | 9/2002 | Humphrey |
| 2002/0165960 A1 | 11/2002 | Chan |
| 2003/0061272 A1 | 3/2003 | Krisnamurthy et al. |
| 2003/0145074 A1 | 7/2003 | Penick |
| 2003/0149737 A1 | 8/2003 | Lambert et al. |
| 2003/0158897 A1 | 8/2003 | Ben-Natan et al. |
| 2003/0191846 A1 | 10/2003 | Hunnicutt et al. |

OTHER PUBLICATIONS

Luciani, J. et al. "Server Cache Synchronization Protocol (SCSP)," RFC 2334, Apr. 1998, pp. 1-40.*

Luciani, J. and Gallo, A. "A Distributed MARS Service Using SCSP," RFC 2443, Nov. 1998, pp. 1-18.*

Vixie, P. and Wessels, D. "Hyper Text Caching Protocol (HTCP/0.0)," RFC 2756, Jan. 2000, pp. 1-15.*

Barrett, Debbie, "Diary Of A Break-And-Enter, Cyber Style," Technology in Government, p. 22, Jan. 2000.

Cholter, William La et al., "IBAN: Intrusion Blocker Based On Active Networks," Proceedings of the DARPA Active Networks Conference and Exposition (DANCE'02), 11 pages, 2002.

Cooney, Michael, "IBM Rolls Out Host- And Server-Based Mgmt. Apps," Network World, vol. 12, Issue 6, pp. 6-7, Feb. 6, 1995.

"DNS—Contents," http://www2.rad.com/networks/1998/dns/main.htm, 15 pages, Dec. 7, 1999.

Easter, C., "Method To Report Access Control Of LAN Server Resources On A Per User Basis," IBM Technical Disclosure Bulletin, p. 172, Apr. 1992.

Good, G., "The LDAP Data Interchange Format (LDIF)—Technical Specification," RFC 2849, 14 pages, Jun. 2000.

Hewlett-Packard, "HP Introduces Next-Generation Web Authorization Products For E-Business," Press Release, 3 pages, Jan. 18, 1999.

Hewlett-Packard, "HP Introduces Security For Microsoft NT Extranets, Portals And E-Services," Press Release, 3 pages, Jan. 17, 2000.

Hewlett-Packard, "HP Provides Unprecedented Range Of Authentication Options," Press Release, 3 pages, Sep. 1, 1999.

Hitchens, Michael et al., "Design Choices for Symmetric Key Based Inter-domain Authentication Protocols in Distributed Systems," Computer Security Applications Conference, 1996., 12th Annual Dec. 9-13, 1996; pp. 105-116.

Hodges, J. et al., "Lightweight Directory Access Protocol (v3): Extension For Transport Layer Security," RFC 2830, 12 pages, May 2000.

Howard, L., "An Approach For Using LDAP As A Network Information Service," RFC 2307, 20 pages, Mar. 1998.

Janis, Reference Monitor-Creating Group Membership, IBM Technical Disclosure Bulletin, p. 431, Mar. 1990.

Kim, Hahnsang et al., "Improving Cross-domain Authentication over Wirsless Local Area Networks," Security and Privacy for Emerging Areas in Communications Networks, 2005 (SecureComm 2005; First International Conference on Sep. 5-9, 2005 pp. 127-138.

Leon, Mark, "McAfee's NetTools Promises To Ease Network Desktop Diagnosis," InfoWorld, vol. 17, Issue 30, p. 53, Jul. 24, 1995.

Lin, Whe Dar et al., "A Wireless-based Authentication and Anonymous Channels for Large Scale Area," Computers and Communications, 2001; Proceedings; Sixth IEEE Symposium on Jul. 3-5, 2001; pp. 36-41.

Luciani, J. et al., "Server Cache Synchronization Protocol (SCSP)," RFC 2334, 39 pages, Apr. 1998.

Netegrity Inc., "SiteMinder Agent Operations Guide," Version 4.0, pp. 1-174, 1997.

Netegrity Inc., "SiteMinder Deployment Guide," Version 4.0, pp. 1-314, 1997.

Netegrity Inc., "SiteMinder Developer's API Guide," Version 4.0, pp. 1-368, 1997.

Netegrity Inc., "SiteMinder Installation Guide," Version 4.0, pp. 1-280, 1997.

Netegrity Inc., "SiteMinder Policy Server Operations Guide," Version 4.0, pp. 1-556, 1997.

Netscape Communications Corporation, "Introduction To SSL," http://developer.netscape.com/docs/manuals/security/sslin/contents.htm, 12 pages, Oct. 9, 1998.

Oblix, Inc., "Oblix CSA Solution Administration Guide," Version 3.5, 328 pages, 1999.

Park, Joon S. et al., "Secure Cookies On The Web,"IEEE Internet Computing, pp. 36-44, Jul./Aug. 2002.

Phipatanasuphorn, Veradej et al., "Vulnerability Of Sensor Networks To Unauthorized Traversal And Monitoring," IEEE Transactions on Computers, vol. 53, No. 3, pp. 364-369, Mar. 2004.

Piscitello, David M. et al., "Project Guards Laptop And Desktop Data," InfoWorld, pp. 48 and 54, Jun. 21, 1999.

Schmersal, Frank, "Testing To Maintain Service Standards," Communications News, vol. 35, Issue 3, pp. 22-23, Mar. 1998.

Securant Technologies, Inc., "Clear Trust, Unified Access Management," pp. 1-23, 1997.

Skaggs, B. et al., "Network Vulnerability Analysis," IEEE, pp. III-493-III-495, 2002.

Stokes, E. et al., "Access Control Requirements For LDAP," RFC 2820, 9 pages, May 2000.

Sun Microsystems, Inc., "Appendix B—ACL File Syntax," iPlanet Web Server: FastTrack Edition Administrator's Guide, 7 pages, Jul. 13, 2000.

Sun Microsystems, Inc., "Chapter 2—Syntax And Use Of obj.conf," iPlanet Web Server, FastTrack Edition NSAPI Programmer's Guide, 16 pages, Jul. 20, 2000.

Sun Microsystems, Inc., "Chapter 12—Controlling Access To Your Server," iPlanet Web Server: FastTrack Edition Administrator's Guide, 24 pages, Jul. 13, 2000.

U.S. Appl. No. 09/792,911, Final Office Action dated May 9, 2005, 17 pages.

U.S. Appl. No. 09/792,911, Advisory Action dated Aug. 9, 2005, 3 pages.

U.S. Appl. No. 09/792,911, Office Action dated Dec. 2, 2005, 13 pages.

U.S. Appl. No. 09/792,915, Office Action dated Jul. 23, 2004, 17 pages.

U.S. Appl. No. 09/792,915, Final Office Action dated Mar. 8, 2005, 19 pages.

U.S. Appl. No. 09/792,915, Final Office Action dated Jun. 30, 2005, 18 pages.

U.S. Appl. No. 09/792,915, Office Action dated Oct. 4, 2005, 17 pages.

U.S. Appl. No. 09/792,918, Office Action dated Sep. 8, 2004, 22 pages.

U.S. Appl. No. 09/792,918, Final Office Action dated Jun. 21, 2005, 16 pages.

U.S. Appl. No. 09/792,918, Advisory Action dated Sep. 20, 2005, 3 pages.

U.S. Appl. No. 09/792,934, Office Action dated Sep. 21, 2004, 19 pages.

U.S. Appl. No. 09/792,934, Final Office Action dated Jun. 2, 2005, 10 pages.

U.S. Appl. No. 09/792,934, Office Action dated Aug. 19, 2005, 5 pages.

U.S. Appl. No. 09/793,196, Office Action dated Jul. 14, 2004, 19 pages.

U.S. Appl. No. 09/793,196, Final Office Action dated Mar. 8, 2005, 15 pages.

U.S. Appl. No. 09/793,196, Advisory Action dated Jul. 21, 2005, 3 pages.

U.S. Appl. No. 09/793,196, Office Action dated Dec. 13, 2005, 12 pages.

U.S. Appl. No. 09/793,196, Final Office Action dated May 31, 2006, 22 pages.

U.S. Appl. No. 09/793,320, Office Action dated Aug. 4, 2004, 18 pages.

U.S. Appl. No. 09/793,320, Final Office Action dated May 10, 2005, 19 pages.

U.S. Appl. No. 09/793,320, Office Action dated Sep. 20, 2005, 15 pages.

U.S. Appl. No. 09/793,320, Final Office Action dated Mar. 17, 2006, 18 pages.

U.S. Appl. No. 09/793,354, Office Action dated Oct. 1, 2003, 12 pages.

U.S. Appl. No. 09/793,354, Final Office Action dated Apr. 19, 2004, 15 pages.

U.S. Appl. No. 09/793,354, Office Action dated Jan. 4, 2005, 11 pages.

U.S. Appl. No. 09/793,354, Final Office Action dated Aug. 26, 2005, 9 pages.

U.S. Appl. No. 09/793,354, Advisory Action dated Dec. 15, 2005, 3 pages.

U.S. Appl. No. 09/793,355, Office Action dated Mar. 12, 2004, 13 pages.

U.S. Appl. No. 09/793,355, Final Office Action dated Apr. 6, 2005, 16 pages.

U.S. Appl. No. 09/793,355, Advisory Action dated Jun. 21, 2005, 7 pages.

U.S. Appl. No. 09/793,355, Office Action dated Sep. 7, 2005, 13 pages.

U.S. Appl. No. 09/793,658, Office Action dated Sep. 9, 2004, 14 pages.

U.S. Appl. No. 09/793,658, Final Office Action dated Nov. 2, 2005, 16 pages.

U.S. Appl. No. 09/793,658, Advisory Action dated Jan. 31, 2006, 3 pages.

U.S. Appl. No. 09/814,091, Office Action dated Jul. 14, 2004, 22 pages.

U.S. Appl. No. 09/814,091, Final Office Action dated Apr. 8, 2005, 24 pages.

U.S. Appl. No. 09/814,091, Advisory Action dated Jul. 5, 2005, 3 pages.

U.S. Appl. No. 09/814,091, Office Action dated Nov. 1, 2005, 18 pages.

U.S. Appl. No. 09/814,091, Office Action dated May 3, 2006, 7 pages.

U.S. Appl. No. 09/886,515, Office Action dated Dec. 28, 2004, 35 pages.

U.S. Appl. No. 09/886,515, Office Action dated Aug. 29, 2005, 35 pages.

U.S. Appl. No. 09/886,515, Final Office Action dated Feb. 14, 2006, 36 pages.

Wahl, M. et al., "Authentication Methods For LDAP," RFC 2829, 16 pages, May 2000.

Wahl, M. et al., "Lightweight Directory Access Protocol (v3)," RFC 2251, 48 pages, Dec. 1997.

Wu, Kun-Lung et al., "Personalization With Dynamic Profiler," IEEE, pp. 12-20, 2001.

Yaacovi, Y. et al., "Lightweight Directory Access Protocol (v3): Extensions For Dynamic Directory Services," RFC 2589, 12 pages, May 1999.

Mwakalinga, Jeffy et al., "Authorization System in Open Networks based on Attribute Certificates," http://www.dsv.su.se/-matei/courses/3%20-%202i1272/L3b.pdf. 17 pages, printed date Feb. 20, 2007.

U.S. Appl. No. 09/792,915, Final Office Action dated Apr. 3, 2006, 20 pages.

U.S. Appl. No. 09/792,915, Advisory Action dated Jun. 23, 2006, 3 pages.

U.S. Appl. No. 09/793,320, Advisory Action dated Jun. 7, 2006, 5 pages.

U.S. Appl. No. 09/793,355, Final Office Action dated Feb. 9, 2006, 15 pages.

U.S. Appl. No. 09/793,355, Advisory Action dated May 2, 2006, 3 pages.

U.S. Appl. No. 09/886,515, Office Action dated Sep. 7, 2006, 43 pages.

* cited by examiner

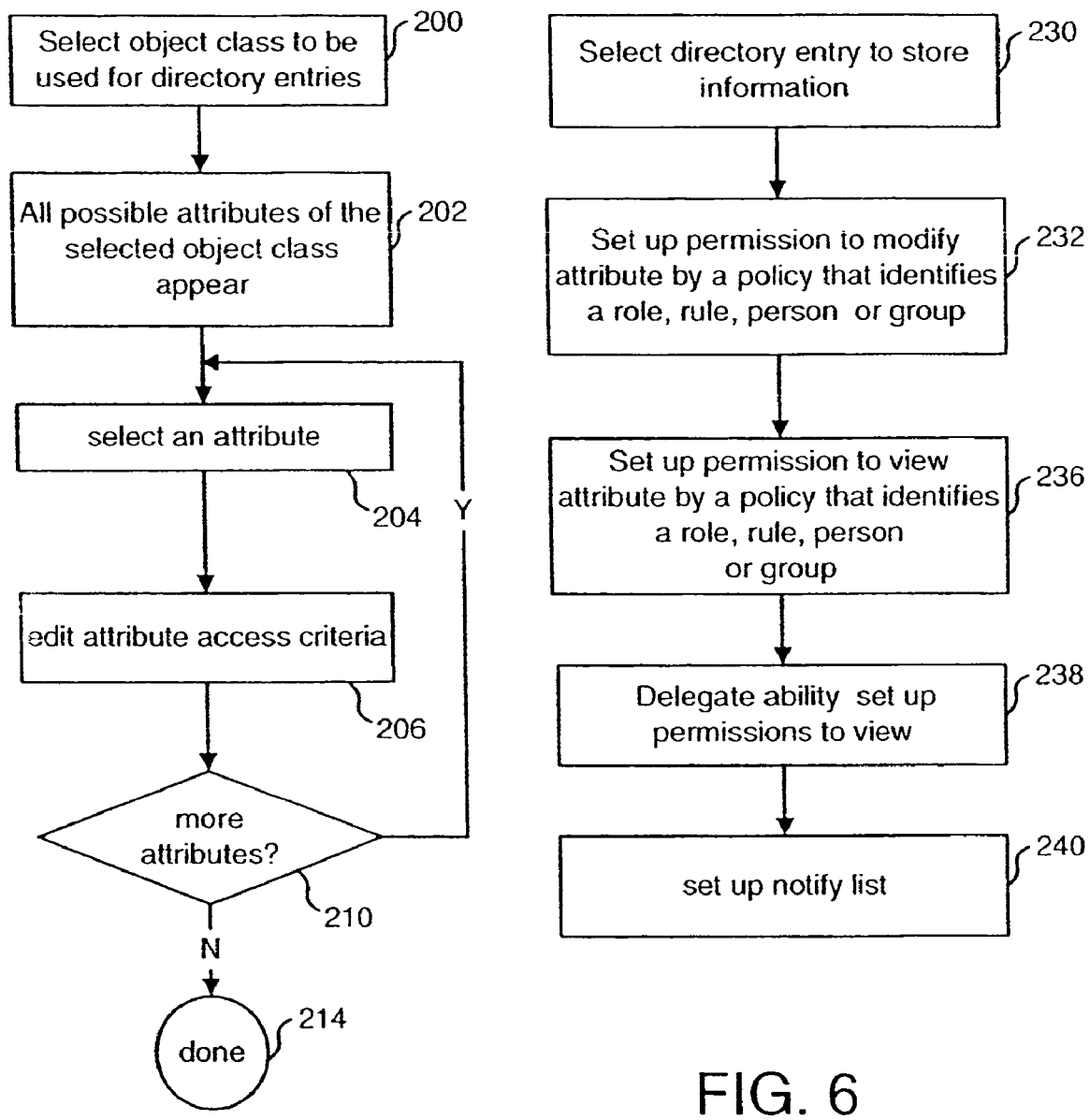

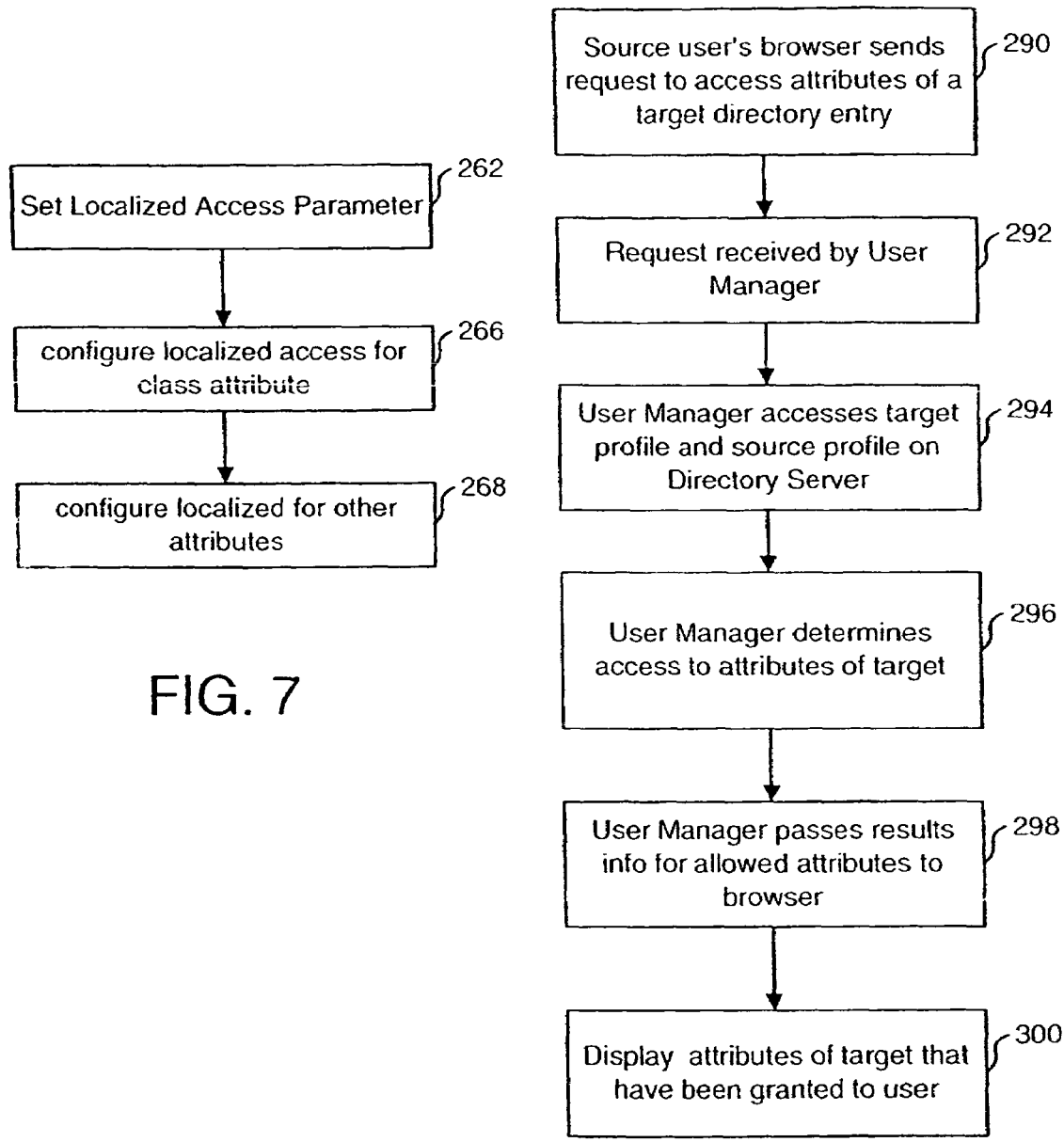

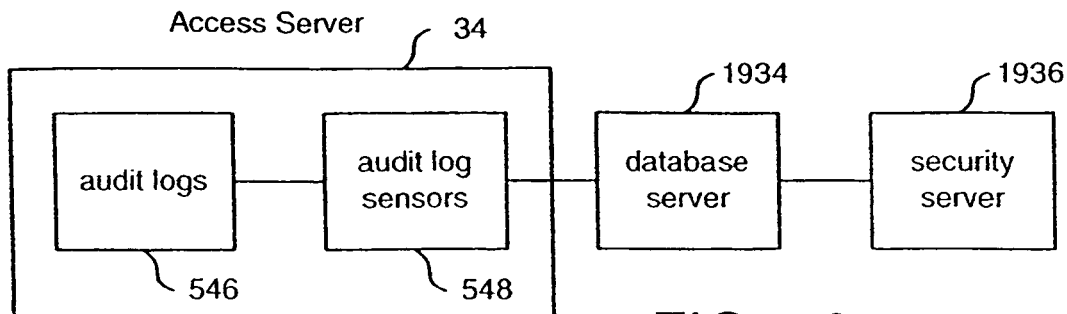
FIG. 50
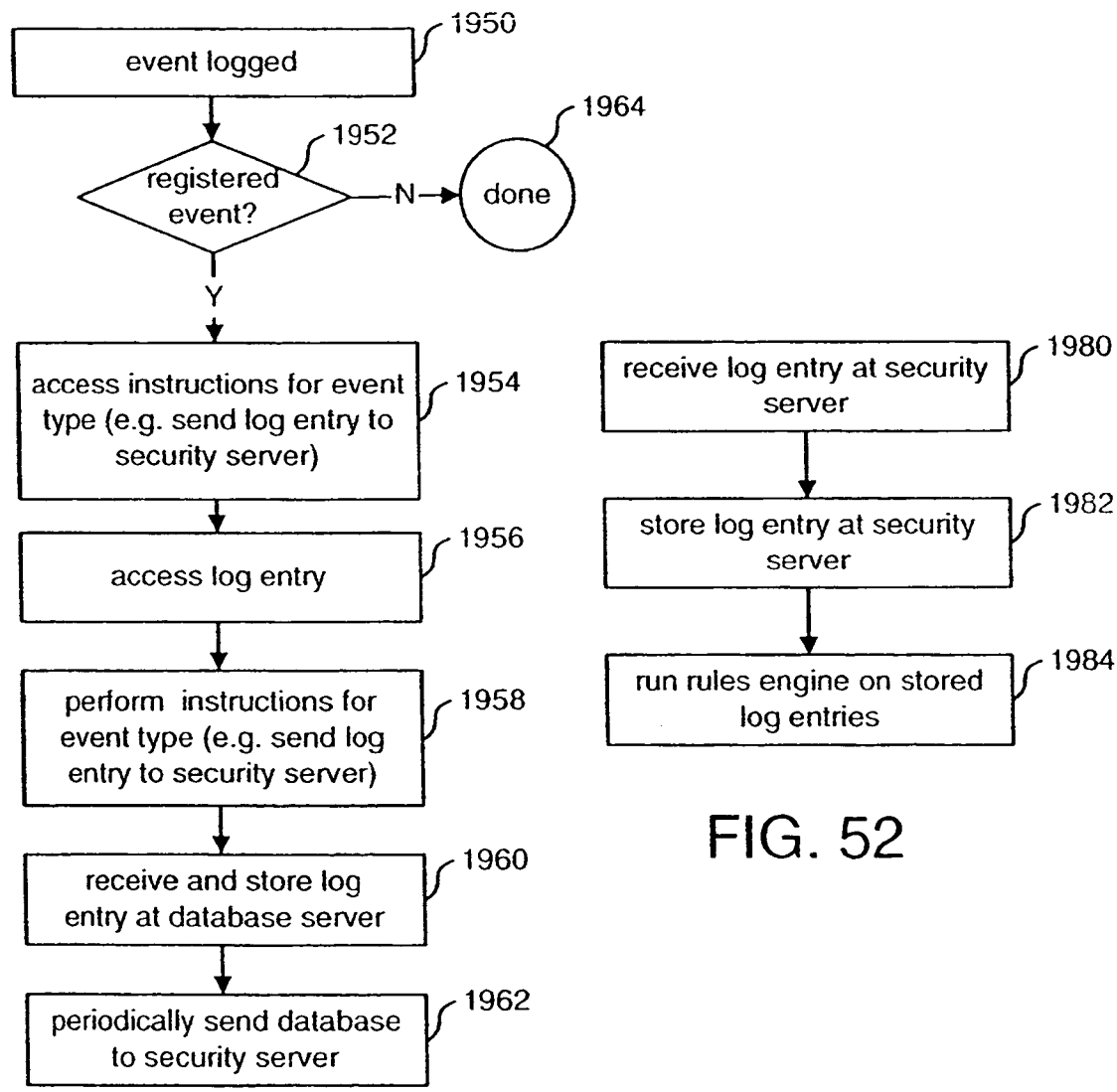
FIG. 52
FIG. 51

SELECTIVE CACHE FLUSHING IN IDENTITY AND ACCESS MANAGEMENT SYSTEMS

This application is a continuation of U.S. patent application Ser. No. 09/792,911, filed Feb. 26, 2001 by Joshi et al. and entitled "Selective Cache Flushing in Identity and Access Management Systems now U.S. Pat. No. 7,124,203, the entire disclosure of which is incorporated herein by reference, and which claims the benefit of U.S. Provisional Application No. 60/216,955, Web Access Management, filed Jul. 10, 2000, the entire disclosure of which is incorporated herein by reference.

CROSS-REFERENCE TO RELATED APPLICATIONS

This Application is related to the following Applications:

Access Tester, by Christine Wai Han Chan, Ser. No. 09/792,918, filed the same day as the present application;

Post Data Processing, by Knouse, et al., Ser. No. 09/793,196, filed the same day as the present application;

User Authentication, by Martherus, et al., Ser. No. 09/793,658, filed the same day as the present application;

Localized Access, by Ramamurthy, et al., Ser. No. 09/793,354, filed the same day as the present application;

Query String Processing, by Crosbie, et al., Ser. No. 09/793,355, filed the same day as the present application;

Logging Access System Events, by Joshi, et al., Ser. No. 09/792,915, filed the same day as the present application;

Providing Data To Applications from an Access System, by Joshi, et al., Ser. No. 09/792,934, filed the same day as the present application; and Intrusion Threat Detection, by Jeffrey D. Hodges, Ser. No. 09/793,320, filed the same day as the present application.

Each of these related Applications are incorporated herein by reference.

BACKGROUND OF THE INVENTION

1. Field of the Invention

The present invention is directed to technology for synchronizing and flushing the contents of cache memories.

2. Description of the Related Art

The Internet has altered the economic landscape, and companies are experiencing a fundamental shift in how they do business. Business processes involve complex interactions between companies and their customers, suppliers, partners and employees. For example, businesses interact constantly with their customers—often other businesses—to provide information on product specification and availability. Businesses also interact with vendors and suppliers in placing orders and obtaining payments. To meet new challenges and leverage opportunities, while reducing their overall cost-of-interactions, many organizations are migrating to network-based business processes and models. Among the most important of these is Internet-based E-business.

In addition to customer information, businesses must also make a wide array of information and services available to their employee populations, generating further interactions. This information can include both business-related and personal information. E-business is also challenged with cohesively managing disparate end user, application, content, policy, and administrative information. For all of these types of computer network-based information, as well as others, it is desirable to minimize the time spent retrieving the information to ensure data is available quickly and accurately.

As the volume of data accessible to users through computer networks continues to surge, so has the number of end users attempting to access this data. As a result, the burden on access systems has increased significantly, which can cause degradations in system performance. These concerns become particularly acute in the world of E-commerce.

Cache memories provide one way to minimize data retrieval time. Caches (hardware or software) act as buffers, storing data that is frequently and/or recently accessed by various components of a network-based system. Once data is stored in a cache, various components of the system can quickly read information directly from the cache, rather than having to retrieve the data from an original source using a longer process. Generally speaking, data retrieved from a cache will be available much quicker than data retrieved from original sources.

However, when data is changed at an original source, previously cached versions of the data become stale. The cached data must be flushed to prevent usage of the stale data by components of the system. Cache flushing is particularly important in systems where users are authenticated or authorized for resources. For example, if changes occur to user information or rules used to authenticate or authorize users, any previously cached versions of the changed data must be flushed to prevent future authentication or authorizations from being performed using the stale data.

Furthermore, if many pieces of data are cached, flushing an entire cache can inadvertently delete data that has not been changed. This deletion of otherwise valid data can increase access times, forcing the components of the system to re-retrieve previously cached data from original sources. This can lead to slower performance and loss of confidence in the E-business system.

These problems become further complicated in Internet network-based computer systems where caches containing many disparate types of information may be found on multiple servers, Web Servers, and even Web Server plug-ins running on the Web Servers. Thus, there is a need for a means to flush stale cached data without interfering with otherwise valid cached data in network-based computer systems.

SUMMARY OF THE INVENTION

The present invention, roughly described, provides for a system capable of flushing selected data from caches while leaving remaining cached data intact. The present invention can flush data from caches distributed across various components of a network-based system. These caches can contain various types of data. In one embodiment, the caches exist in an Access System and contain user identity profile information. In another embodiment, the caches exist in an Access Management System and contain authentication, authorization, or auditing rules.

One embodiment of the present invention detects a change to data residing on a server and transmits a synchronization record to a component of the system. The synchronization record identifies the changed data. The system flushes the changed data identified by the synchronization record from caches of the component. In one embodiment, the flushed cashes reside in an Access Server. In another embodiment, the flushed cashes reside in a Web Server plug-in.

The present invention can be implemented using hardware, software, or a combination of both hardware and software. The software used for the present invention is stored on one or more processor readable storage devices including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. Hardware that can be used for the present invention includes computers, handheld devices, telephones (e.g. cellular, Internet enabled, etc.), etc. Some of these devices includes processors, memory, nonvolatile storage, input devices and output devices.

These and other objects and advantages of the present invention will appear more clearly from the following description in which the preferred embodiment of the invention has been set forth in conjunction with the drawings.

BRIEF DESCRIPTION OF THE DRAWINGS

FIG. 5 is a flow chart describing a process for setting up access rules for an Identity Management System.

FIG. 6 is a flow chart describing a process for editing an attribute access criteria.

FIG. 7 is a flow chart describing a process for configuring localized access.

FIG. 8 is a flow chart describing a process for controlling access to attributes in the Identity Management System.

FIG. 50 is a block diagram depicting one embodiment of components used for intrusion detection.

FIG. 51 is a flow chart describing a process for detecting intrusions.

FIG. 52 is a flow chart describing a process performed at a security server as part of a process for detecting intrusions.

DETAILED DESCRIPTION

Figure 1:
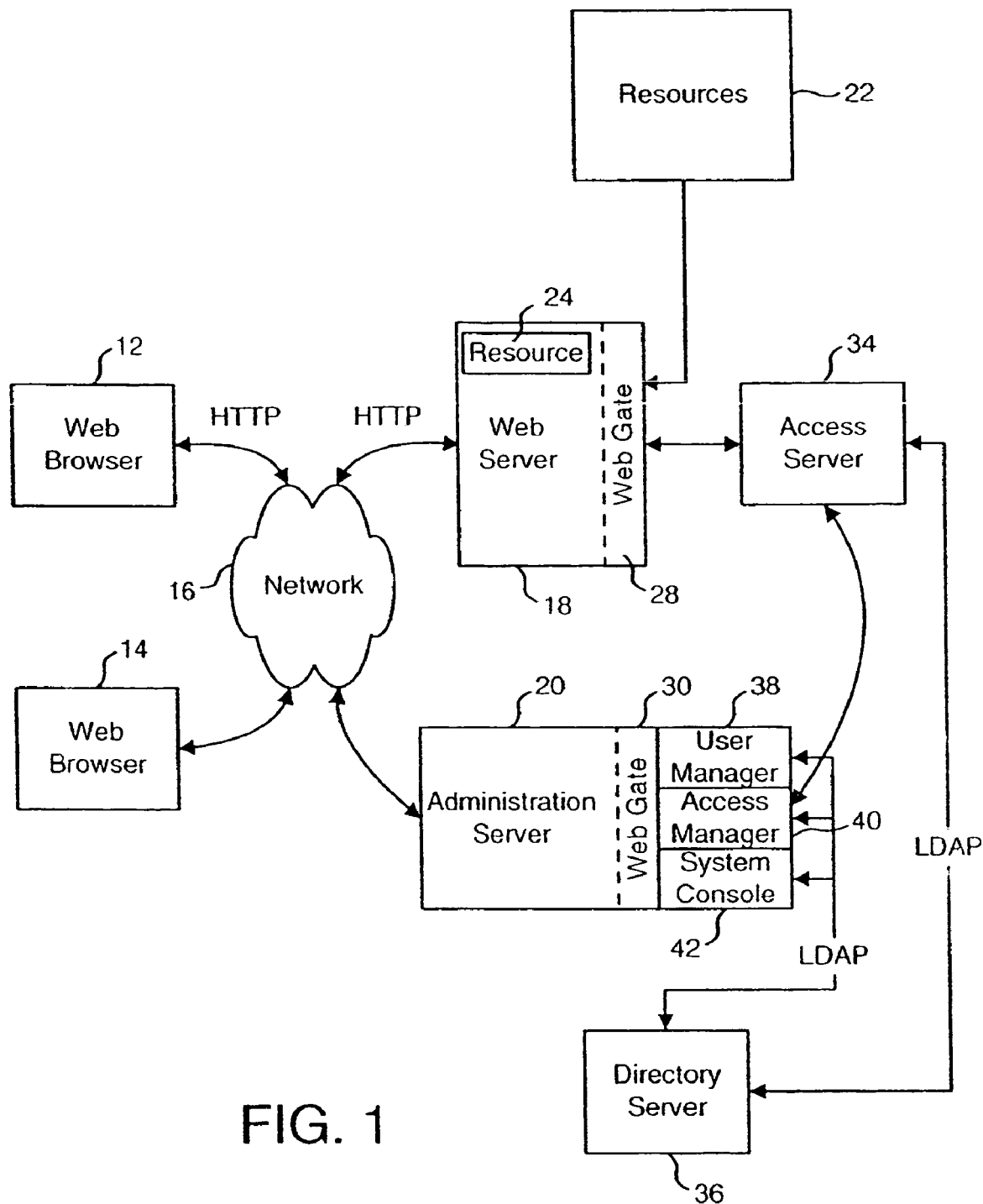
FIG. 1 is a block diagram depicting the components of one embodiment of the present invention.

FIG. 1 depicts an Access System which provides identity management and access management for a network. In general, an Access System manages access to resources available to a network. The identity management portion of the Access System (hereinafter "the Identity Management System") manages end user identity profiles, while the access management portion of the Access System (hereinafter "the Access Management System") provides security for resources across one or more web servers. Underlying these modules is active automation, a delegation and work flow technology. The active automation technology couples the Identity and Access Management Systems by facilitating delegation of roles and rights, plus providing workflow-enabled management of end user identity profiles. A key feature of one embodiment of this system is the centralization of the repositories for policies and user identity profiles while decentralizing their administration. That is, one embodiment of the system centralizes the policy and identity repositories by building them on a directory service technology. The system decentralizes their administration by hierarchly delegated Administrative roles. Although the Access System of FIG. 1 includes an Identity Management System and an Access Management System, other Access Systems may only include an Identity Management System or only include an Access Management System.

FIG. 1 is a block diagram depicting one embodiment for deploying an Access System. FIG. 1 shows web browsers 12 and 14 accessing Web Server 18 and/or Administration Server 20 via Internet 16. In one embodiment, web browsers 12 and 14 are standard web browsers known in the art running on any suitable type of computer. FIG. 1 depicts web browsers 12 and 14 communicating with Web Server 24 and Administration Server 20 using HTTP over the Internet; however, other protocols and networks can also be used.

Web Server 18 is a standard Web Server known in the art and provides an end user with access to various resources via Internet 16. In one embodiment, there is a first firewall (not shown) connected between Internet 16 and Web Server 18, a second firewall (not shown) connected between Web Server 18 and Access Server 34.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL see RFC 1738). A resource can include a web page, software application, file, database, directory, a data unit, etc. In one embodiment, a resource is anything accessible to a user on a network. The network could be the Internet, a LAN, a WAN, or any other type of network. Table 1, below, provides examples of resources and at least a portion of their respective URL syntax:

| Resource | URL Encoding |
| --- | --- |
| Directory | /Sales/ |
| HTML Page | /Sales/Collateral/index.html |
| CGI Script with no query | /cgi-bin/testscript.cgi |
| CGI Script with query | /cgi_bin/testscript.cgi?button=on |
| Application | /apps/myapp.exe |

A URL includes two main components: a protocol identifier and a resource name separated from the protocol identifier by a colon and two forward slashes. The protocol identifier indicates the name of the protocol to be used to fetch the resource. Examples includes HTTP, FTP, Gopher, File and News. The resource name is the complete address to the resource. The format of the resource name depends on the protocol. For HTTP, the resource name includes a host name, a file name, a port number (optional) and a reference (optional). The host name is the name of the machine on which the resource resides. The file name is the path name to the file on the machine. The port number is the number of the port to which to connect. A reference is a named anchor within a resource that usually identifies a specific location within a file. Consider the following URL: "http://www.oblix.com/oblix/sales/index.html." The string "http" is the protocol identifier. The string "www.oblix.com" is the host name. The string "/oblix/sales/index.html" is the file name.

A complete path, or a cropped portion thereof, is called a URL prefix. In the URL above, the string "/oblix/sales/index.html" is a URL prefix and the string "/oblix" is also a URL prefix. The portion of the URL to the right of the host name and to the left of a query string (e.g. to the left of a question mark, if there is a query string) is called the absolute path. In the URL above, "/oblix/sales/index.html" is the absolute path. A URL can also include query data, which is typically information following a question mark. For example, in the URL:

http://www.oblix.com/oblix/sales/
index.html?user=smith&dept=sales the query data is
"user=smith&dept=sales." Although the discussion
herein refers to URLs to identify a resource, other identifiers can also be used within the spirit of the present
invention.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory Server 36.

Administration Server 20 is a web-enabled server. In one embodiment, Administration Server 20 includes Web Gate 30. Other embodiments of Administration Server 20 do not include Web Gate 30. Administration Server 20 also includes other software modules, including User Manager 38, Access Manager 40, and System Console 42. Directory Server 36 is in communication with User Manager 38, Access Manager 40, System Console 42, and Access Server 34. Access Manager 40 is also in communication with Access Server 34.

The system of FIG. 1 is scalable in that there can be many Web Servers (with Web Gates), many Access Servers, and multiple Administration Servers. In one embodiment, Directory Server 36 is an LDAP Directory Server and communicates with other servers/modules using LDAP over SSL. In other embodiments, Directory Server 36 can implement other protocols or can be other types of data repositories.

The Access Management System includes Access Server 34, Web Gate 28, Web Gate 30 (if enabled), and Access Manager 40. Access Server 34 provides authentication, authorization, and auditing (logging) services. It further provides for identity profiles to be used across multiple domains and Web Servers from a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

Access Manager 40 allows administrators access to manage multiple resources across an enterprise and to delegate policy administration to the persons closest to specific business applications and content. In one embodiment, administrators perform these tasks using an intuitive graphical user interface ("GUI").

User Manager 38 provides a user interface for administrators to use, establish and/or manage identity profiles. An identity profile (also called a user profile or user identity profile) is a set of information associated with a particular user. The data elements of the identity profile are called attributes. In one embodiment, an attribute may include a name, value and access criteria. In one embodiment, an identity profile stores the following attributes: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Other information can also be stored. In other embodiments, less or more than the above-listed information is stored.

System Console 42 provides a GUI for administrators to perform various tasks such as managing Administration roles, managing various system wide settings, and configuring the Identity and Access Management Systems. System Console 42 can be used to manage groups (optional) and departing users, reclaim unused resources, manage logging, configure parameters for authentication, configure parameters for authorization, and so on. Additionally, System Console 42 can be used to configure user schemes and control access to certain Identity Management System capabilities (such as "new user," "deactivate user," "workflow," and so on).

The system of FIG. 1 is used to protect a web site, network, Intranet, Extranet, etc. To understand how the system of FIG. 1 protects a web site (or other structure), it is important to understand the operation of unprotected web sites. In a typical unprotected web site, end users cause their browsers to send a request to a Web Server. The request is usually an HTTP request which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory Server 36) can make informed decisions based on default and/or specific rules about whether to return requested resources to an end user. The rules are evaluated based on the end user's profile, which is managed by the Identity Management System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information. The received log-on information is then passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's profile and the resource's authentication criteria stored on Directory Server 36. If the user's supplied log-on information satisfies the authentication criteria, the process flows as described below; otherwise, the end user is notified that access to the requested resource is denied and the process halts. After authenticating the user, Web Gate 28 queries Access Server 34 about whether the user is authorized to access the resource requested. Access Server 34 in turn queries Directory Server 36 for the appropriate authorization criteria for the requested resource. Access Server 34 retrieves the authorization criteria for the resource and, based on that authorization criteria, Access Server 34 answers Web Gate 28's authorization query. If the user is authorized, the user is granted access to the resource; otherwise, the user's request is denied. Various alternatives to the above described flow are also within the spirit and scope of the present invention.

In one embodiment, the system of FIG. 1 includes means for providing and managing identity profiles, and means for defining and managing authentication and authorization policies. In one implementation, user identity and authentication/authorization information is administered through delegable Administration roles. Certain users are assigned to Administration roles, thus conferring to them the rights and responsibilities of managing policy and/or user identities in specific portions of the directory and web name spaces. The capability to delegate Administration duties enables a site to scale administratively by empowering those closest to the sources of policy and user information with the ability to manage that information.

A role is a function or position performed by a person in an organization. An administrator is one type of role. In one embodiment, there are at least five different types of administrators: System Administrator, Master Access Administrator, Delegated Access Administrator, Master Identity Administrator, and Delegated Identity Administrator. A System Administrator serves as a super user and is authorized to configure the system deployment itself and can manage any aspect of the system.

A Master Access Administrator is assigned by the system administrator and is authorized to configure the Access Management System. The Master Access Administrator can define and configure Web Gates, Access Servers, authentication parameters, and policy domains. In addition, Master Access Administrators can assign individuals to Delegated Access Administrator roles. A Delegated Access Administrator is authorized to create, delete and/or update policies within their assigned policy domain (described below), and create new policy domains subordinate to their assigned policy domains. A Delegated Access Administrator may also confer these rights to others. A Master Identity Administrator, assigned by the System Administrator, is authorized to configure the Identity Management System, including defining and configuring end user identities and attributes, per attribute access control, who may perform new user and deactivate (revocation) user functions. Master Identity Administrators may also designate individuals to Delegate Identity Administrator roles. A Delegated Identity Administrator is selectively authorized to perform new user and deactivate user functions.

A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. There are two levels of rules available (first and second levels) for authentication, authorization, and auditing. Policies are always attached to a policy domain and specify the fine-grain portion of a web name space that a policy protects. In practice, the host names and URL prefixes from the policy domain the policy belongs to are logically concatenated with the policy's URL pattern and the resulting overall patterns compared to the incoming URL. If there is a match, then the policy's various rules are evaluated to determine whether the request should be allowed or denied; if there is not a match, then default policy domain rules are used.

Figure 2:
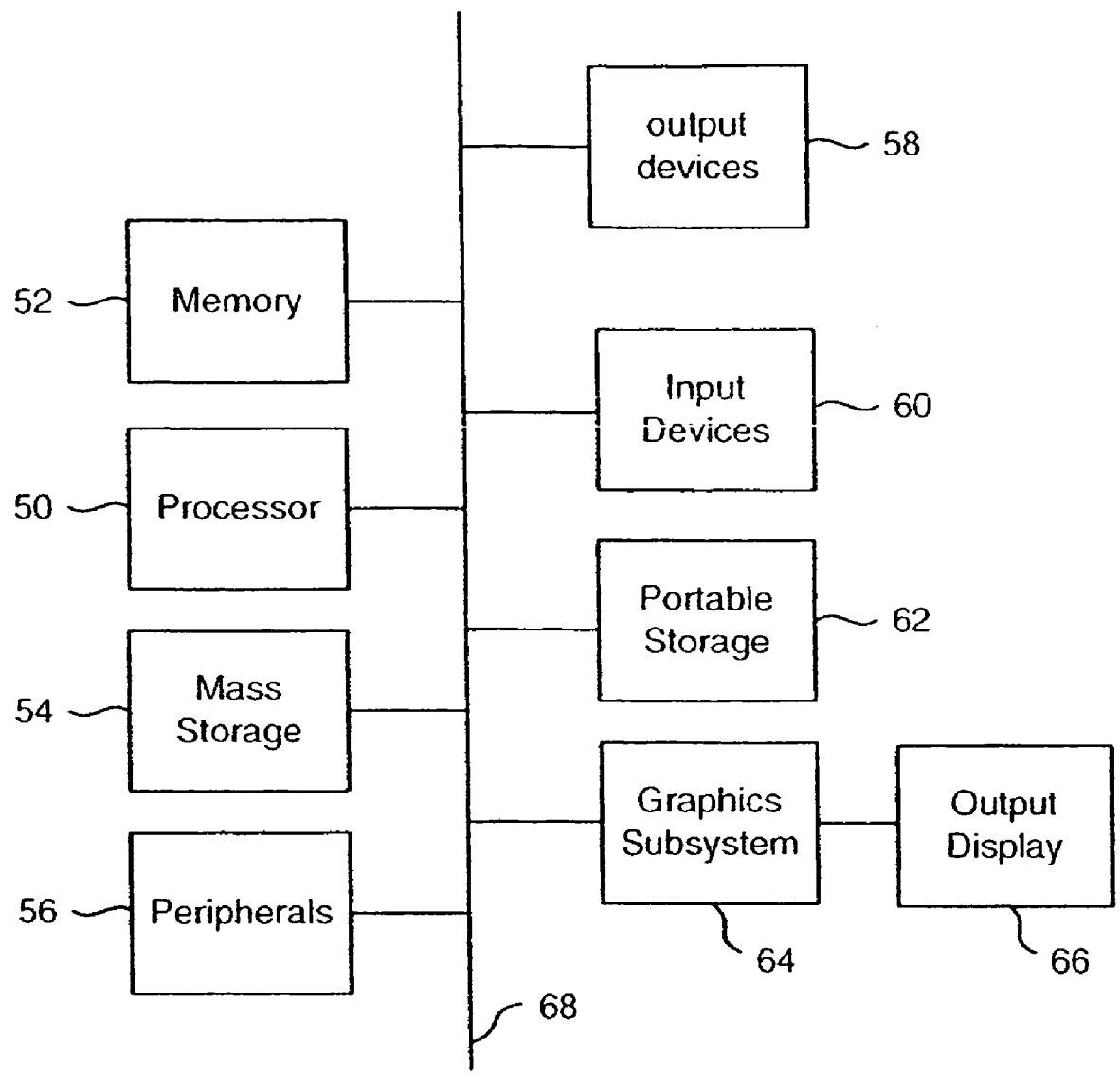
FIG. 2 is a block diagram depicting the components of the computing system that can be used with the present invention.

FIG. 2 illustrates a high level block diagram of a computer system which can be used for the components of the present invention. The computer system of FIG. 2 includes a processor unit 50 and main memory 52. Processor unit 50 may contain a single microprocessor, or may contain a plurality of microprocessors for configuring the computer system as a multi-processor system. Main memory 52 stores, in part, instructions and data for execution by processor unit 50. If the system of the present invention is wholly or partially implemented in software, main memory 52 can store the executable code when in operation. Main memory 52 may include banks of dynamic random access memory (DRAM) as well as high speed cache memory.

The system of FIG. 2 further includes a mass storage device 54, peripheral device(s) 56, user input device(s) 60, portable storage medium drive(s) 62, a graphics subsystem 64 and an output display 66. For purposes of simplicity, the components shown in FIG. 1 are depicted as being connected via a single bus 68. However, the components may be connected through one or more data transport means. For example, processor unit 50 and main memory 52 may be connected via a local microprocessor bus, and the mass storage device 54, peripheral device(s) 56, portable storage medium drive(s) 62, and graphics subsystem 64 may be connected via one or more input/output (I/O) buses. Mass storage device 54, which may be implemented with a magnetic disk drive or an optical disk drive, is a non-volatile storage device for storing data and instructions for use by processor unit 50. In one embodiment, mass storage device 54 stores the system software for implementing the present invention for purposes of loading to main memory 52.

Portable storage medium drive 62 operates in conjunction with a portable non-volatile storage medium, such as a floppy disk, to input and output data and code to and from the computer system of FIG. 2. In one embodiment, the system software for implementing the present invention is stored on such a portable medium, and is input to the computer system via the portable storage medium drive 62. Peripheral device(s) 56 may include any type of computer support device, such as an input/output (I/O) interface, to add additional functionality to the computer system. For example, peripheral device(s) 56 may include a network interface for connecting the computer system to a network, a modem, a router, etc.

User input device(s) 60 provide a portion of a user interface. User input device(s) 60 may include an alpha-numeric keypad for inputting alpha-numeric and other information, or a pointing device, such as a mouse, a trackball, stylus, or cursor direction keys. In order to display textual and graphical information, the computer system of FIG. 2 includes graphics subsystem 64 and output display 66. Output display 66 may include a cathode ray tube (CRT) display, liquid crystal display (LCD) or other suitable display device. Graphics subsystem 64 receives textual and graphical information, and processes the information for output to display 66. Additionally, the system of FIG. 2 includes output devices 58. Examples of suitable output devices include speakers, printers, network interfaces, monitors, etc.

The components contained in the computer system of FIG. 2 are those typically found in computer systems suitable for use with the present invention, and are intended to represent a broad category of such computer components that are well known in the art. Thus, the computer system of FIG. 2 can be a personal computer, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 3:
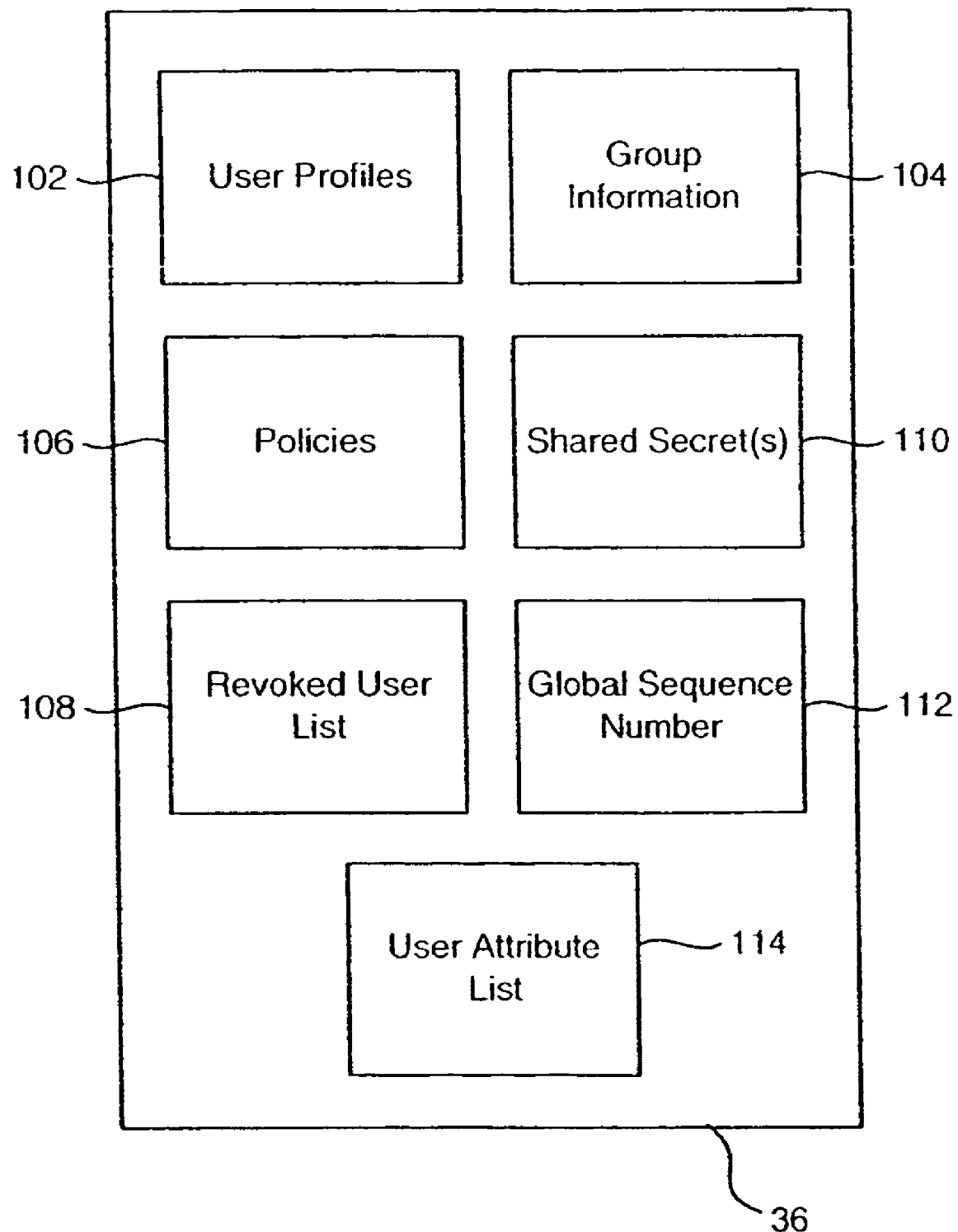
FIG. 3 is a block diagram depicting the components of a Directory Server.

FIG. 3 is a block diagram of Directory Server 36. Directory Server 36 stores user identity profiles 102. Each identity profile includes a set of attributes for the particular end users. Group information 104 is also stored, which describes logical relationships and groupings of users having identity profiles 102 stored on Directory Server 36. A plurality of policies 106, each of which is associated with a policy domain as described above, are also stored on Directory Server 36. Revoked user list 108 identifies users previously (but no longer) allowed access to resources on their system. Shared secret(s) 110 are keys stored on Directory Server 36 used for encrypting cookies set on browsers 12 or 14 after a successful user authentication. Shared secret(s) (keys) 110 can change as often as desired by an administrator. In one embodiment of the present invention, previously valid keys are "grandfathered" such that both a current key and an immediately prior key will de-crypt encrypted cookies. Global sequence number (GSN) 112 is a unique number stored on Directory Server 36 which is assigned to a policy domain change (first level default rules) or policy change (second level resource-specific rules) and updated in response to subsequent policy changes for cache flushing purposes. In one embodiment of the present invention, the GSN is incremented to the next sequential number after detection of a policy domain or policy change. User attribute list 114 is a list of user identity profile attributes used by cached authentication and authorization rules.

Figure 4:
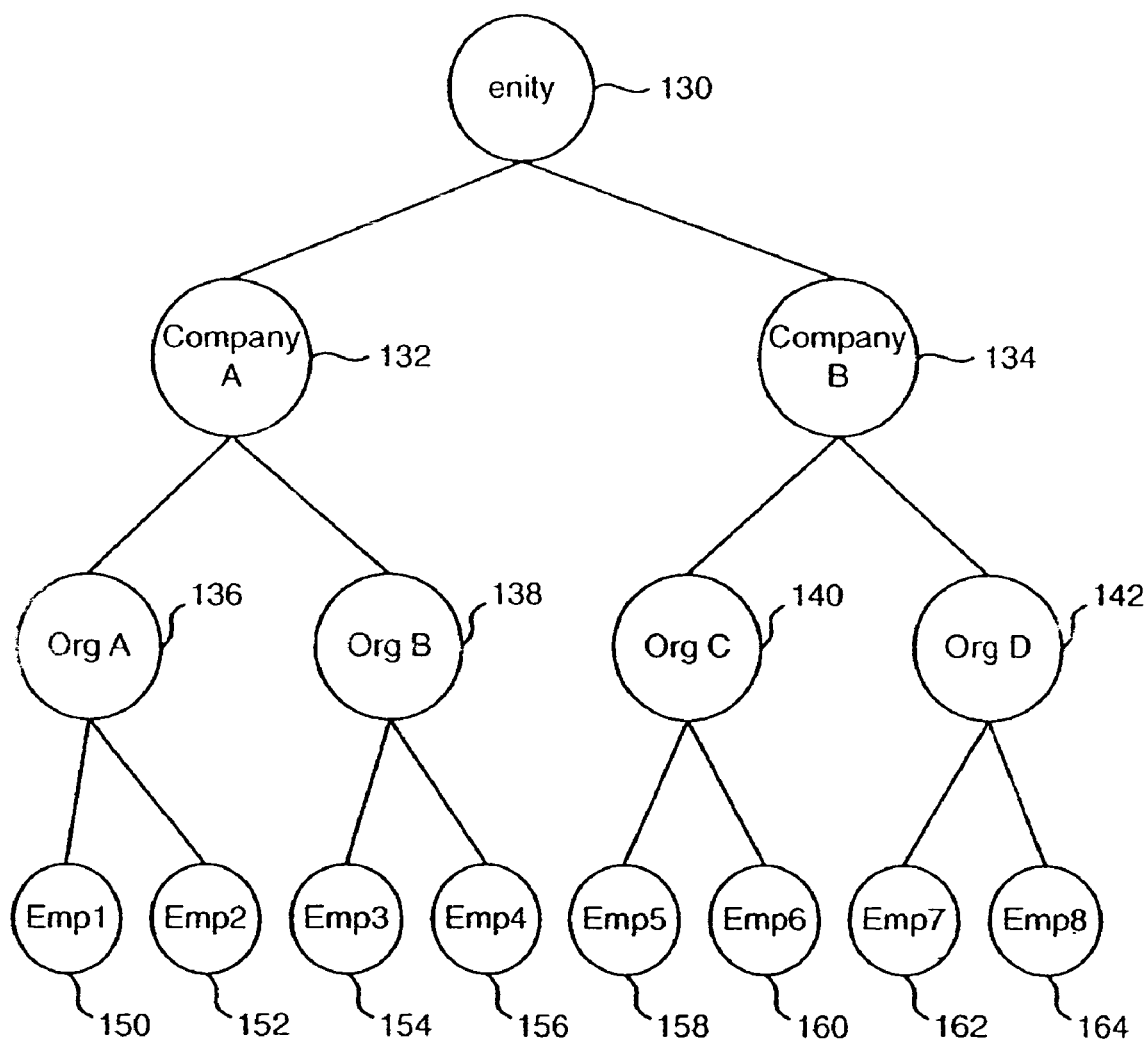
FIG. 4 is an example of a directory tree structure.

FIG. 4 depicts an exemplar directory tree that can be stored on Directory Server 36. Each node on the tree is an entry in the directory structure. Node 130 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 4 shows company A broken up into two organizations: organization A with node 136 and organization B with node 138. Company B is shown to be broken up into two organizations: organization C with node 140 and organization D with node 142. FIG. 4 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each node depicted in FIG. 4 can include one or more identity profiles stored in Directory Server 36. In one embodiment, there are different types of object-oriented classes for storing information for each identity profile. One exemplar class pertains to entities such as entity 130, company A (node 133), and company B (node 134). A second exemplar class stores information about organizational units such as organization A (node 136), organization B (node 138), organization C (node 140), and organization D (node 142). In one embodiment, each of the organizations are departments in a company and each of the users are employees who work for that particular organization. A third exemplar class is for individual persons such as employee 1 (node 150), employee 2, (node 152), . . . employee 8 (node 164). Although the directory tree is depicted as having three levels, more or less than three levels can be used.

In a typical use of the Identity Management System shown in FIG. 4, a source from the Identity Management System attempts to access a target in the Identity Management System. For example, employee 1 (node 150) may seek to access the profile for employee 4 (node 156). Thus, node 150 is the source and node 156 is the target. For efficiency purposes, one embodiment stores access information at the target and at the highest level for targets with common access rules. In some cases, access information is stored at a higher level even if a lower level does not include common access rules.

FIG. 5 is a flow chart describing the process for setting up an identity profile by an administrator having authority to do so. In step 200, the administrator selects the object class to be used for the directory entry or entries being created. As previously described, there are at least three classes: organization, organizational unit, and user. In step 200, the master identity administrator selects which class is to be used for the entry. After the object class is selected in step 200, all possible attributes for the particular class appear on a graphical user interface (GUI) (step 202). In step 204, the administrator selects one of the attributes. In step 206, the master identity administrator edits the access criteria for the attribute. In step 210, it is determined whether there are any more attributes to consider. If so, the method loops back to step 204. Otherwise, the process of FIG. 5 is completed (step 214).

FIG. 6 is a flow chart describing step 206 of FIG. 5, editing access criteria for an attribute. In step 230, the administrator selects where in the tree structure of FIG. 4 to store the access information for the particular attribute under consideration. For example, if the administrator is setting up an identity profile for employee 2 (node 152) of FIG. 4, attribute access information can be stored at node 152, node 136, node 132, or node 130. In step 230, it is determined which one of those available nodes will store the information. In step 232, the permissions to modify the attribute are set up using a policy. A policy can identify person(s) who can modify the attribute. The policy can identify a set of people by identifying a role, by identifying a rule for identifying people, by identifying one or more people directly by name, or by identifying a named group. In step 236, permissions are set up to determine who can view the attributes. The Identity Management System policy determines which users can view identity profile attributes by defining a role, defining a rule, identifying persons by name, or listing an identified group. In one embodiment, the rule mentioned above is an LDAP rule. In step 238 (an optional step), the ability to edit the permissions are delegated to others. In step 240, a notify list is set up. The notify list identifies a set of zero or more persons who are notified (e.g. by email) when the attribute is modified.

In one embodiment, the Identity Management System includes a localized access feature. This feature restricts certain user's access to identity profiles within a defined locale. For example, if an entity sets up an Extranet similar to the tree of FIG. 4, and allows two of its suppliers (e.g. company A and company B) to access the Extranet, company A may not want employees from company B to access identity profiles for employees of company A. In accordance with the present invention, a set of identity profiles can be defined as a locale. Users outside the locale can be restricted from accessing identity profiles inside the locale. Alternatively, users outside the locale can be restricted from accessing certain attributes of identity profiles inside the locale. The localized access feature can be used to prevent any nodes, including node 132 and any nodes below node 132, from accessing node 134 and any node below node 134. The localized access feature can be used at other levels of granularity and/or at other levels of the organizational hierarchy. For example, users below node 136 can be blocked from accessing profiles below node 138, node 140, node 142, node 134, etc.

FIG. 7 is a flow chart describing the process for configuring localized access. In step 262, a localized access parameter for the entire system of FIG. 1 is set. This parameter turns on the localized access function. In step 266 of FIG. 7, a class attribute can be set for localized access. Each identity profile has a set of attributes. One of those attributes is designated as the class attribute. The class attribute is used to identify the identity profile. A reference to a particular identity profile is a reference (or pointer) to the class attribute for the identity profile. The class attribute can be configured for localized access by setting up a localized access filter that identifies the locale. If the source of a request is in a different locale than the locale defined for the class attribute, then the source is denied access to the target. The localized access filter can be an absolute test such as "Company=Acme" or the filter can name another attribute (called a domain attribute). If the filter names a domain attribute (e.g. company attribute, address attribute, last name attribute, organization attribute, etc.), then the filter is satisfied if the named attribute for source matches the named attribute for the target. For example, if the domain attribute named for the class attribute is "Company Name," than a source can only access a target if the company name for the source is the same as the company name for the target. Using a domain attribute, rather than hard coding the criteria, is more dynamic because it depends on the run-time relationship of the source and target. In one embodiment, multiple domain attributes can be used to define the locale. Users whose domain attributes are equal, are in the same locale. A user can be a member of multiple locales.

In step 268, individual attributes for a profile can be configured for localized access. That is, some attributes in an identity profile can be configured for localized access, while other attributes are not. Each attribute can be provided with a localized access filter that identifies the locale for that attribute. The localized access filter can include an absolute test, an LDAP test or one or more domain attributes. In one embodiment, individual attributes are not configured in step 268 if the class attribute for the profile has already been set. It is possible to configure the class attribute for localized access and not configure the other attributes for localized access. Similarly, in some embodiments it is possible to not configure the class attribute for localized access while configuring the other attributes for localized access.

In one embodiment, when a source seeks to access a particular attribute in a target, the system first checks to see if the localized access filter for the class attribute of the target is satisfied. If it is not satisfied, then access is denied. If it is satisfied, then the system first checks to see if the localized access filter for the particular attribute of the target is satisfied.

If it is or it is not configured for localized access, then access can be granted. If the localized access filter for the particular attribute of the target is not satisfied, access to the particular attribute is denied. In summary, the localized access filter for the class attribute determines access to the entire identity profile, while the localized access filter for a specific attribute (other than the class attribute) determines access to the specific attribute. After the steps of FIG. 7 are completed, the profiles (or portions of profiles) that have been set for localized access can only be accessed by those within the same locale.

FIG. 8 is a flow chart describing the process for accessing data in the Identity Management System. The data can be accessed for viewing, modifying, etc. As described above, the entity attempting to access a profile in the Identity Management System is the source and the profile being accessed is the target. In step 290, the source user's browser sends a request to access attributes of a target directory entry. In step 292, the request is received by User Manager 38. In step 294, User Manager 38 accesses the target profile and the source profile on Directory Server 36. In step 296, User Manager 38, based on the attribute settings created or modified by the process of FIG. 5 and (possibly) the source profile, determines whether the source should have access to each of the different attributes of the target profile. This step is discussed in further detail below. In step 298, User Manager 38 passes the information for the attributes that access is allowed for to the source's browser. In step 300, the attributes that the source may view are displayed on the source's browser.

Figure 9:
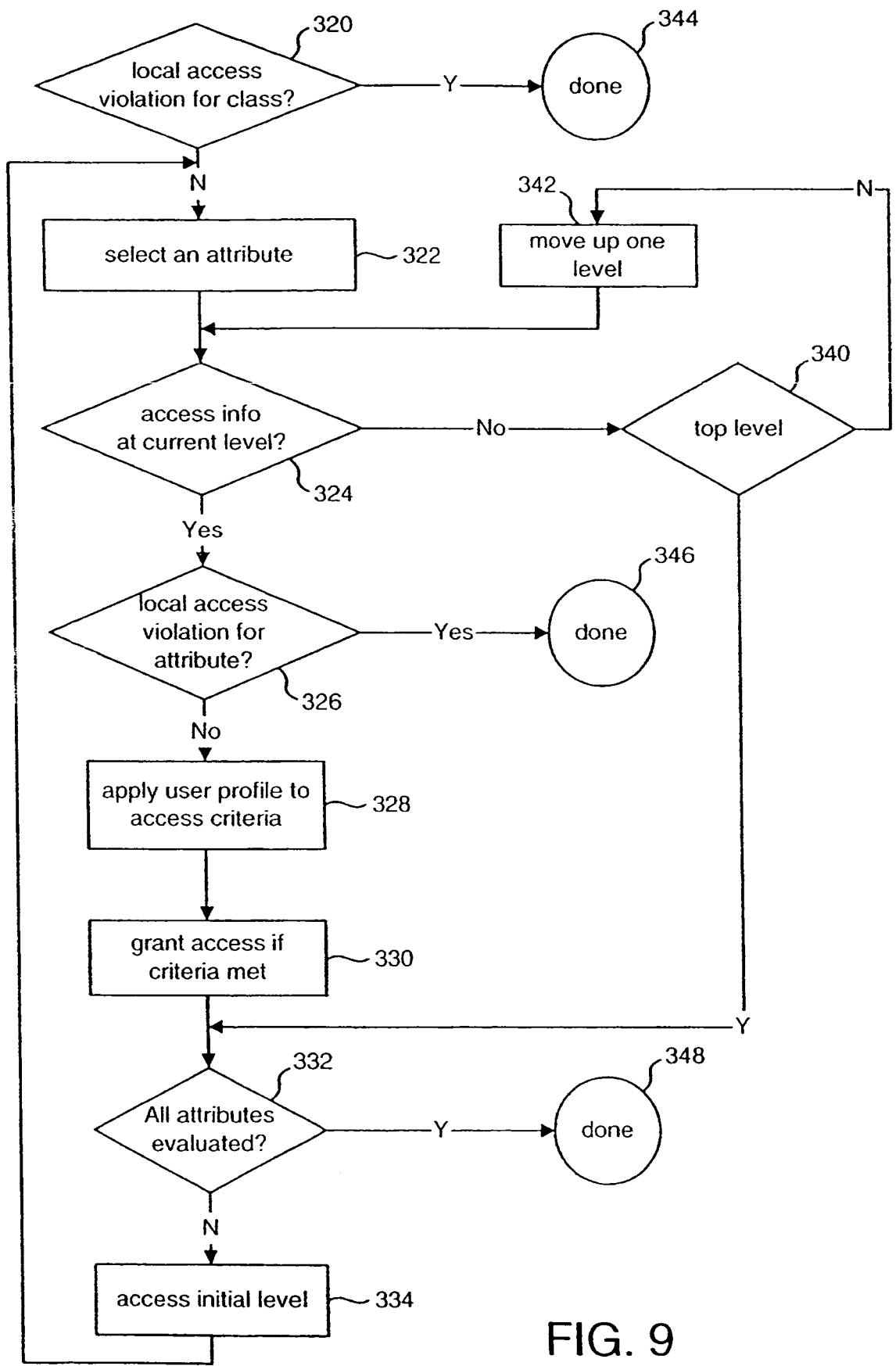
FIG. 9 is a flow chart describing a process for determining access to attributes of a target.

FIG. 9 is a flow chart describing the process of step 296 of FIG. 8, determining whether the source should have access to the various attributes of the target. In step 320, the system determines whether a localized access violation for the class attribute has occurred. A localized access violation is found when the target's class attribute is configured for localized access and the source is not in the locale for the target. If there is a localized access violation, the method of FIG. 9 is done (step 344) and none of the attributes for the target may be accessed by the source. For example, if the source is employee 1 (node 150 of FIG. 4), the target is employee 8 (node 164 of FIG. 4), and all of company B is subject to localized access with a domain attribute set as "company" (in one embodiment the actual syntax is %company%) a localized access violation will be found in step 320.

If no localized access violation is found in step 320, then one of the attributes for the target is selected in step 322 and User Manager 38 determines whether the access information for that selected attribute is at the current level in the tree. The first time step 324 is performed, the current level in the tree is the level of the target. As previously explained, access information can be stored at the target's node or nodes above the target. If the access information is not found at the current level, then in step 340, it is determined whether the system is inquiring at the top level of the directory structure (e.g. node 130 of FIG. 4). If the system is at the top level, then the system determines whether all attributes have been evaluated in step 332. If all attributes have been evaluated, then the process of FIG. 9 is done (step 348). If all attributes have not been evaluated, then the system accesses the initial level again in step 334 and loops back to step 322. If in step 340, it is determined that the system is not at the top level, then the system moves up one level (step 342) and loops back to step 324.

While in step 324, if the access information for the attribute is at the current level being considered, then in step 326 it is determined whether there is a local access violation for the attribute under consideration. If the particular attribute being considered was configured for localized access and the source is not in the relevant locale for the target, then a localized access violation occurs and the method of FIG. 9 is done (step 346). It will be appreciated that localized access can apply to entire profiles or only certain portions (certain attributes) of profiles. If the attribute under consideration was not configured for localized access, then there is no localized access violation for the attribute under consideration. If there is no localized access violation for the attribute under consideration, then the identity profile for the source is applied to any additional access criteria to see whether the source should have access to the target's attribute. If the criteria is met, access is granted in step 330 and the method loops to step 332. At the end of the process of FIG. 9, a source will be granted access to zero or more attributes. Step 300 of FIG. 8 displays only those attributes for which the source has been granted access.

Figure 10:
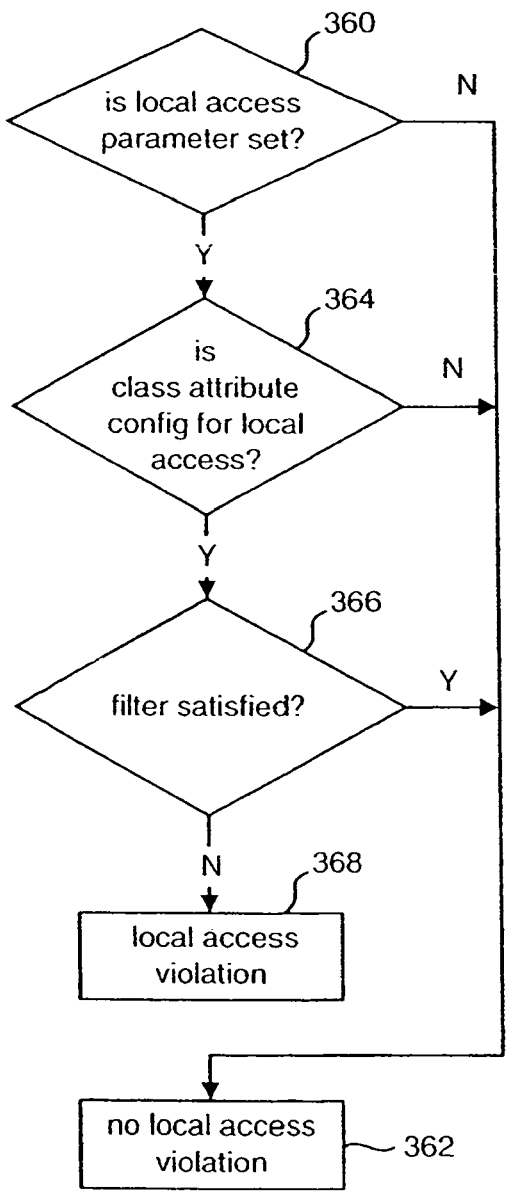
FIG. 10 is a flow chart describing a process for determining whether there is a localized access violation for a class.

FIG. 10 is a flow chart describing the process of step 320 in FIG. 9, determining whether a localized access violation has occurred for a class attribute. In step 360, the Identity Management System determines whether the localized access parameter is set. If not, there is no localized access violation. If so, then in step 364, the system determines whether a class attribute is configured for localized access. If the class attribute is not configured for localized access, there is no local access violation (step 362). If the class attribute is configured for localized access, then in step 366 it is determined whether the localized access filter is satisfied (e.g. does the domain attribute for the target must match the domain attribute for the source?). If the localized access filter is satisfied, no localized access violation occurs (step 362). If the localized access filter is not satisfied, then a localized access violation exists and access should be denied (step 368).

Figure 11:
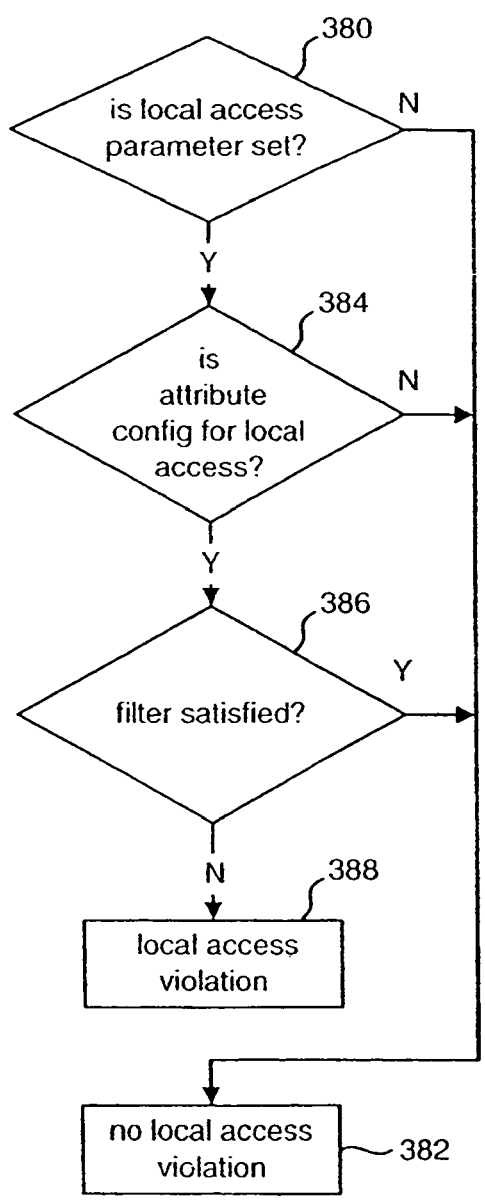
FIG. 11 is a flow chart describing a process for determining whether there is localized access for an attribute.

FIG. 11 is a flow chart describing the process performed in step 326 of FIG. 9, determining whether there is a localized access violation for a particular attribute. In step 380, it is determined whether a localized access parameter is set. If not, there is no localized access violation (step 382). Otherwise, in step 384, it is determined whether the particular attribute is configured for localized access. If the particular attribute is not configured for localized access, then there is no localized access violation (step 382). If the particular attribute is configured for localized access, then in step 386 it is determined whether the localized access filter for the attribute under consideration is satisfied. If the localized access filter is satisfied, then there is no localized access violation (step 382). If the localized access filter is not satisfied, then there is a localized access violation and access should be denied (step 388).

Figure 12:
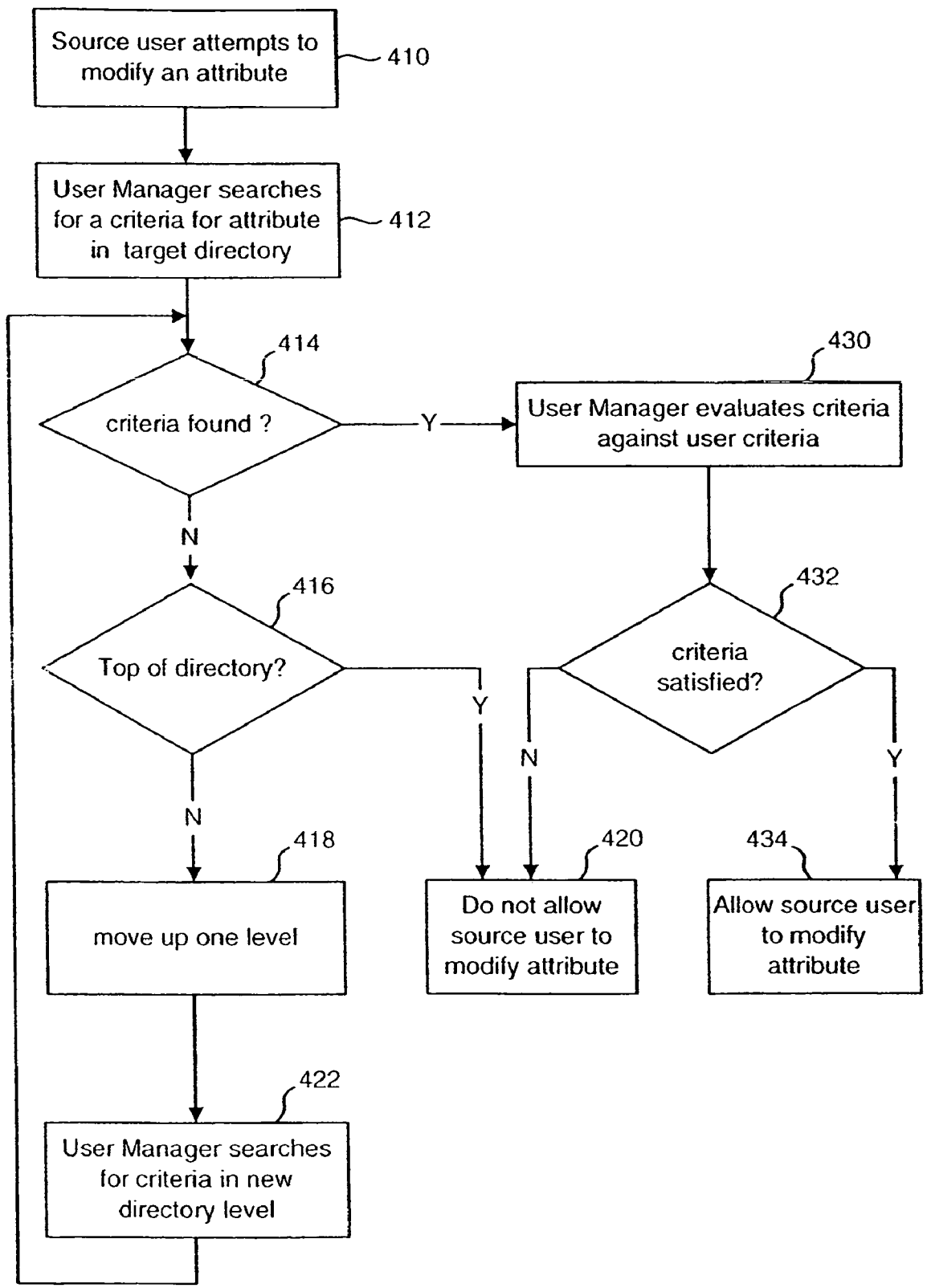
FIG. 12 is a flow chart describing a process for modifying an attribute.

FIG. 12 is a flow chart describing the process of how a source user can modify an attribute of a target profile. In step 410, the source user attempts to modify an attribute. For example, in one embodiment the source user is provided a GUI which depicts the directory tree. The source user can select any node in the directory tree and click on a button to modify a target profile. Alternatively, the source user can type in a URL, distinguished name, or other identifying information for the target. Once presented with a target profile (e.g. the process of FIG. 8), the user selects a particular attribute and attempts to modify it by selecting a modify button on the GUI. This request to modify is sent to User Manager 38. In step 412, User Manager 38 searches for the modify criteria for the attribute in the target directory. This modify criteria is the information set up in step 232 of FIG. 6. User Manager 38 searches in the current target directory. If the criteria is not found in the current directory being accessed (see step 414), then it is determined whether the system is at the top of the directory tree structure (step 416). If not, then the system moves up one level in step 418. If the top of the directory structure is reached, then the source user is not allowed to modify the attribute (step 420). In step 422, User Manager 38 searches for the modify criteria in a new directory. After step 422, the method loops back to step 414. If in step 414, it is determined that the criteria was found at the current level being considered, then in step 430, the User Manager evaluates the criteria against the target user's identity profile. If the identity profile for the target user satisfies the criteria for modifying the attribute (step 432) then the source user is allowed to modify the attribute (step 434). Otherwise, the source user is not allowed to modify the attribute (step 420).

Figure 13:
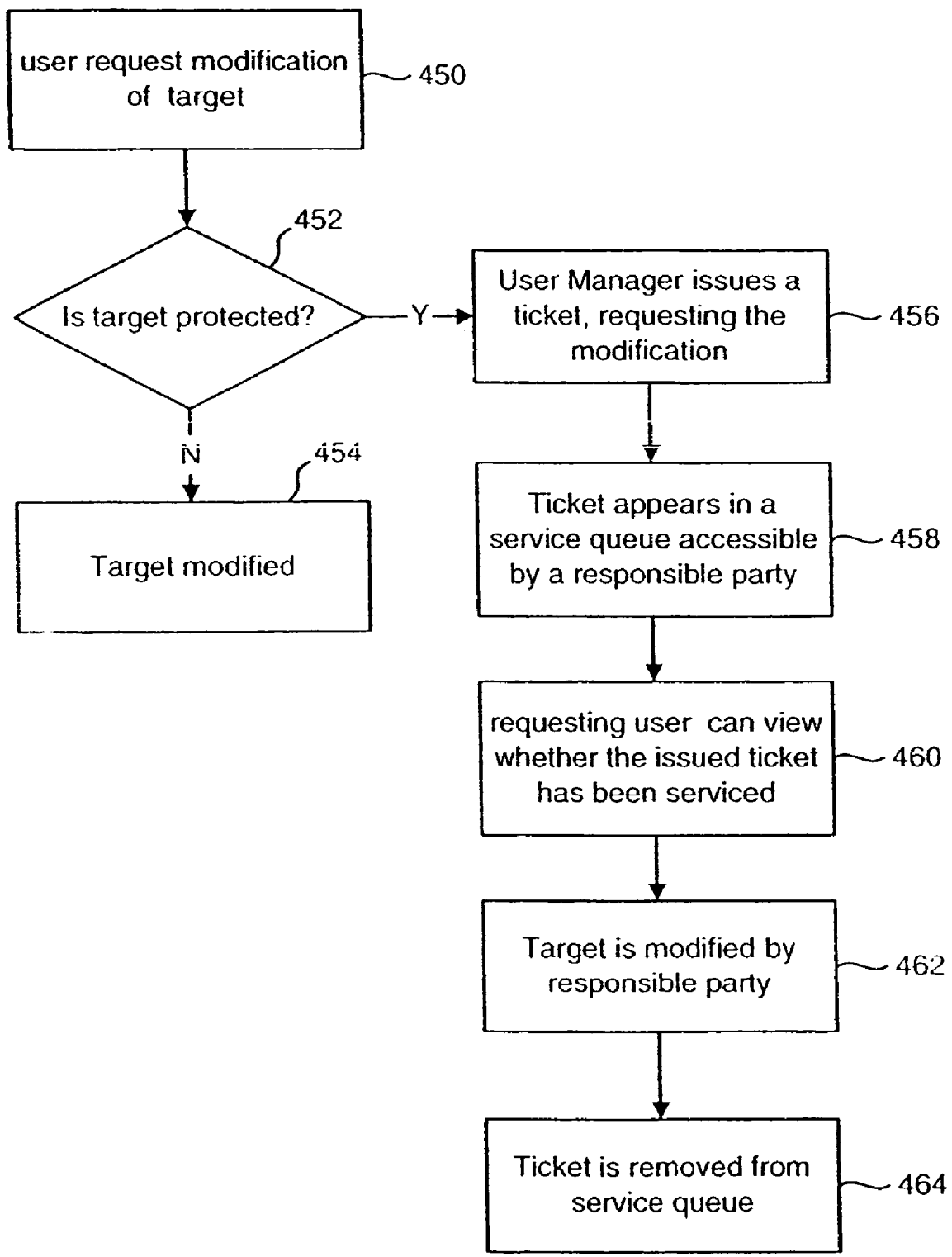
FIG. 13 is a flow chart describing the active automation process.

FIG. 13 is a flow chart describing a process for automating the updating of identity profiles when a source user requesting the update is not allowed to modify the target profile. In one embodiment, the source user is the person identified by the target profile. In step 450, the source user requests modification of the target profile. This can be a request to modify any or all of the attributes for the target profile (e.g. address, telephone number, creation of the profile, deletion of the profile, etc.). In step 452, it is determined whether the target profile is protected. It is possible to set all attributes such that any source entity can modify the attributes In such a configuration; the profile is not protected. If the target profile is not protected, then, in step 454, the target profile is modified as per the source user's request. If the target profile is protected, then in step 456, the User Manager 38 issues an electronic message ("ticket") sent to a responsible party requesting that the modification be made. The responsible party is a person granted access to modify a particular attribute and has the responsibility for doing so. In step 458, the ticket appears in a service queue accessible by the responsible party. The service queue can be a directory which stores all tickets or can be any database which is used to store the tickets. The responsible party may access a GUI which indicates all tickets in the service queue, the date they were received, and what service is requested. In step 460, the requesting source user can view whether a ticket has been serviced. In step 462, the ticket is fully serviced, partially serviced or denied by the responsible party. If the ticket is serviced, then the target will be modified. However, the target will not be modified if the ticket is denied. After the target is modified (or purposely not modified) and a ticket is responded to, the ticket is removed from the service queue in step 464. In an optional embodiment, the source is automatically notified that the ticket is removed from the service queue and notified of the result of the request.

Figure 14:
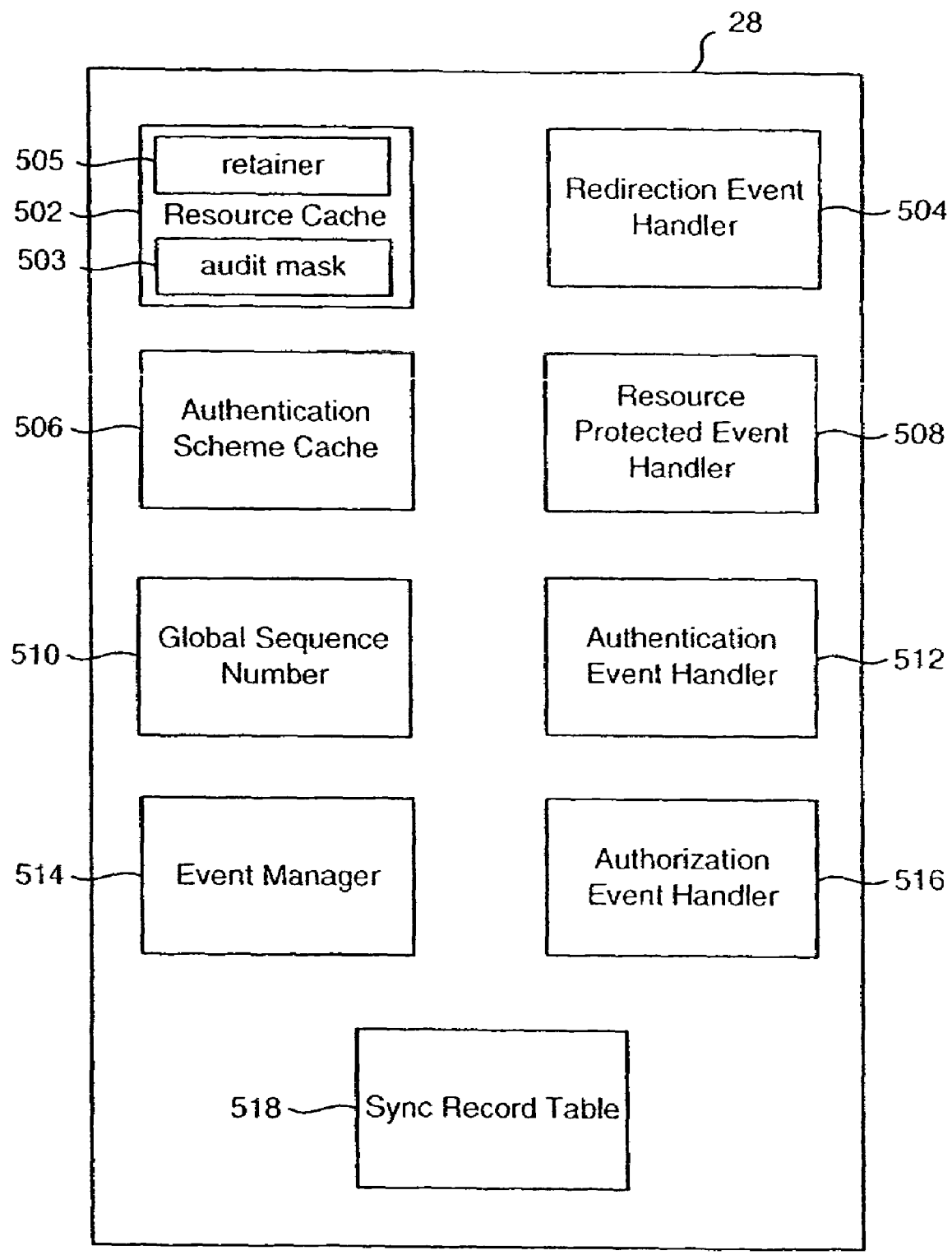
FIG. 14 is a block diagram depicting the components of a Web Gate.

FIG. 14 provides a block diagram of Web Gate 28. In one embodiment, Web Gate 28 is a Web Server plug-in running on Web Server 18. In another embodiment, Web Gate 28 is an NSAPI Web Server plug-in. In another embodiment, Web Gate 28 is an ISAPI Web Server plug-in. In still a further embodiment, Web Gate 28 is an Apache Web Server plug-in. In another embodiment, a plurality of Web Gates conforming to different plug-in formats are distributed among multiple Web Servers.

Resource cache 502 caches authentication information for individual resources. The information stored in resource cache 502 includes: request method, URL, retainer 505, and audit mask 503. In one embodiment of the present invention, audit mask 503 is a four bit data structure with separate bits identifying whether authentication and/or authorization successes and/or failures are audited (logged) for a given resource.

Authentication scheme cache 506 stores authentication scheme information, including information necessary for the performance of each different authentication challenge scheme. For example, if the authentication scheme ID parameter of a resource cache 502 entry references a "client certificate" authentication scheme, then the authentication scheme ID parameter of the entry would reference an authentication scheme cache 506 entry (keyed by the authentication challenge method ID). In one embodiment, authentication scheme cache stores redirect URL, authentication challenge method ID (identifying an authentication challenge method), challenge parameters for authentication and authentication level. Web Gate 28 also stores the most recent global sequence number 510 received from Access Server 34 pursuant to a cache flushing operation, as further described below.

Event manager 514 calls redirection event handler 504, resource protected event handler 508, authentication event handler 512, or authorization event handler 516 to perform redirection, a resource protected method, an authentication method, or an authorization method (all further described herein), respectively. Redirection event handler 504 redirects browser 12 or 14 in response to redirection events initiated by Access Server 34 or other components of Web Gate 28. Resource protected event handler 508 performs steps in a method for determining whether a requested resource falls protected within a policy domain. Authentication event handler 512 performs steps in a method for authenticating a user of browser 12 or 14 upon a finding that a requested resource is protected. Authorization event handler 516 performs steps in a method for determining whether a user of browser 12 or 14 is authorized to access a requested resource upon a successful authentication or receipt of a valid authentication cookie, further described herein. Sync record table 518 identifies all existing synchronization records not yet processed by Web Gate 28 as further described herein.

Figure 15:
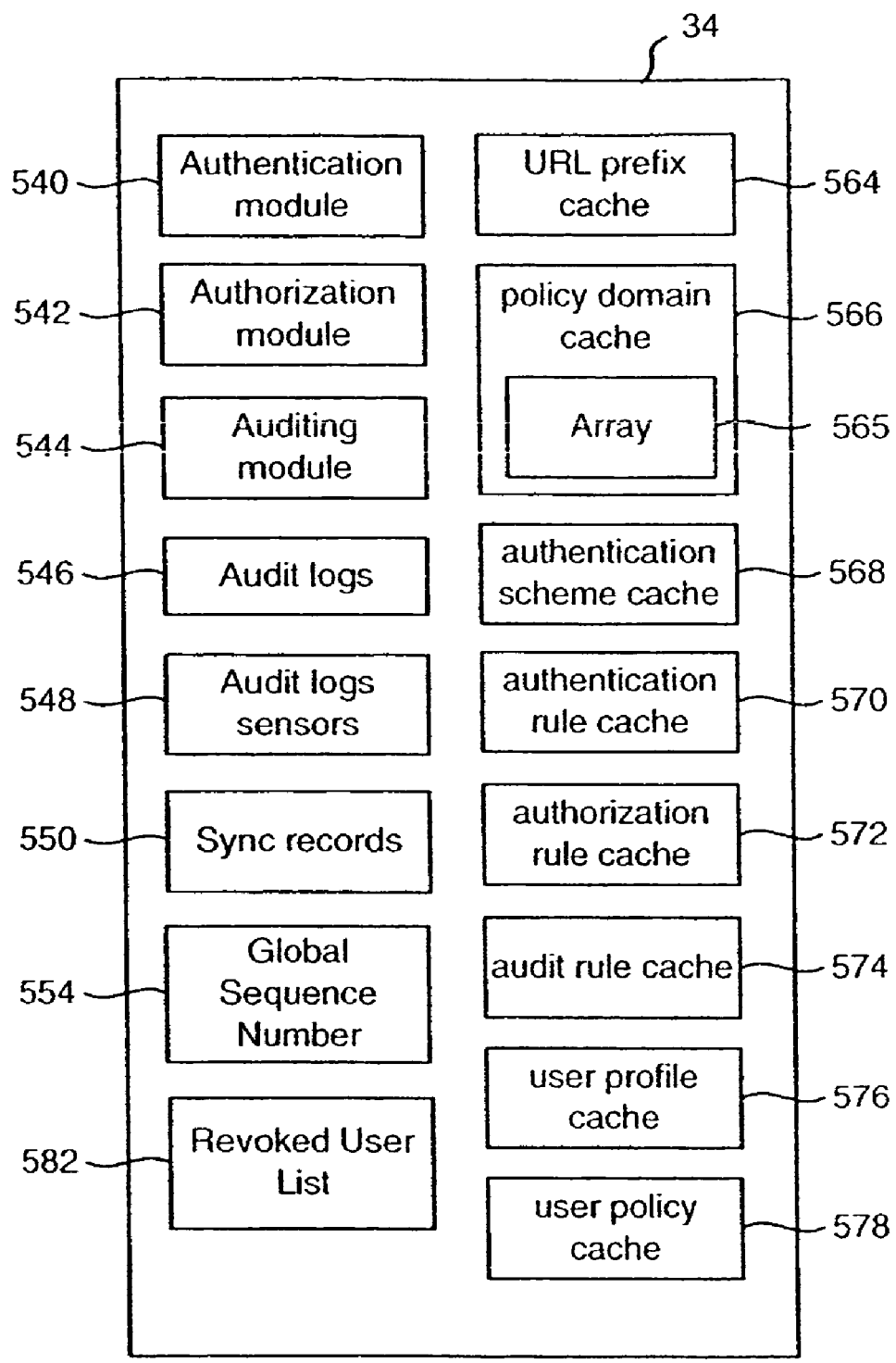
FIG. 15 is a block diagram depicting the components of an Access Server.

FIG. 15 provides a block diagram of Access Server 34. Authentication module 540 is provided for carrying out steps in a method for authenticating a user as further described herein. Authorization module 542 is provided for carrying out steps in a method for authorizing a user to access a requested resource as further described herein. Auditing module 544 carries out steps in a method for auditing (logging) successful and/or unsuccessful authentications and/or authorizations as further described herein. Audit logs 546 store information logged by auditing module 544 in accordance with the present invention. Audit logs sensors 548 include one or more sensors that monitor the audit logs for certain types of events. Synchronization records 550 are stored on Access Server 34 in accordance with a method for flushing caches as further described herein.

Access Server 34 stores the most recent global sequence number 554 received from Access Manager 40 pursuant to a cache flushing operation. URL prefix cache 564 stores the URL prefixes associated with policy domains that are protected by the Access Management System. URL prefix cache 564 facilitates the mapping of requested resources to policy domains, as further described herein. URL prefix cache 564 is loaded from Directory Server 36 upon initialization of Access Server 34.

Policy domain cache 566 caches all default authentication rules of each policy domain in accordance with the present invention. Policy domain cache further stores an array of rules 565 listing all default and resource-specific rules associated with resources in a given policy domain. Each rule entry in array 565 includes the ID of the rule and compiled information about the URL pattern (resource) to which the rule applies. Array 565 enables Access Server 34 to quickly find the first level default authentication, authorization, and auditing rules for a given policy domain, as well as second level rules (authentication, authorization, and auditing rules) associated with particular policies in the policy domain.

Authentication scheme cache 568 caches information necessary for the performance of different authentication challenge methods as similarly described above for authentication scheme cache 506 of Web Gate 28. Authentication rule cache 570 caches second level authentication rules associated with policies. The rules in authentication rule cache 570 are listed in array 565. Upon determining that a second level authentication rule exists and learning its ID (by looking in array 565), Access Server 34 can easily find the second level authentication rule in authentication rule cache 570. The second level rules are the rules associated with policies, discussed above.

Authorization rule cache 572 caches first level default authorization rules as well as second level authorization rules. The rules in authorization rule cache 572 are listed in array 565. Upon determining that a first or second level authorization rule exists and learning its ID (by looking in array 565), Access Server 34 can easily find the applicable authorization rule for a given resource in authorization rule cache 572.

Audit rule cache 574 caches first level default audit rules as well as second level audit rules. The rules in audit rule cache 574 are listed in array 565. Upon determining that a first or second level audit rule exists and learning its ID (by looking in array 565), Access Server 34 can easily find the applicable audit rule for a given resource in audit rule cache 574.

User profile cache 576 stores identity profile attributes previously used in authentications, authorization, or audit steps, in accordance with the present invention. User policy cache 578 stores the successful and unsuccessful authorization results for specific users requesting specific resources governed by authorization rules based on an LDAP filter or a group membership. User policy cache 578 allows Access Server 34 to quickly recall a user's authorization if the user has recently accessed the resource.

Figure 16:
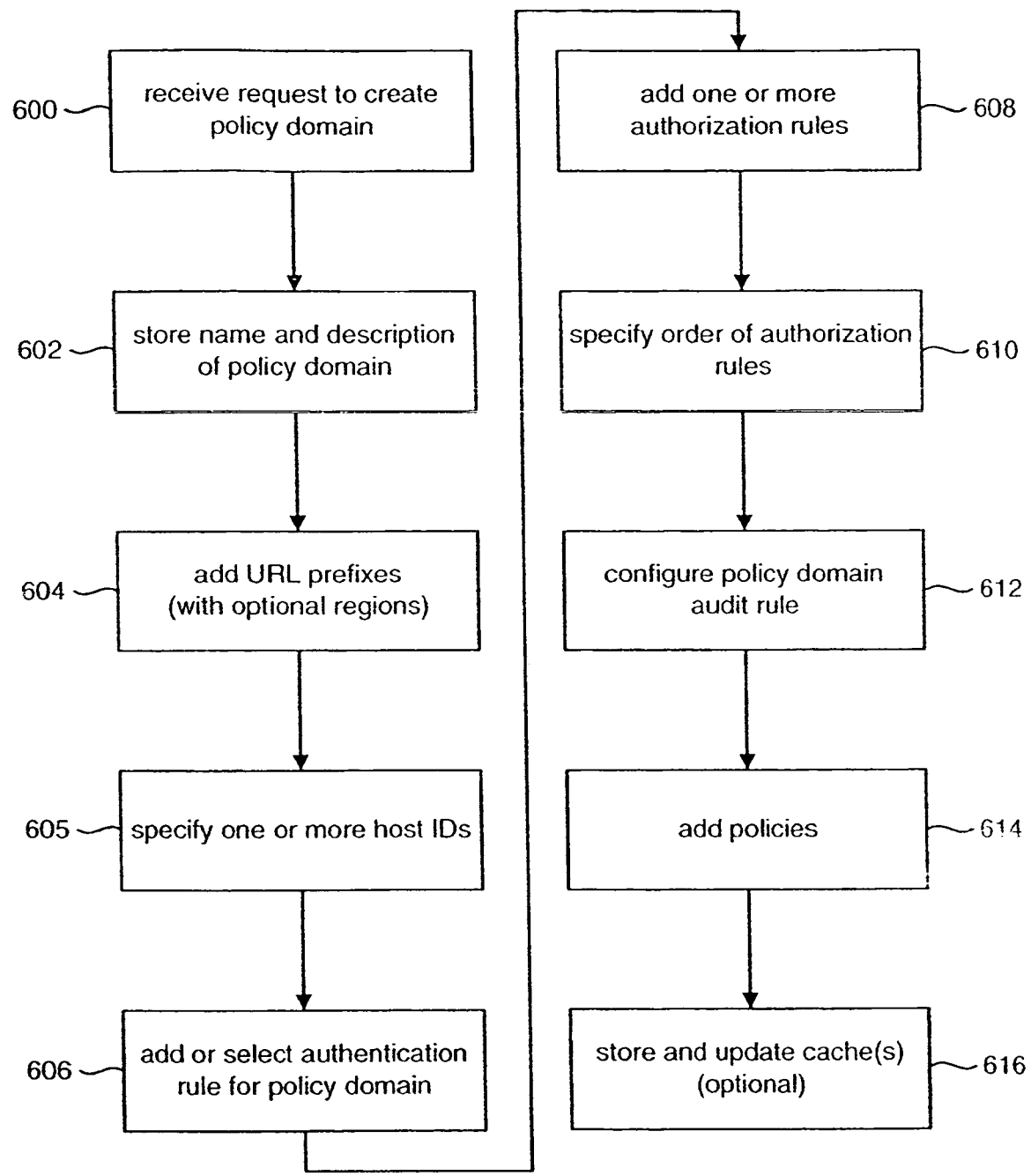
FIG. 16 is a flow chart describing a process for creating a policy domain.

FIG. 16 is a flow chart which describes the process of creating a policy domain. In step 600, System Console 42 (or Access Manager 40) receives a request to create a policy domain. In step 602, the name of the policy domain and the description of the policy name are stored. In step 604, one or more URL prefixes are added to the policy domain. In step 605, one or more host ID's are added to the policy domain (optional). Next, one or more access rules are added to the policy domain. An access rule is a rule about accessing a resource. Examples of access rules include authorization rules, authentication rules, auditing rules, and other rules which are used during the process or attempting to access a resource. In step 606, a first level (default) authentication rule is added to the policy domain. In general, authentication is the process of verifying the identity of the user. Authentication rules specify the challenge method by which end users requesting access to a resource in the policy domain must prove their identity (authentication). As previously discussed, first level (default) authentication rules apply to all resources in a policy domain, while second level authentication rules are associated with policies that apply to subsets of resources or specific resources in the policy domain. In one embodiment, there is only one default authentication rule for a policy domain. If an administrator desires an authentication rule to apply to only a specific resource in the policy domain, a separate policy for that specific resource having a second level (specific) authentication rule should be defined, as discussed below. After setting up the authentication rule in step 606, one or more first level or default authorization rules are added to the policy domain in step 608. In general, an authorization rule determines who can access a resource. The default authorization rule allows or denies users access to resources within its applicable policy domain. If multiple authorization rules are created, then they are evaluated in an order specified in step 610. In step 612, a first level (default) audit rule is configured for the policy domain. In step 614, zero or more policies are added to the policy domain. In step 616, the data for the policy domain is stored in Directory Server 36 and appropriate caches (optional) are updated. In one embodiment, an authorization rule or an authentication rule can be set up to take no action. That is, always grant authentication without any challenge or verification; or always grant authorization without any verification.

Figure 17:
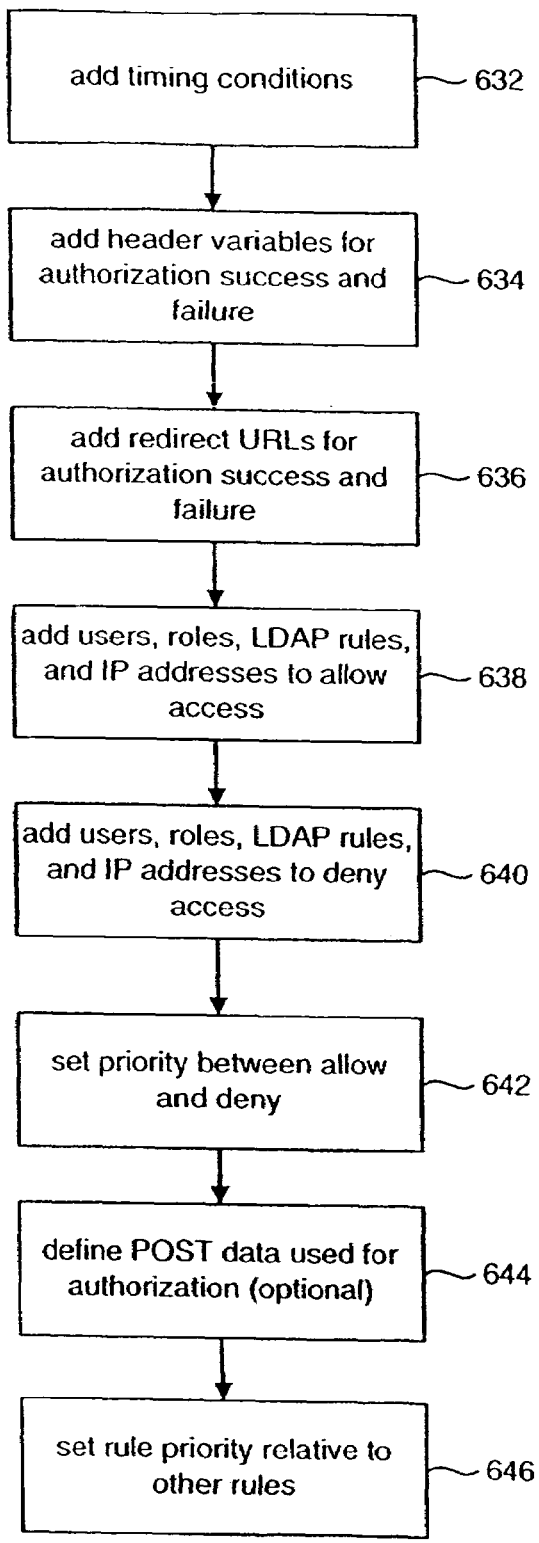
FIG. 17 is a flow chart describing a process for adding an authorization rule.
Figure 40:
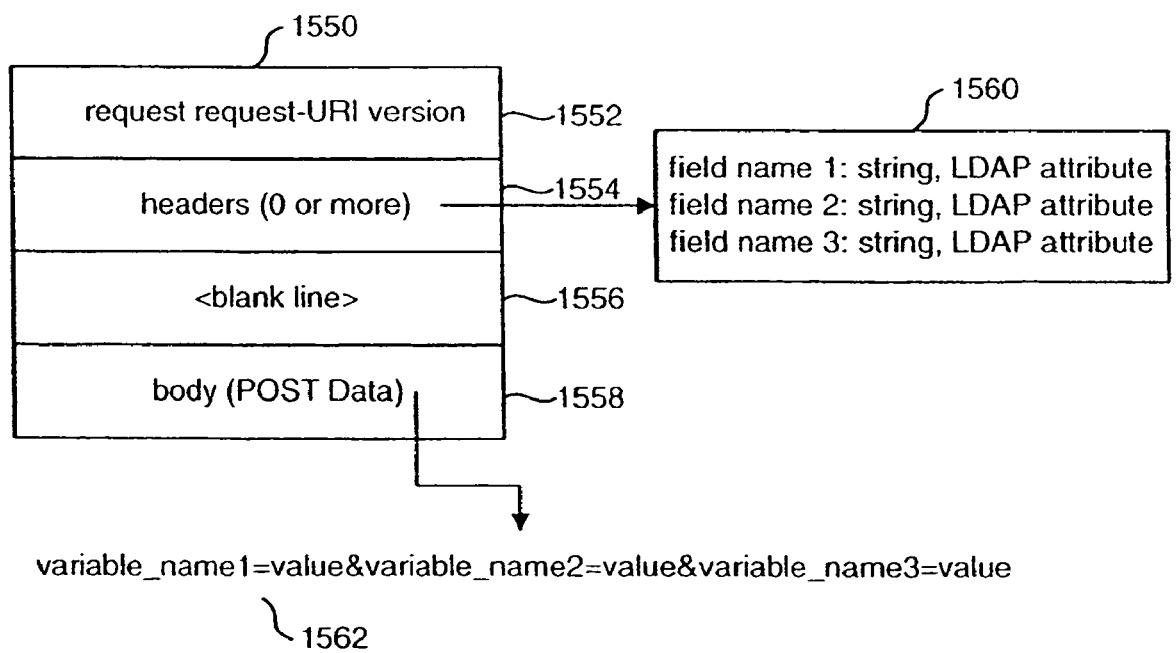
FIG. 40 is a block diagram of an exemplar HTTP request.

FIG. 17 is a flow chart describing the process of adding one or more authorization rules to a policy domain (step 608 of FIG. 16). In step 632, timing conditions are set up for the authorization rule. Timing conditions restrict the time when the authorization rule is in effect. For example, users can be allowed access to URLs in the policy domain only during business hours, Monday through Friday. In one embodiment, if timing conditions are not set, the authorization rule is always in effect. The timing conditions include selecting a start date, an end date, selecting a start time and an end time, selecting the months of the year, selecting the days of the month, and selecting the days of the week that the rule is valid. In steps 634 and 636, authorization actions are set up. Authorization actions personalize the end user's interaction with the Web Server. In step 634, header variables are provided for authorization success events and authorization failure events. This feature allows for the passing of header variables about the end user (or other information) to other web-enabled resources. Web-enabled applications can personalize the end user's interaction with the Web Server using these header variables. As a simple example, the actions could supply each application with the user's name. An application could then greet the user with the message "hello <user's name>" whenever the user logs on. Header variables are variables that are part of an HTTP request. FIG. 40 below illustrates the format of an HTTP request that includes header variables 1554. If an authorization rule is set up with header variables as part of an authorization success action, then when a successful authorization occurs the HTTP request to the resource will include the header variables. Similarly, if there are header variables for an authorization failure, then an authorization failure event will include adding header variables to the HTTP request that redirects a browser to an authorization failure web page. The resources identified by the HTTP requests, that include the header variables can use the header variables any way desired. In one embodiment of the method of FIG. 17, one or more groups can be specified for authorization to the resource(s).

Figure 18:
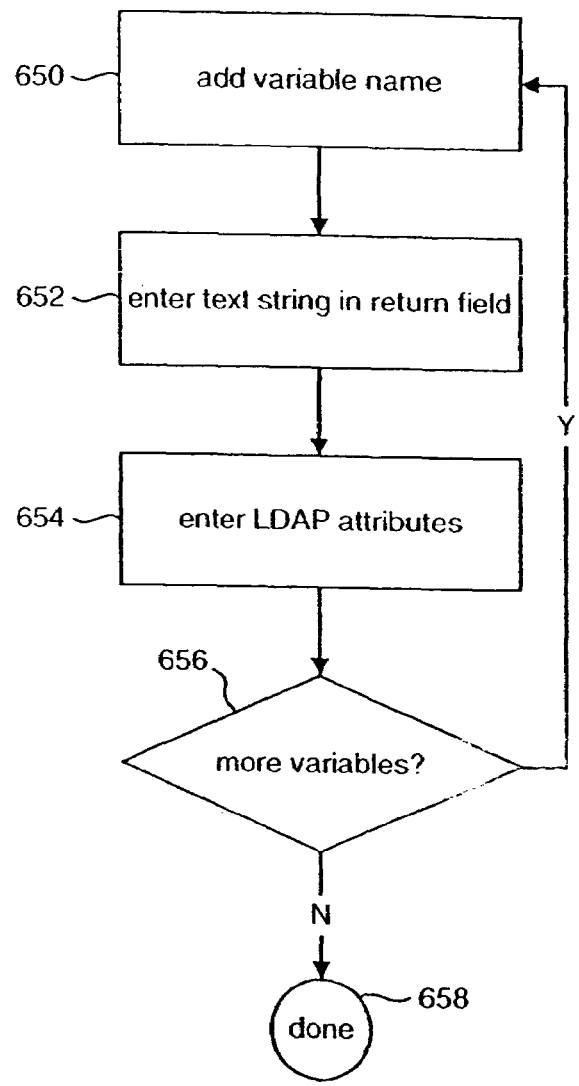
FIG. 18 is a flow chart describing a process for adding header variables to an HTTP request.

FIG. 18 is a flow chart that describes the process of adding header variables to an HTTP request (see step 634 of FIG. 17). Header variables can be added during an authorization success event, authorization failure event, authentication success event or authentication failure event. In step 650, the variable name is entered. In step 652, a text string is entered. In step 654, one or more LDAP attributes are entered. In step 656, it is determined whether any more header variables will be added. If not, the method of FIG. 18 is done (step 658). If so, the method of FIG. 18 loops back to step 650.

The variable name entered in step 650 is a value that appears in the HTTP header that names the variable. The downstream resource using the header variable will search for the variable name. The string entered is data that can be used by the downstream resource. The LDAP attribute(s) can be one or more attributes from the requesting user's identity profile. Thus, in the simple authorization success example described above, the variable name field can include "authorization success," the return field can include "yes," and the attribute field can include the name attribute for the user in the user's identity profile. Any of the attributes from the user's identity profile can be selected as a header variable.

Looking back at FIG. 17, in step 636, a redirect URL can be added for an authorization success event and a redirect URL can be entered for an authorization failure event. Step 638 includes specifying which users are allowed to access the resource associated with the authorization rule. By default, users cannot access a resource until they are granted access rights to it. In one embodiment, there are at least four means for specifying who can access a resource. The first means is to explicitly name a set of users who can access the resource. A second means includes identifying user roles. The third means is to enter an LDAP rule that can be used to identify a set of users based on a combination of one or more attributes. A fourth means is to enter an IP address which will allow users of computers having the specified IP address to access the resource. Step 640 is used to specify the users not allowed to access the resource associated with this rule. Identification of users, roles, LDAP rules, and IP addresses are entered in step 640 in the same manner as entered in step 638. It is possible that a particular user can be subject to both an allow access rule and a deny access rule. Step 642 is used to set a priority between such rules. Optional step 644 is used to define any POST data to be used for authorization if this feature is implemented. An HTTP POST request can include POST data in the body of the HTTP request (see FIG. 40 below). POST data can also be submitted in query string form. One embodiment of the present invention allows POST data to be used for authorization purposes. In optional step 644, an administrator defines which POST data is to be used for authorization purposes. If POST data is to be used for authorization, in order for an authorization rule to be satisfied, the POST request must include all the appropriate POST data and values for that POST data as defined in step 644. However, it will be understood that POST data need not be used for authorization in all embodiments of the present invention. Step 646 is used to set a priority of evaluation for the authorization rule relative to other authorization rules in a given policy. In one embodiment, if multiple authorization rules apply to a resource, this priority determines the order of evaluation.

Figure 19:
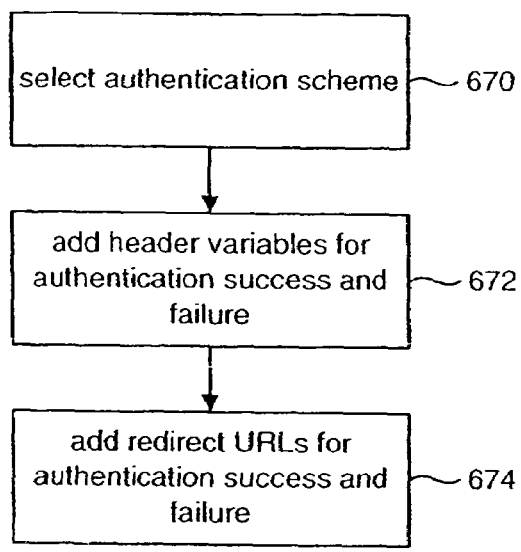
FIG. 19 is a flow chart describing a process for adding an authentication rule.

FIG. 19 is a flow chart describing the process for adding an authentication rule (see step 606 of FIG. 16). In step 670, a challenge scheme (also called an authentication scheme) is selected. An authentication scheme is a method for requesting log-on information (e.g. name and password) from end users trying to access a web resource. Within an authentication scheme is a challenge method (e.g. Basic, certificate or form). There can be more than one authentication scheme with the same challenge method (e.g. Basic over LDAP, Basic over NT Domain, . . . ). Various other authentication schemes can also be used. In step 672, header variables are added for authentication success and authentication failure events. In step 674, redirect URLs are added for authentication success events and authentication failure events.

Figure 20:
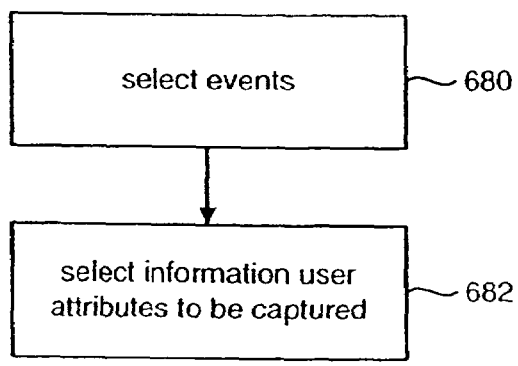
FIG. 20 is a flow chart describing a process for configuring an audit rule.

FIG. 20 provides a flow chart depicting the process for configuring an audit rule (see step 612 of FIG. 16). In step 680, the events to trigger an audit are selected. In one embodiment, authentication success, authentication failure, authorization success and authorization failure can be selected for auditing. In step 682, the information to be logged is selected for each particular event identified in step 680. The information logged can include information about the event and/or user attributes from the identity profile for the user requesting the authentication or authorization.

Figure 21:
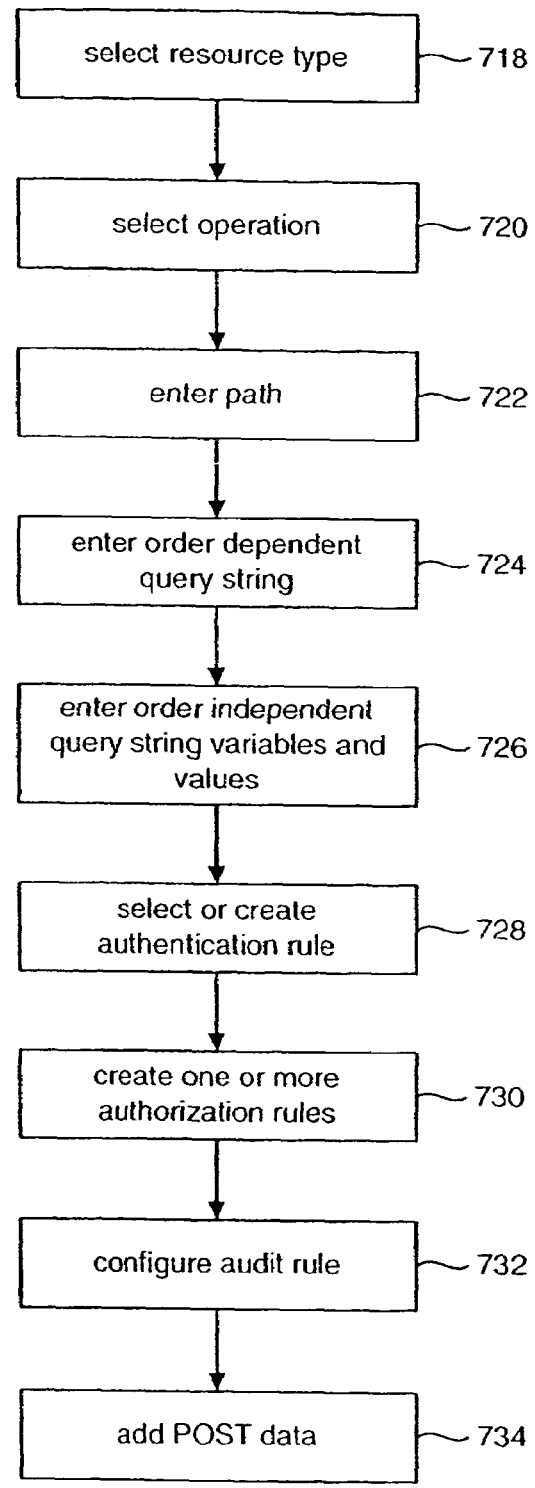
FIG. 21 is a flow chart describing a process for creating a policy.

FIG. 21 is a flow chart describing the process of adding a policy (see step 614 of FIG. 16). In step 718, a resource type is specified. The resource type allows different resources to be handled by different policies, depending on the nature of the resource itself. For example, in one embodiment, the resource type will distinguish between resources accessed using HTTP and resources accessed using FTP. In another embodiment, Enterprise Java Beans (EJBs) are a possible resource type. In another embodiment, user-defined custom resource types are supported. In step 720, an operation type is specified. This allows different resources to be handled by different policies, depending on the operations used to request the resource. In one embodiment, the operations will be HTTP requests. Supported HTTP request methods include GET, POST, PUT, HEAD, DELETE, TRACE, OPTIONS, CONNECT, and OTHER. In another embodiment, if EJBs are identified as the resource type (step 718), an EXECUTE operation can be specified in step 720. In another embodiment, user-defined custom operations are supported. In step 722, a pattern for the URL path to which the policy applies is specified. This is the part of URL that does not include the scheme ("http") and host/domain ("www.oblix.com"), and appears before a '?' character in the URL. In step 724, a query string is specified. This is a set of variables and values that must be included in the specified order in an incoming URL for the policy to match and be activated. For example, in the URL "HTTP://www.zoo.com/animals.cgi?uid=maneaters&tigers=2" the values after the question mark (e.g. "uid=maneaters&tigers=2") comprise a query string. Only a URL exhibiting the query string can match to this policy. For example, a URL with the "tigers" variable appearing before the "uid" variable will not match the above-identified policy. In step 726, query string variables are added. Query string variables include a name of a variable and the variable's corresponding value. Query string variables are used when it is a desirable that multiple variables are found in the query string, but the order is unimportant. Thus, for a policy with query string variables "uid=maneaters" and "tigers=2," a URL with a query string having the appropriate uid and appropriate tigers variable, in any order, will match the policy. In order for a resource URL to apply to a policy, the path of the requested resource URL must match the path of the policy as well as any query string or query variables. As discussed above, POST data can be submitted in query string form (for example, in a form submission), and evaluated using the query string variables entered in step 726.

The query string or query variables specified in the steps of FIG. 21 do not need to uniquely identify a resource. Rather, they are used to identify a policy, which may apply to one or more resources.

Typically, the query data is added to a URL to access certain data from a resource. However, the query data can be used in the URL to identify the resource. Each application or resource is free to use the query data in any way that is in agreement with standards and norms known in the art.

In step 728 of FIG. 21, the authentication rule is created in accordance with the method of FIG. 19. In step 730, one or more authorization rules are created for the policy in accordance with the method of FIG. 17. In step 732, an audit rule for the policy is configured in accordance with the method of FIG. 20. In step 734, POST data (optional) is added to the policy. This POST data is used to map resources with policies.

The present invention supports the use of multiple authentication schemes. An authentication scheme comprises an authentication level, a challenge method, an SSL assertion parameter, a challenge redirect parameter, and authentication plug-ins. The authentication level represents an arbitrary designation of the level of confidence that an administrator has in a particular authentication scheme relative to other authentication schemes.

In one embodiment of the present invention, an authentication scheme can specify one of four challenge methods: none, basic, form, and X.509. If an authentication scheme's challenge method is set to "none," no authentication is required to access a requested resource, thus allowing support for unauthenticated users. This challenge method can be used over both unsecured as well as SSL connections. The "basic" challenge method can also be used over both unsecured and SSL connections. The "X.509" challenge method can only be used over an SSL connection between a user's browser and Web Server host, because the authentication method invoked for an X509 challenge method is part of the SSL protocol. A "form" challenge method employs a custom, site-specific HTML form presented to the user, who enters information and submits the form. Subsequent processing is determined by the administrator at the time the authentication scheme is created. Form challenge methods can be used over both unsecured and SSL connections.

The SSL parameter of an authentication scheme identifies whether SSL is to be asserted on the connection to the user's browser by the Web Server. The challenge parameter identifies where to redirect a request for authentication for the particular authentication scheme. Authentication plug-ins are necessary for processing the user's supplied information. Authentication plug-ins can interface with Access Server 34 through an authentication API.

An authentication scheme that an attacker can easily and profitability eavesdrop upon is typically considered "weak." In one embodiment, the basic authentication challenge method places the user's credential (supplied information), a simple password, "in the clear" over an unsecured network connection. However, the authentication scheme can be made stronger by passing the user's credential over an encrypted connection, such as SSL. In one embodiment, given two authentication schemes (one with and one without SSL), an access administrator will assign the authentication scheme without SSL to a lower authentication level than the authentication using SSL.

When a user first request a protected resource, the user is challenged according to the authentication scheme defined by the fist level authentication rule in the applicable policy domain or the second level authentication rule in the applicable policy associated with the requested resource. If the user satisfies the authentication rule, an encrypted authentication cookie is passed to the user's browser indicating a successful authentication. Once authenticated, the user may request a second resource protected by a different policy domain and/or policy with a different authentication rule. The user will be allowed access to the second resource without re-authenticating if the authentication level of the authentication scheme used to successfully authenticate for the first resource is equal to or greater than the authentication level of the authentication scheme of the second resource. Otherwise, the user is challenged and asked to re-authenticate for the second resource in accordance with the second resource's higher level authentication scheme. Satisfaction of a higher or lower authentication level is determined by evaluating the authentication cookie sent by the user's browser when requesting the second resource. In one embodiment of the present invention, administrators can define an unlimited number of authentication levels.

Once authenticated, a user can explicitly log out, causing authentication cookies cached (or otherwise stored) by the user's browser to be destroyed or become invalid. Authentication cookies can also be set by an administrator to be destroyed after a maximum idle time has elapsed between requests to resources protected in accordance with the present invention.

Figure 22:
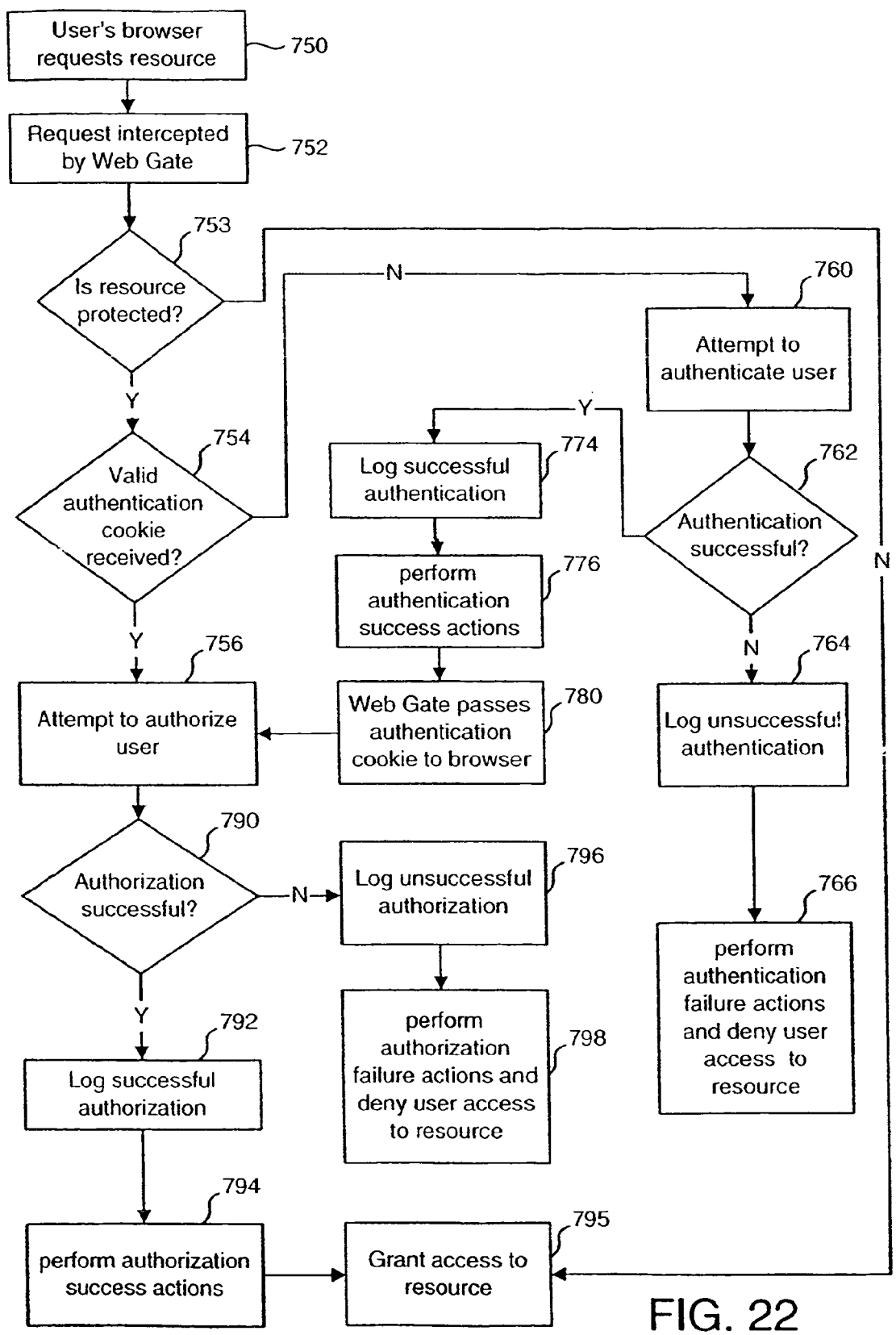
FIG. 22 is a flow chart describing an exemplar process performed by the Access System of one embodiment of the present invention.

FIG. 22 provides a flow chart for one embodiment of a method for authenticating, authorizing, and logging. In step 750, a user's browser 12 requests a web-enabled resource 22 or 24. The request is intercepted by Web Gate 28 in step 752. The method then determines whether the requested resource is protected by an authentication and/or authorization rule in step 753. If the resource is not protected, then access is granted to the requested resource in step 795. If the requested resource is protected however, the method proceeds to step 754. If the user has previously authenticated for a protected resource in the same domain, a valid authentication cookie will be passed by browser 12 with the request in step 750 and intercepted by Web Gate in step 752. If a valid cookie is received (step 754), the method attempts to authorize the user in step 756. If no valid authorization cookie is received (step 754), the method attempts to authenticate the user for the requested resource (step 760).

If the user successfully authenticates for the requested resource (step 762), then the method proceeds to step 774. Otherwise, the unsuccessful authentication is logged in step 764. After step 764, the system then performs authentication failure actions and Web Gate 28 denies the user access to the requested resource in step 766. In step 774, the successful authentication of the user for the resource is logged. The method then performs authentication success actions in step 766. In response to the successful authentication, Web Gate 28 then passes a valid authentication cookie to browser 12 in step 780 which is stored by browser 12. After passing the cookie in step 780, the system attempts to authorize in step 756.

In step 756, the method attempts to determine whether the user is authorized to access the requested resource. If the user is authorized (step 790), the method proceeds to step 792. Otherwise, the unsuccessful authorization is logged in step 796. After step 796, the method performs authorization failure actions (step 798) and Web Gate 28 denies the user access to the requested resource. If authorization is successful (step 790), then the successful authorization of the user is logged in step 792, authorization success actions are performed in step 794, and the user is granted access to the requested resource in step 795. In one embodiment of step 795, some or all of HTTP request information is provided to the resource.

Figure 23:
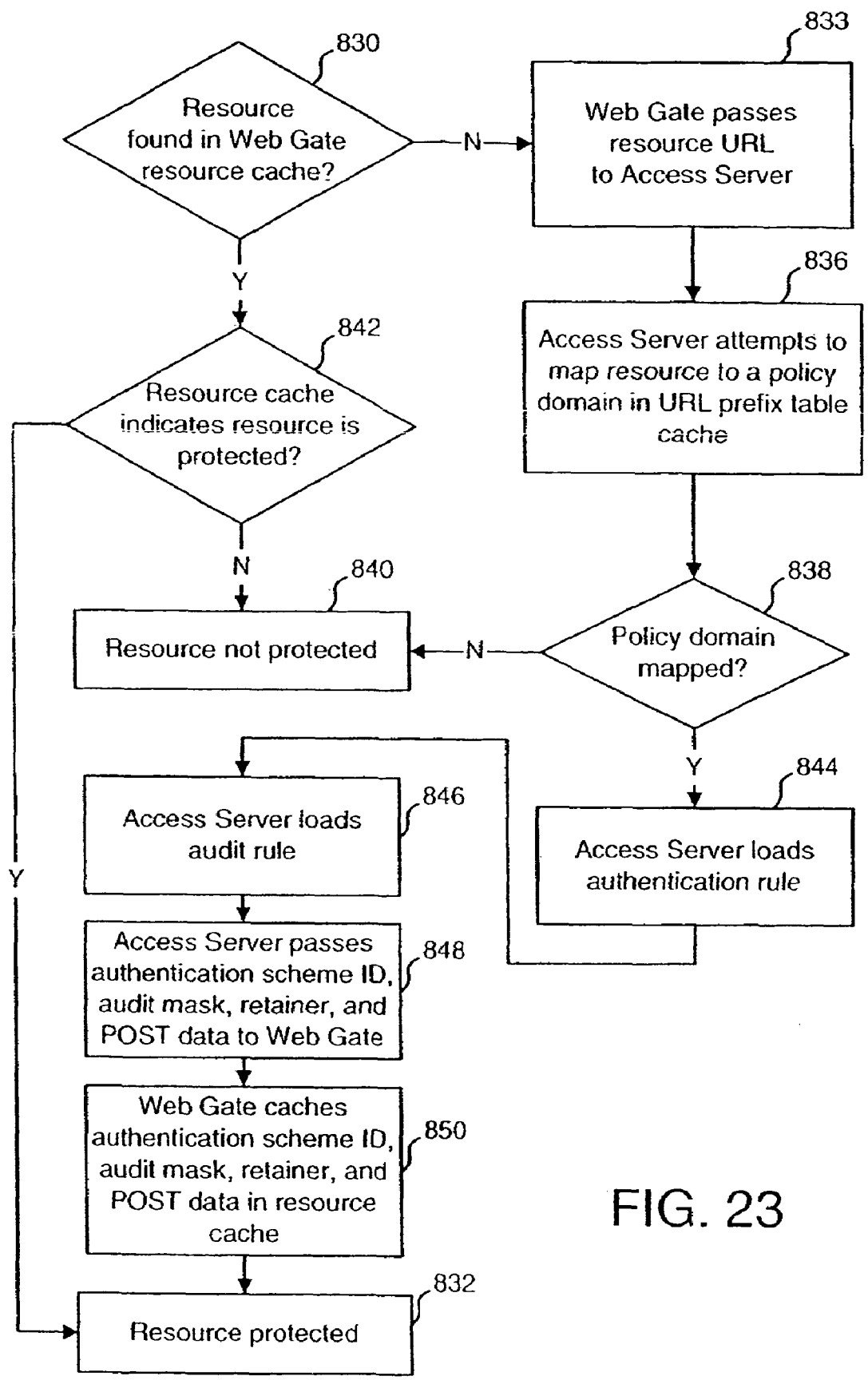
FIG. 23 is a flow chart describing a process for determining whether a particular resource is protected.

FIG. 23 provides a flow chart of a method for determining whether a requested resource is protected (see step 753 of FIG. 22). In one embodiment, the steps of FIG. 23 are performed by resource protected event handler 508 and Access Server 34. In step 830, Web Gate 28 determines whether an entry for the requested resource is found in resource cache 502. If an entry is found, the cache entry is examined in step 842 to determine whether the cache entry indicates that the resource is protected (step 832) or unprotected (step 840). If an entry for the requested resource is not found in resource cache 502, then Web Gate 28 passes the URL of the requested resource request method to Access Server 34 in step 833. Access Server 34 attempts to map the requested resource to a policy domain using URL prefix cache 564 (step 836).

If mapping step 836 is unsuccessful (step 838), then the requested resource is deemed to be unprotected (step 840). However, if a successful mapping has occurred (step 838), then Access Server 34 retrieves the authentication rule (step 844) and audit rule (step 846) associated with the requested resource. Access Server 34 then passes the authentication scheme ID from the authentication rule, audit mask 503, retainer 505 and any POST data received to Web Gate 28 in step 848. Web Gate 28 caches the authentication scheme ID from the authentication rule, audit mask 503, retainer 505 and POST data in resource cache 502 (step 850). Since the requested resource was successfully mapped to a policy domain in step 836, the resource is deemed protected (step 832).

Figure 24:
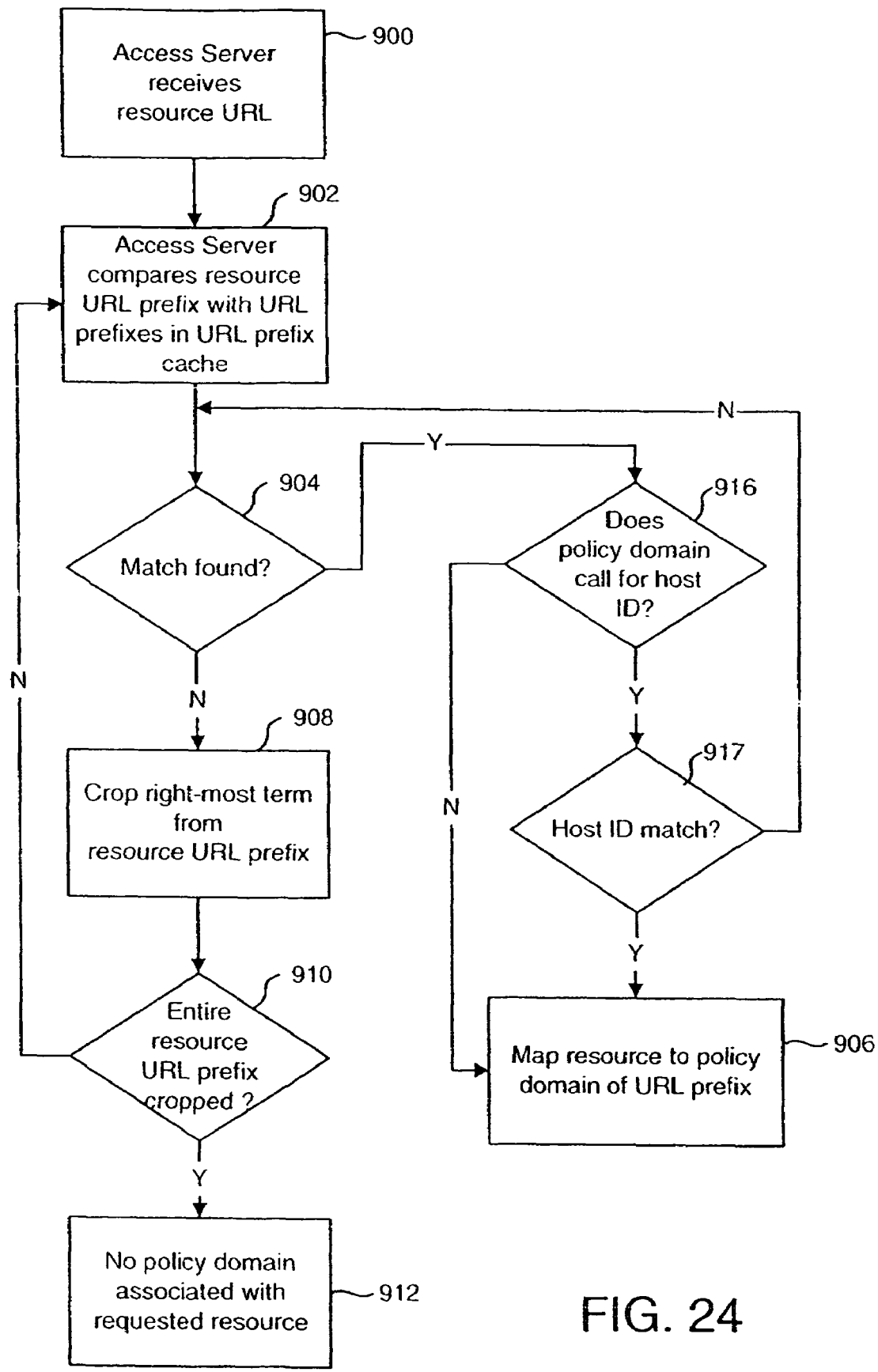
FIG. 24 is a flow chart describing a process for mapping a resource with a policy domain.

FIG. 24 is a flow chart describing the process for mapping a resource to a policy domain (see step 836 of FIG. 23). In step 900, Access Server 34 receives the URL of the requested resource from Web Gate 28. Access Server 34 then compares a URL prefix of the requested resource with entries in URL prefix cache 564 in step 902. In one embodiment, when step 902 is called for the first time in FIG. 24, the URL prefix of the requested resource equals the file name. Thus, if the URL of the requested resource reads: "http://www.oblix.com/oblix/sales/index.html" then the URL prefix first compared by step 902 will be: "/oblix/sales/index.html." If a matching URL prefix is found (step 904), Access Server 34 proceeds to step 916.

In step 916, Access Server 34 determines whether the policy domain associated with the matching URL prefix calls for one or more host ID's. In one embodiment, resources are mapped to certain policy domains if the port number of a resource request and the location of the resource itself conform to one or more host ID's. Thus, multiple policy domains can be associated with identical URL prefixes, each policy domain requiring different host ID's (or none at all). If the policy domain considered in step 916 requires a matching host ID, then Access Server 34 proceeds to step 917. Otherwise, Access Server 34 proceeds directly to step 906 where the requested resource is mapped to the policy domain associated with the currently considered URL prefix. In step 917, if a matching host ID is found, Access Server 34 proceeds to step 906. If no matching host ID is found, Access Server 34 returns to step 904 where it determines whether additional matching URL prefixes exist.

If no matching URL prefix is found in step 904, then Access Server 34 proceeds to step 908. In step 908, Access Server 34 crops the right-most term from the resource URL prefix compared in step 902. Thus, if the resource URL prefix compared in step 902 reads: "/oblix/sales/index.html" then the resource URL prefix will be cropped in step 908 to read: "/oblix/sales." If the entire resource URL prefix has been cropped in step 908 such that no additional terms remain (step 910), then the method proceeds to step 912 where Access Server 34 concludes that there is no policy domain associated with the requested resource. However, if one or more additional terms remain in the resource URL prefix, then the method returns to step 902 where the cropped URL prefix is compared with URL prefixes cached in URL prefix cache 564.

As will be apparent from FIG. 24, the method recurses through steps 902, 904, 908, and 910 until either a match is found (step 904) or the entire resource URL prefix has been cropped (step 910). In any case, the method of FIG. 24 will inevitably return either a successful mapping (step 906) or no mapping (step 912).

Figure 25:
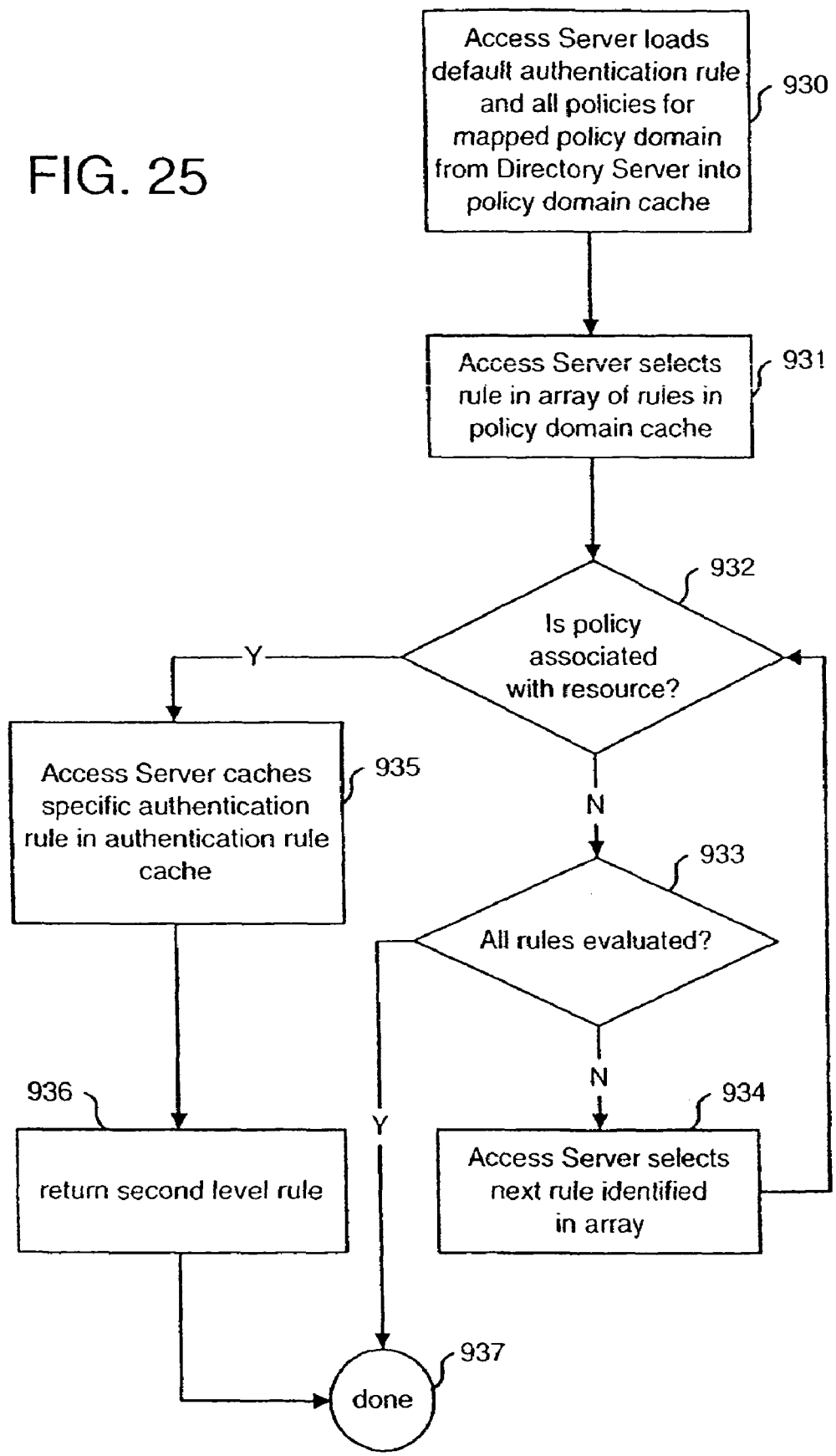
FIG. 25 is a flow chart describing a process for retrieving first and second level authentication rules.

FIG. 25 provides a flow chart describing a method for loading an authentication rule (see step 844 of FIG. 23). In step 930, Access Server 34 loads the first level (default) authentication rule for the policy domain mapped in step 836 of FIG. 23 from Directory Server 36 into authentication rule cache 570. In one embodiment, success and failure actions are part of all authentication and authorization rules. In one embodiment, Access Manager 40 maintains a user attribute list 114 on Directory Server 36. User attribute list 114 identifies all user attributes used by authentication and authorization actions loaded into authentication rule cache 570 and authorization rule cache 572. In this step, Access Server 34 also builds array 565 (previously described above) and loads it into policy domain cache 566. Array 565 includes all second level rules and patterns associated with each of the policies for the policy domain. Access Server 34 then selects a second level rule in array 565 (step 931). The selected second level rule is part of a policy. In step 932, Access Server 34 performs a pattern matching method (further described below) for determining whether the rule applies to the requested resource. If so, then Access Server 34 proceeds to step 935; otherwise, Access Server 34 determines whether all rules in array 565 have been evaluated (step 933). If, in step 933, it is determined that not all of the rules in the array have been evaluated, then Access Server 34 selects the next rule in array 565 (step 934) and returns to step 932. Once all rules in array 565 have been considered (step 933), the first level authentication rule previously loaded in step 930 is returned as the authentication rule, no second level authentication rule is loaded into authentication rule cache 570, and the method of FIG. 25 is done (step 937). If an associated policy was found in step 932, then authentication module 540 caches the second level authentication rule and success and failure actions for the rule in authentication rule cache 570 (step 935), returns that second level authentication rule (step 936), and the method is done (step 937).

Figure 26:
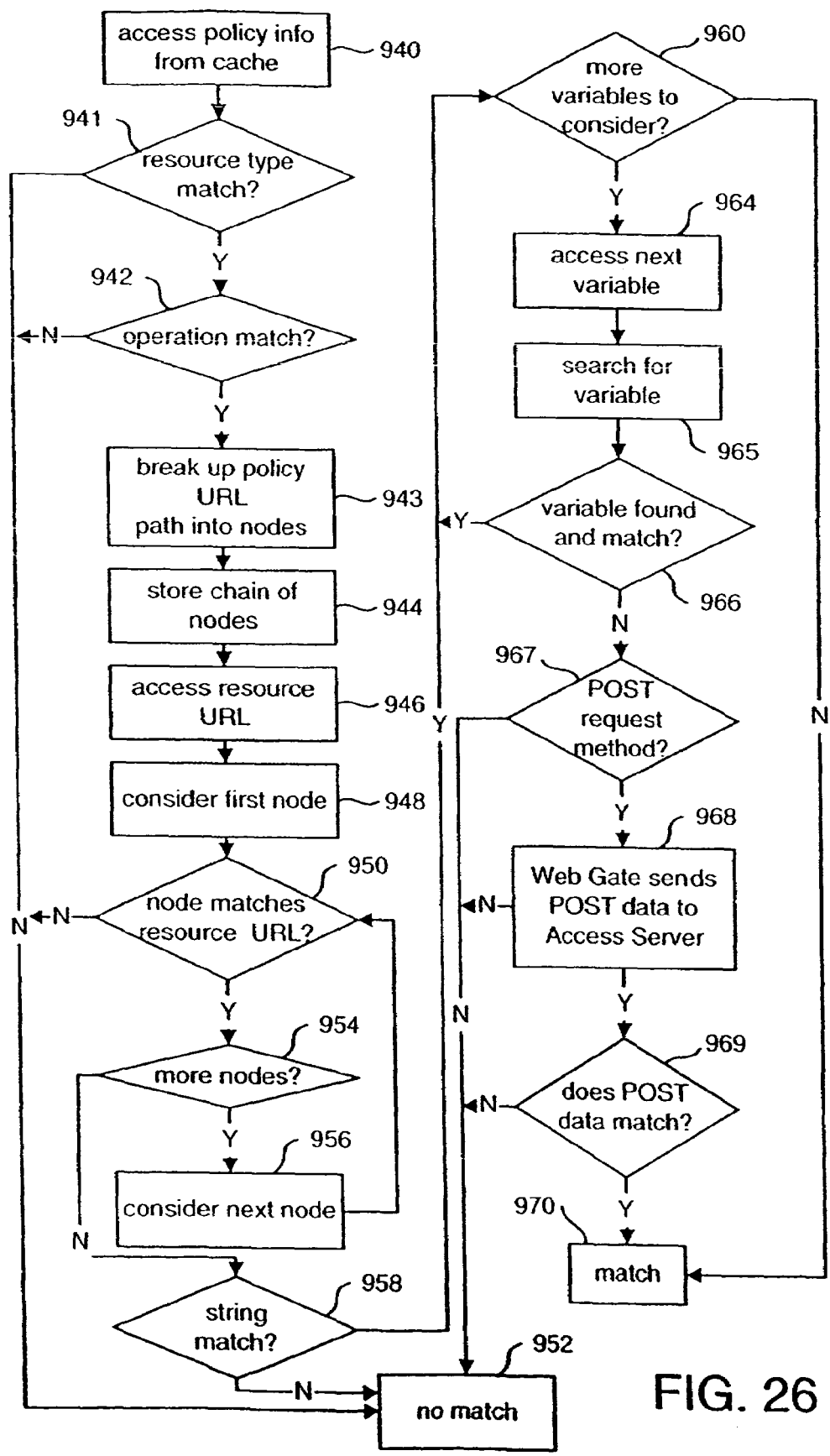
FIG. 26 is a flow chart describing a process for determining whether a resource URL matches a specific policy URL.

FIG. 26 is a flow chart describing a method for determining whether a policy is associated with a resource (see step 932 of FIG. 25). A policy URL can contain the following three types of patterns. All three types of patterns were referenced in FIG. 21:

1. Pattern on the path of the URL: This is the part of URL that does not include the scheme ("http") and host/domain ("www.oblix.com"), and appears before a '?' character in the URL. In the example URL:

http://www.oblix.com/oblix/sales/
    index.html?user=J.Smith&dept=engg the absolute path
    is "/oblix/sales/index.html."

2. Pattern on name value pairs in the URL: This may be a set of patterns. They apply to query data (data appearing after the '?' character in the URL when operation is GET, or the POST data if operation is POST) and are configured as name (no pattern allowed) plus a pattern or value. For example:

| variable name | pattern |
|---|---|
| user | *Smith |
| dept | *sales* |

If multiple name value pairs are specified, they all must match to the incoming resource URL. So the URL:

http://www.oblix.com/oblix/sales/
    index.html?user=J.Smith&dept=engg will not match
    this pattern set. This pattern does not include a notion of
    order to these name-value pairs. A URL:

http://www.oblix.com/oblix/sales/
    index.html?dept=sales&user=J.Smith (with reverse
    order of "dept" and "user") will also satisfy this pattern.
    This is important because it is usually difficult to control
    the order of name value pairs in GET/POST query data.

3. Pattern on the entire query string: This is useful when an administrator desires to enforce an order on the query string. For example, a pattern "user=*Smith*sales" will match query string "user=J.Smith&dept=sales."

A policy can contain one or more of above types of patterns. If multiple patterns are specified in one policy, they ALL must match to the incoming resource URL. If not, that policy doesn't apply to the incoming resource URL.

Patterns used for one embodiment of the current invention can use the following special characters:

1. ?: Matches any one character other than '/'. For example, "a?b" matches "aab" and "azb" but not "a/b."

2. *: Matches any sequence of zero or more characters. Does not match '/'. For example, "a*b" matches "ab," "azb," and "azzzzzzb but not "a/b."

3. ["set"]: Matches one from a set of characters. "set" can be specified as a series of literal characters or as a range of characters. A range of characters is any two characters (including '-') with a '-' between them. '/' is not a valid character to include in a set. A set of characters will not match '/' even if a range which includes '/' is specified. Examples includes: "[nd]" matches only "n" or "d"; "[m-x]" matches any character between "m" and "x" inclusive; "[--b]" matches any character between "-" and "b" inclusive (except for "/"); "[abf-n]" matches "a," "b," and any character between "f" and "n" inclusive; and "[a-f-n]" matches any character between "a" and "f" inclusive, "-," or "n." The second "-" is interpreted literally because the "f" preceding it is already part of a range.

4. {"pattern1,""pattern2,"...}: Matches one from a set of patterns. The patterns inside the braces may themselves include any other special characters except for braces (sets of patterns may not be nested). Examples includes: "a{ab,bc}b" matches "aabb" and "abcb"; "a{x*y,y?x}b" matches "axyb," "axabayb," "ayaxb," etc.

5. "/.../": Matches any sequence of one or more characters that starts and ends with the '/' character. Examples includes: "/.../index.html" matches "/index.html," "/oblix/index.html," and "/oblix/sales/index.html," but not "index.html," "xyzindex.html," or "xyz/index.html"; and "/oblix/.../*.html" matches "/oblix/index.html," "/oblix/sales/order.html," etc.

6. "\": Any character preceded by a backslash matches itself. Backslash is used to turn off special treatment of special characters. Examples include "abc\*d" only matches "abc*d"; and "abc\\d" only matches "abc\d."

To increase the speed of pattern matching, the system tries to do some work up front. When Access Server 34 loads a pattern in its cache, it creates an object. This object's constructor "compiles" the pattern. This compiling is essentially building a simple state machine from one pattern to other, i.e., it creates a chain of "glob nodes." Each glob node consists of either one pattern or a node set. For example, consider pattern:

/.../abc*pqr{uv,xy*}.

The chain would look like:

node("/ . . . /")→node("abc")→node("*")→node("pqr")
→nodeset(node("uv"), (node("xy")→node("*")))

Once the chain is constructed, it is used to match a resource URL to the pattern. Each node or node set in this chain takes a pointer to a string, walks it and decides if it matches the pattern held by the node. In doing so, it also moves this pointer further up in the string. For example, when the server gets a URL "/1/3/abcdepqrxyz," the system takes this string and starts walking the chain. Below is an example of evaluation at each node/node set and pointer (*p) in the string. Note that the original string is not modified. To begin with lets assume that the pointer points to the beginning of the string: *p→"/1/3/abcdepqrxyz.":

Step 1: node("/ . . . /")→MATCHES→advance *p→"abcdepqrxyz."

Step 2: node("abc")→MATCHES→advance *p→"depqrxyz."

Step 3: node("*")→* matches everything except special characters (unescaped '?, '*, "[, "], "{, "}, "/'), so at this point, the system tries matching to the next node, node("pqr") like this:
  a) does *p→"depqrxyz" match node ("pqr")? NO, advance *p →"epqrxyz."
  b) does *p→"epqrxyz" match node ("pqr")? NO, advance *p →"pqrxyz."
  c) does *p→"pqrxyz" match node ("pqr")? YES, advance *p→"xyz." If we walked to the end of string and didn't find a "pqr" (for example in case of URL "/1/3/abcdefgh") there is no match.

Step 4: nodeset(node("uv"), (node("xy")→node("*"))): A nodeset will match incoming string (in the example, *p→"xyz") to one of set members. In this case "xyz" does not match "uv," but it does match "xy*." So there is a MATCH and *p→\'0.'

Step 5: The pointer is at the end of the string. So the match is successful. At any point, if the system finds a node that does not match its string, the system stops processing and concludes that the string does not match the pattern. For example, a URL "/1/3/dddddd" will clear step 1 above, but will fail step 2, so the matching stops after step 2.

Referring to FIG. 26, in step 940, Access Server 34 retrieves the policy information from policy domain cache 566. The policy information can include one or more of the following: a URL absolute path, a query string, and zero or more query variables. In step 941, Access Server 34 determines whether requested resource matches the policy resource type (see FIG. 21). If the resource type does not match, Access Server 34 skips to step 952. However, if the resource type does match, Access Server 34 proceeds to step 942. In step 942, Access Server 34 determines whether the operation used to request the resource matches policy operation type (see FIG. 21). If the operation type does not match, Access Server 34 skips to step 952. If the operation type does match, Access Server 34 proceeds to step 943.

In step 943, the policy URL absolute path, query variables, and query strings are broken up into various nodes, as described above. In step 944, the various nodes are stored. Access Server 34 accesses the requested resource URL in step 946. In step 948, the first node of the policy URL is considered by Access Server 34. In step 950, Access Server 34 considers whether the considered node matches the resource URL, as described above. If the first node does not match, then the entire policy will not match (step 952). If the node does match the resource URL, or if there are no nodes for the policy, then in step 954 it is determined whether there are any more nodes to consider. If more nodes remain to be considered, then in step 956 the next node is considered and the method loops back to step 950. If there are no more nodes (step 954), the query string for the policy is compared to the query string of the resource URL in step 958. If the query string for the policy exactly matches the query string for the resource URL, or if there is no query string for the policy, then the method continues with step 960. If the query string for the policy does not match the query string for the resource URL, then the resource URL does not match and is not associated with the policy (step 952).

In step 960, it is determined whether there are any query variables (see FIG. 21) to consider that have not already been considered. If there are query variables to consider, then the next query variable is accessed in step 964. The accessed query variable is searched for in the resource URL in step 965. If the query variable is found in the resource URL and the value for the query variable matches the stored value query variable in for the policy (step 966), then the method continues at step 960; otherwise, Access Server 34 proceeds to step 967. The purpose of steps 960, 964, 965, and 966 is to determine whether each of the query variables (and associated values) defined for a policy are found, in any order, in the resource URL. If all of the query variables are in the URL with the appropriate values, than there is a match (step 970). In one embodiment, the query string and the query variables are in the portion of the URL following the question mark.

If in step 966 a match is not found, then it is determined whether a match may still be possible using POST data. In one embodiment, resources are mapped to policies by matching POST data submitted with resource requests. Thus, different policies can be associated with a given resource, depending on the contents of the POST data. For example, a user may request a resource during the course of submitting an online form containing POST data. Applicable policies can be mapped on the basis of POST data added to the policy in step 734 of FIG. 21. In step 967, Access Server 34 determines whether the policy operation type is an HTTP POST request. If not, then there is no match (step 952). However, if the operation type is an HTTP POST request, then Access Server 34 proceeds to step 968 where Access Server 34 requests and receives the POST data from Web Gate 28. In one embodiment, Web Gate 28 transmits a flag with all POST requests forwarded to Access Server 34. When POST data is transmitted with an HTTP POST request, the flag is set. If no POST data is transmitted, then the flag is not set. In another embodiment, retainer 505 is transmitted by Access Server 34 to Web Gate 28 when requesting POST data. Retainer 505 is returned by Web Gate 28 to Access Server 34 with the POST data, thus indicating which policy to continue evaluating in step 969. In step 969, Access Server 34 evaluates whether the POST data received in step 968 matches the POST data required by the policy to achieve a match (see FIG. 21). If the POST data matches, then the method proceeds to step 970. Otherwise, the method proceeds to step 952.

Figure 26A:
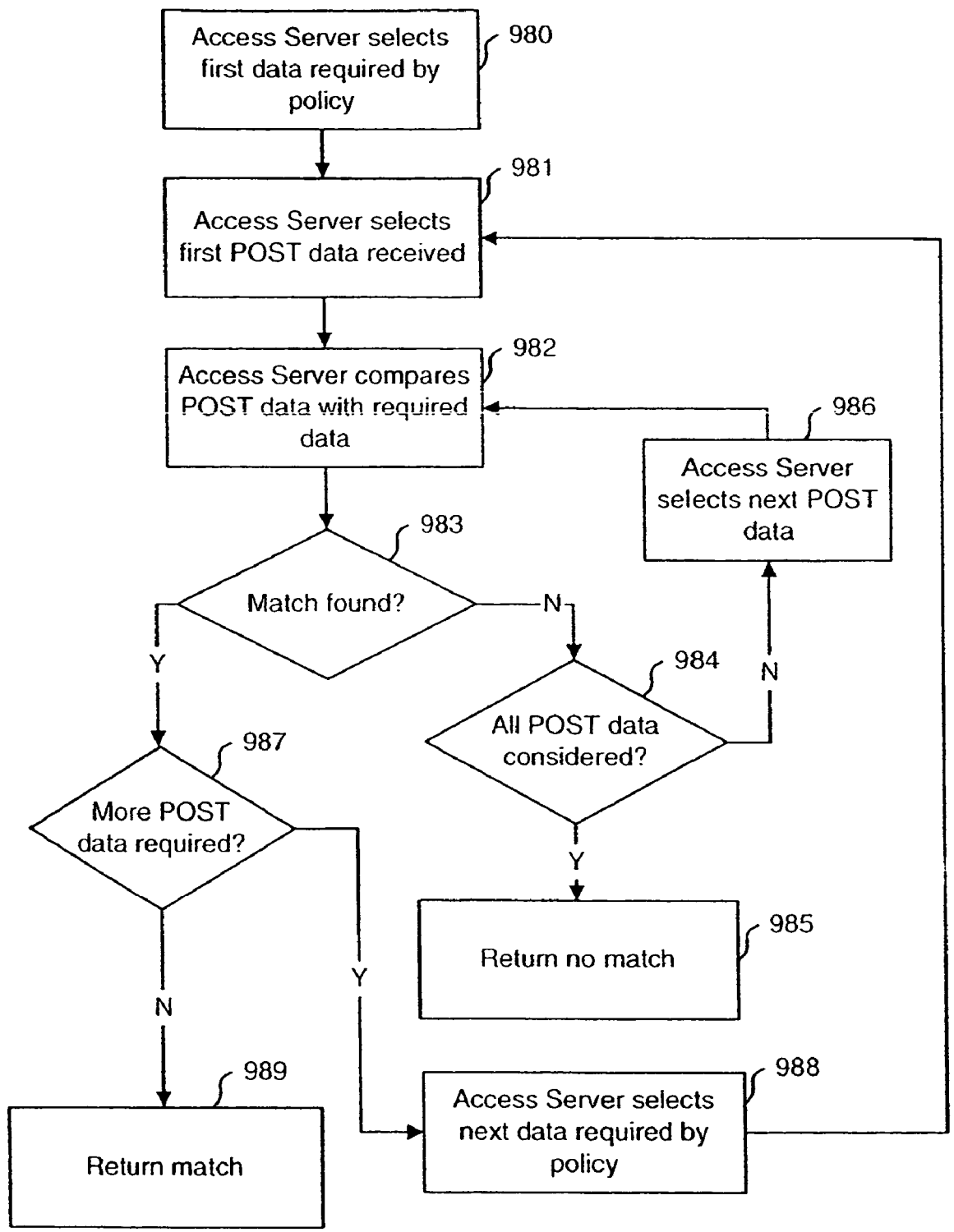
FIG. 26A is a flow chart describing a process for determining whether a resource matches a specific policy using POST data.

FIG. 26A provides a flow chart detailing the steps performed when matching a resource with a specific policy using POST data in step 969 of FIG. 26. In one embodiment, the steps of FIG. 26A are performed by authentication module 540. In step 980, Access Server 34 selects the first data required for matching the policy under consideration. Then, in step 981, Access Server 34 selects the first item of POST data received in step 968 of FIG. 26. Access Server 34 compares the POST data with the required data (step 982). If a match is found (step 983), Access Server proceeds to step 987. Otherwise, Access Server 34 proceeds to step 984 where it determines whether all of the POST data received has already been compared in step 982. If additional POST data remains to be compared, Access Server 34 selects the next item of POST data received (step 986) and loops back to step 982. If all received POST data has already been compared (step 982) and no match was found (step 984), then Access Server 34 returns no match (step 985). In step 987, Access Server 34 determines whether additional POST data is required to be matched in order to match the specific policy under consideration with the requested resource. If additional data is required, Access Server 34 selects the next required data (step 988) and loops back to step 981. If no additional data is required, Access Server 34 returns a match (step 989).

Figure 27:
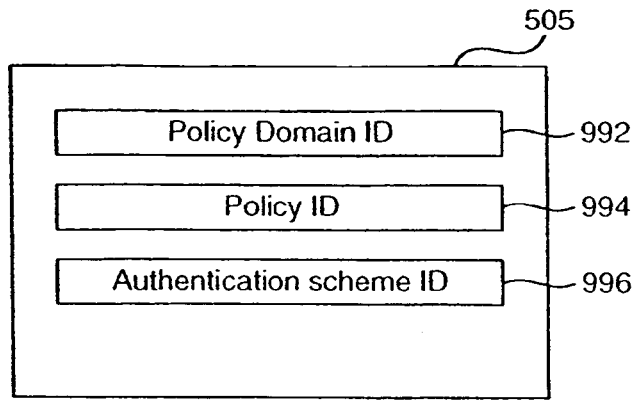
FIG. 27 provides a block diagram of a retainer data structure.

FIG. 27 provides a block diagram of a retainer data structure (retainer) 505 that is passed by Web Gate 28 to Access Server 34 to identify the policy domain and policy previously mapped in step 836 of FIG. 23 and step 932 of FIG. 25, respectively. Retainer 505 is cached in resource cache 502 in step 850 of FIG. 23. Retainer 505 contains the policy domain ID 992 of the mapped policy domain to be used in authorization and logging steps, the policy ID 994 for an applicable policy residing in the mapped policy domain, and ID 996 for the applicable authentication scheme. Thus, by passing retainer 505 rather than the complete URL of the requested resource, Web Gate 28 saves Access Server 34 from having to repeatedly remap the requested resource to a policy domain and policy during authorization and logging.

Figure 28:
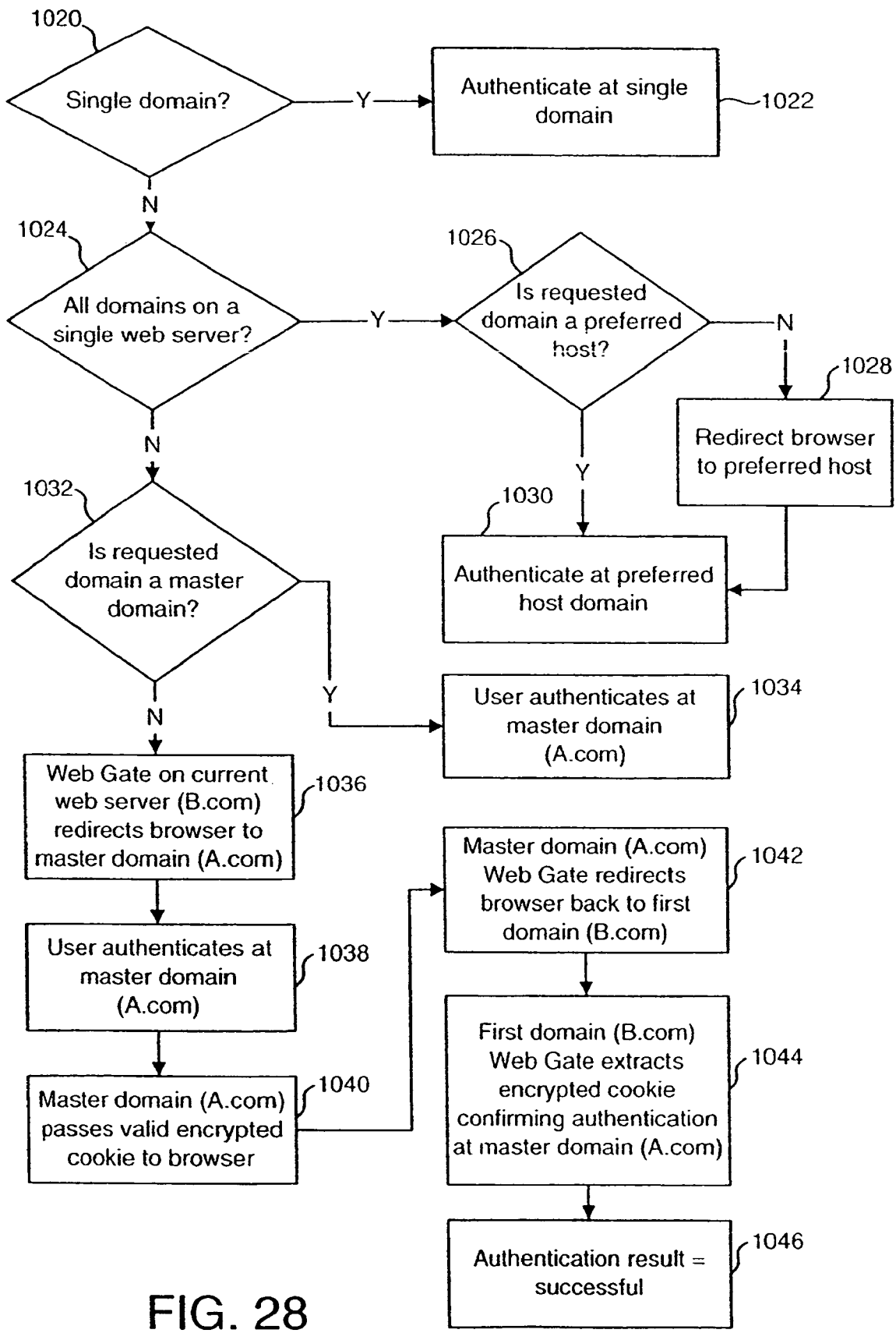
FIG. 28 is a flow chart describing authentication.

FIG. 28 provides a flowchart of a method for authenticating a user for various combinations of domains and Web Servers through a single authentication performed by the user. As will be apparent to those skilled in the art, an Internet domain can reside on a single Web Server, or be distributed across multiple Web Servers. In addition, multiple Internet domains can reside on a single Web Server, or can be distributed across multiple Web Servers. In accordance with the present invention, the method of FIG. 28 allows a user to satisfy the authentication requirements of a plurality of domains and/or Web Servers by performing a single authentication.

In the simplest case, all of an e-business host company's Web Servers will be in the same domain (i.e. oblix.com). When a user successfully authenticates at one of the Web Servers, the Web Gate running on the authenticating Web Server causes the Web Server to return an encrypted cookie, indicating a successful authentication. Subsequent requests by the browser to the domain will pass this cookie (assuming the cookie applies to the requested URL), proving the user's identity; therefore, further authentications are unnecessary.

In a more complex case, an e-business host company's web presence incorporates associated web sites whose Web Servers have names in multiple domains. In such a multiple domain case, each of the associated portal Web Servers use a Web Gate plug-in configured to redirect user authentication exchanges to the e-business host's designated web log-in Web Server. The user is then authenticated at the e-business host's web log-in server, and an encrypted cookie is issued for the e-business host's domain to the user's browser. The user's browser is then is redirected back to the original associated portal's site where the Web Gate creates a new cookie for the associated portal's domain and returns it to the user's browser.

As a result, the user is transparently authenticated in both the original associated portal's domain and the e-business host's domain. The process is transparently performed for each different associated portal that a user may visit during a session. The present invention's associated portal support easily supports single Web Servers having multiple DNS names in multiple domains, and/or multiple network addresses. In accordance with the present invention, this multiple domain authentication enables "staging" of web sites. For example, a new edition of a web site can be deployed on a separate set of servers, and then mapped to policy domains protected by the present invention by simply updating the policy domain's host ID's.

In one embodiment, the steps of FIG. 28 are performed by authentication event handler 512 and redirection event handler 504. In step 1020, authentication event handler 512 determines whether single or multiple domains are protected in a given deployment of the present invention. If only a single domain is protected, then the method proceeds to step 1022 where an authentication is attempted at the single domain. If the single domain is distributed across multiple Web Servers, then the domain attribute of the cookie set by the authenticating Web Server in step 1022 is set to broadly include all Web Servers in the domain.

If multiple domains are protected, the method proceeds to step 1024 where authentication event handler 512 determines whether the multiple protected domains all reside on a single Web Server. For example, a single machine intranet.oblix.com may be addressed in multiple ways such as: sifl.oblix.com, intranet, asterix.oblix.com, or 192.168.1. In accordance with the present invention, when multiple domains reside on a single Web Server, an administrator will designate exactly one of the domains a "preferred host domain." If step 1024 indicates that all protected domains reside on the same Web Server, then authentication event handler 512 determines whether the domain of the requested resource is a preferred host (step 1026). If it is a preferred host, then authentication event handler 512 attempts to authenticate the user at the preferred host domain in step 1030 (further described below with respect to FIG. 30). Otherwise, redirection event handler 504 redirects browser 12 to the preferred host domain (step 1028) for authentication (step 1030). Referring to step 1024, if the multiple protected domains reside on multiple Web Servers, then authentication event handler 512 proceeds to step 1032.

In one embodiment, a single policy domain and/or policies are created for the preferred host domain while no policy domains or policies are created for the other domains residing on the same web server. All resource requests made to any of the multiple protected domains residing on the same web server are redirected to the preferred host domain, thus requiring the user to authenticate according to the preferred host domain's policy domain and/or policies. As a result, after authentication at the preferred host domain, the user is transparently authenticated for all other domains residing on the same web server. When subsequent resource requests for resources in domains residing on the same web server are redirected to the preferred host domain, the prior successful authentication for the host domain can be confirmed by the existence of a valid authentication cookie for the preferred host domain. If such a cookie exists, then the user need not re-authenticate for the requested resource. In one embodiment, if subsequent resource requests made to the preferred host domain (or any of the other domains on the same web server) require a higher level of authentication, or if a previously valid authentication has expired, the user will be required to re-authenticate at the preferred host domain in accordance with the method of FIG. 28.

Figure 29:
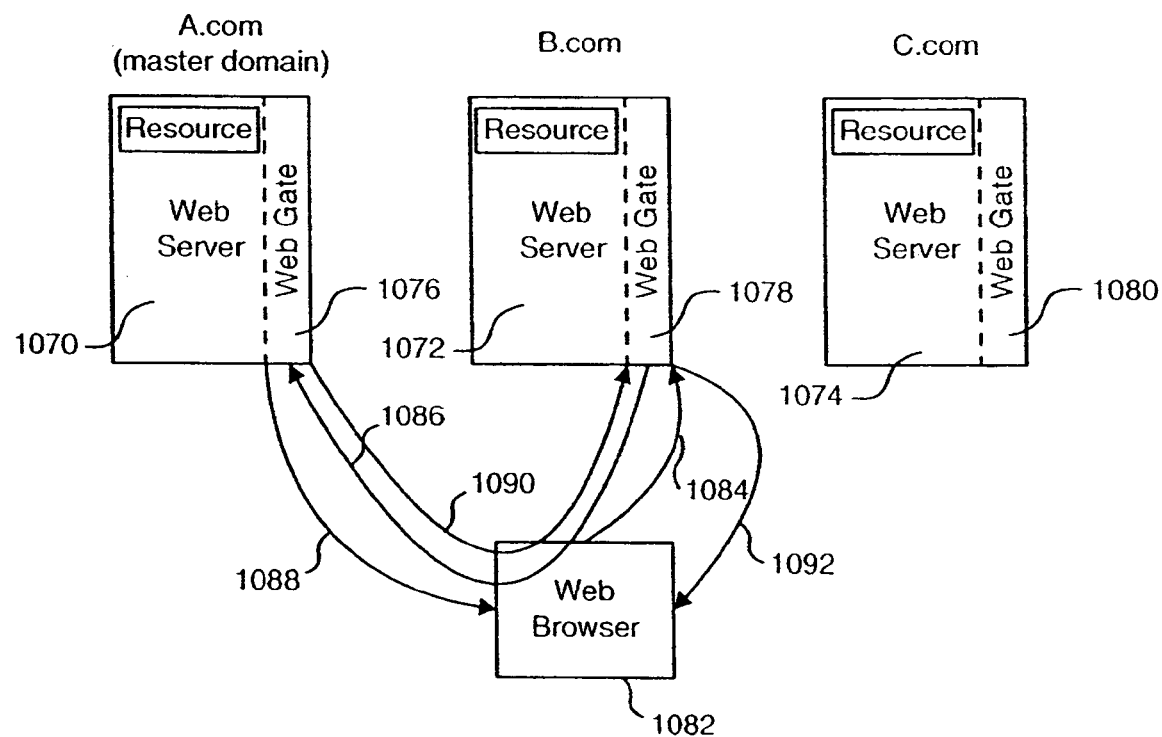
FIG. 29 is a block diagram depicting various components involved in the authentication process.

FIG. 29 provides a block diagram of a plurality of Web Servers, each hosting a different domain accessible by browser 1082. In accordance with the present invention, when multiple domains are protected and distributed across multiple Web Servers, the administrator will identify exactly one of the domains a "master domain." As identified in FIG. 29, Web Server 1070 hosts master domain A.com, while Web Servers 1072 and 1074 host domains B.com and C.com, respectfully. An end user's resource request is illustrated in FIG. 29 by path 1084 from browser 1082 to Web Server 1072.

Referring back to FIG. 28, if authentication event handler 512 determines that the domain of the requested resource is a master domain (step 1032), then authentication event handler 512 attempts to authenticate at the master domain (step 1034). Otherwise, redirection event handler 504 redirects browser 12 to the master domain (step 1036). The user then authenticates at the master domain (step 1038). The redirection and authentication of steps 1036 and 1038 are illustrated in FIG. 29 by path 1086. Upon a successful authentication at the master domain, the master domain Web Server passes an authentication cookie to the user's browser (step 1040) and re-directs the user's browser back to the first domain accessed by the user (step 1042). Also in step 1042, the master domain passes information contained in the master domain authentication cookie to the first domain in the query data portion of the redirection URL. Steps 1040 and 1042 are illustrated by paths 1088 and 1090, respectively in FIG. 29. In step 1044, the Web Gate of the first domain Web Server extracts the master domain authentication cookie information from the redirection URL, thus confirming the user's authentication at the master domain and resulting in a successful authentication (step 1046). The first domain Web Server (B.com) then sends its own authentication cookie to web browser 1082 (as depicted by path 1092) in accordance with step 780 of FIG. 22, previously described above. Any subsequent authentication by browser 1082 at domain C.com on Web Server 1074 follows the method of FIG. 28.

Figure 30:
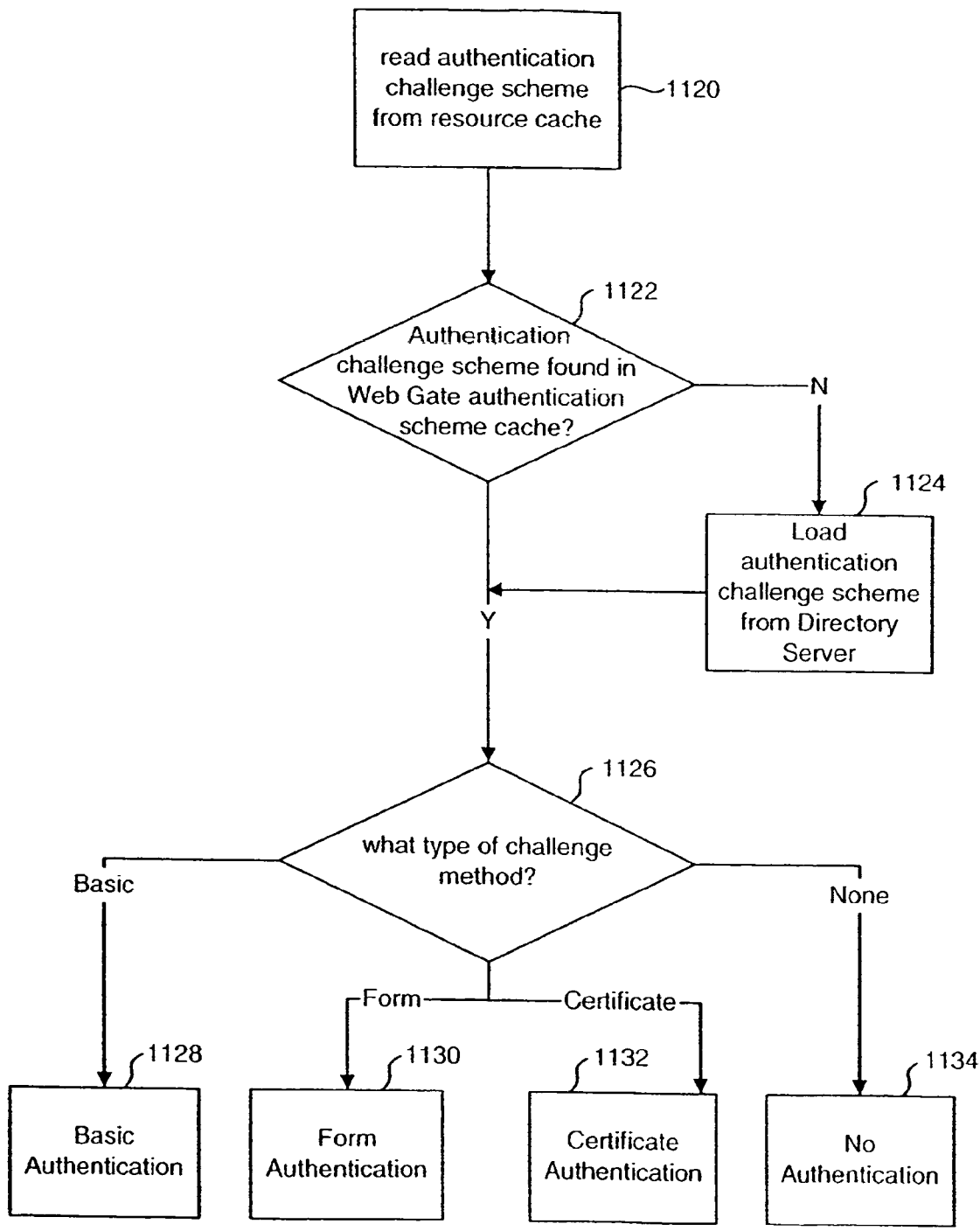
FIG. 30 is a flow chart describing a process for authentication.

FIG. 30 provides a flow chart of the method for authenticating, as performed in steps 1022, 1030, 1034, and 1038 of FIG. 28. In one embodiment, the steps of FIG. 30 are performed by authentication event handler 512. In step 1120, authentication event handler 512 accesses resource cache 502 to determine what authentication challenge method is to be used for the given resource. Authentication event handler 512 then accesses authentication scheme cache 506 in step 1122 to determine whether the authentication scheme associated with the requested resource has been previously cached. If the authentication scheme is found, authentication event handler 512 determines the specific type of challenge method in step 1126. If the challenge scheme was not found in step 1122, authentication event handler 512 loads the authentication rule associated with the requested resource from Directory Server 36 in step 1124 (further described below in FIG. 31), and then proceeds to step 1126.

In step 1126, authentication event handler 516 discerns whether the authentication challenge scheme retrieved in step 1122 or 1124 calls for basic, form, certificate, or no authentication. If the challenge scheme indicates basic authentication, then the method proceeds to step 1128 and performs basic authentication. If the challenge scheme indicates form authentication, then the method proceeds to step 1130 and performs form authentication. If the challenge scheme indicates certificate authentication, then the method proceeds to step 1132 and performs certificate authentication. If the challenge scheme indicates that no authentication is required (step 11134), then the user is not challenged, authentication is not performed (in one embodiment, the system skips to step 756 of FIG. 22 and in another embodiment the system skips to step 774 of FIG. 22).

Figure 31:
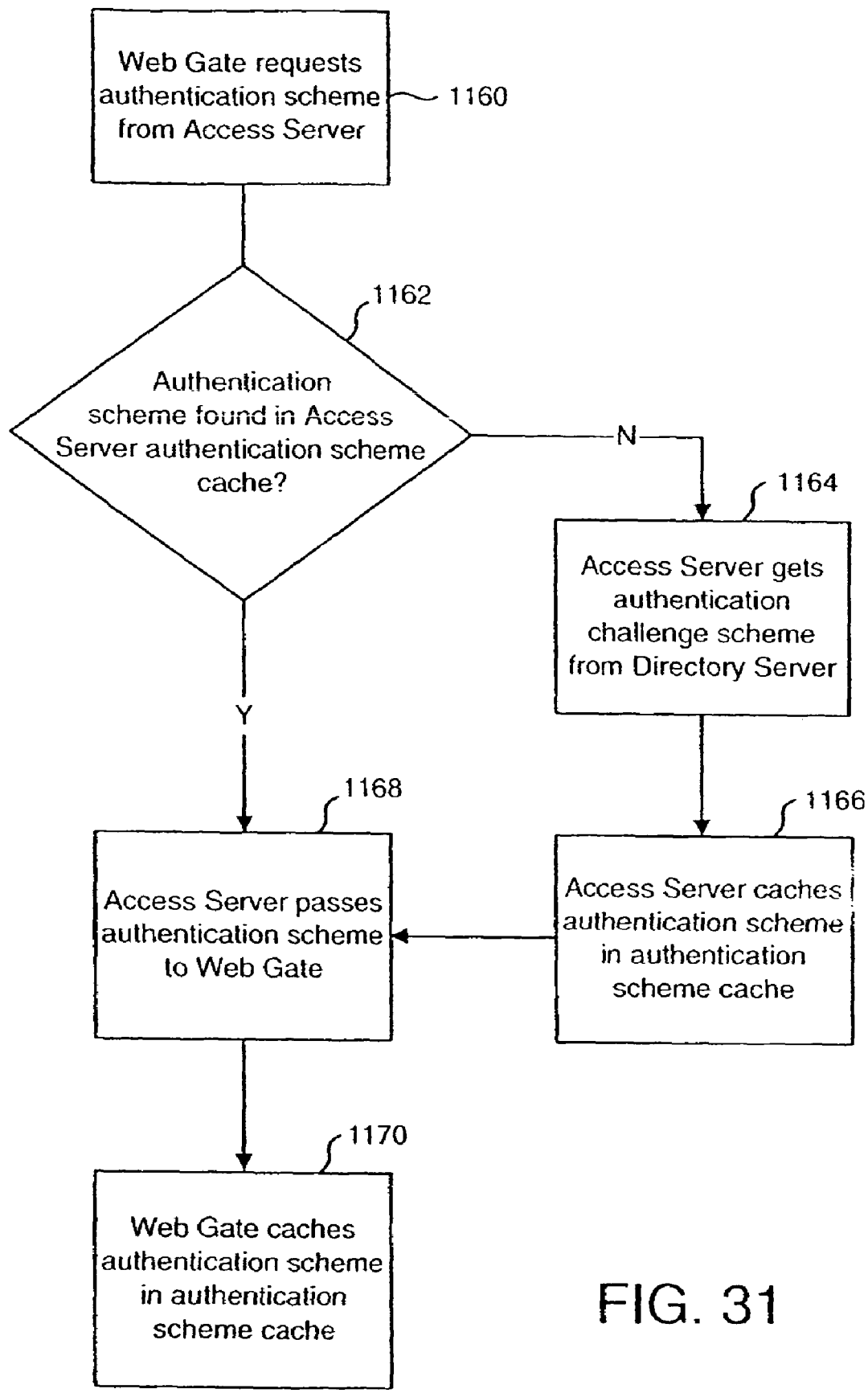
FIG. 31 is a flow chart describing a process for retrieving an authentication challenge scheme from a Directory Server.

FIG. 31 provides a flow chart describing the method of loading an authentication challenge scheme from Directory Server 36 (step 1124 of FIG. 30). In one embodiment, the steps of FIG. 31 are performed by authentication event handler 512 and Access Server 34. In step 1160, authentication event handler 512 requests the authentication challenge scheme to be read from Access Server 34. If the authentication challenge scheme is found in authentication scheme cache 568 (step 1162), then Access Server 34 proceeds to step 1168. Otherwise, Access Server 34 retrieves the requested authentication challenge scheme from Directory Server 36 (step 1164). Upon retrieval, Access Server 34 caches the authentication challenge scheme in authentication scheme cache 568 (step 1166), and proceeds to step 1168. In step 1168, Access Server 34 passes the retrieved authentication challenge scheme to Web Gate 28. Web Gate 28 then caches the authentication challenge scheme in authentication scheme cache 506 (step 1170).

Figure 32:
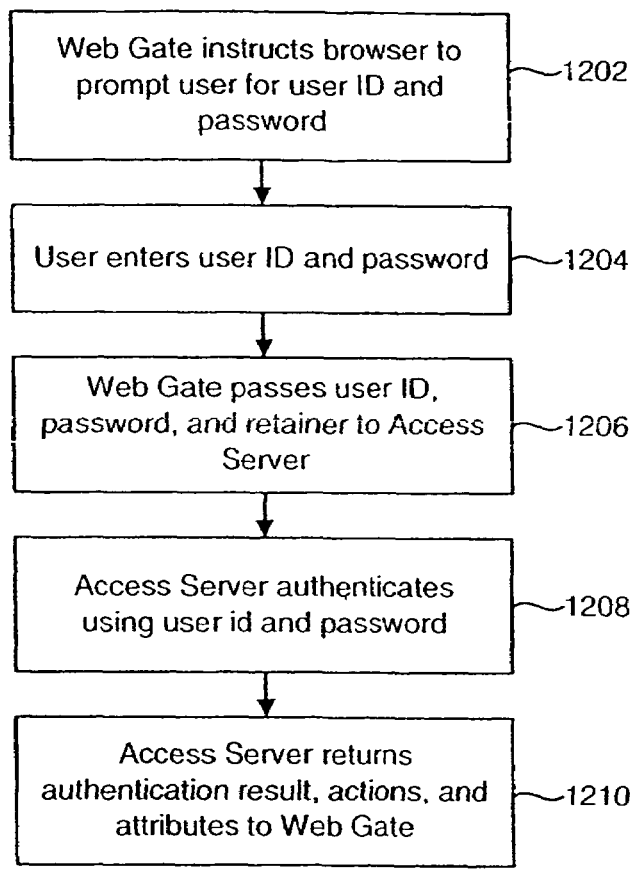
FIG. 32 is a flow chart describing a method for performing basic authentication.

FIG. 32 provides an exemplar method for performing basic authentication (step 1128 of FIG. 30). In one embodiment, the steps of FIG. 32 are performed by authentication event handler 512 and authentication module 540. In step 1202, authentication event handler 512 instructs browser 12 to prompt the user for a user ID and password. In response, the user enters and the user's browser submits the requested user ID and password (step 1204). In step 1206, Web Gate 28 intercepts the user submission and authentication event handler 512 passes the user ID and password to Access Server 34, along with retainer 505, thus identifying a policy domain and policy applicable to the requested resource. Access Server authentication module 540 then authenticates the user using the user ID and password in step 1208. In step 1210, authentication module 540 returns the authentication result, authentication success or failure actions, and any user attributes required by the actions to Web Gate 28.

Figure 33:
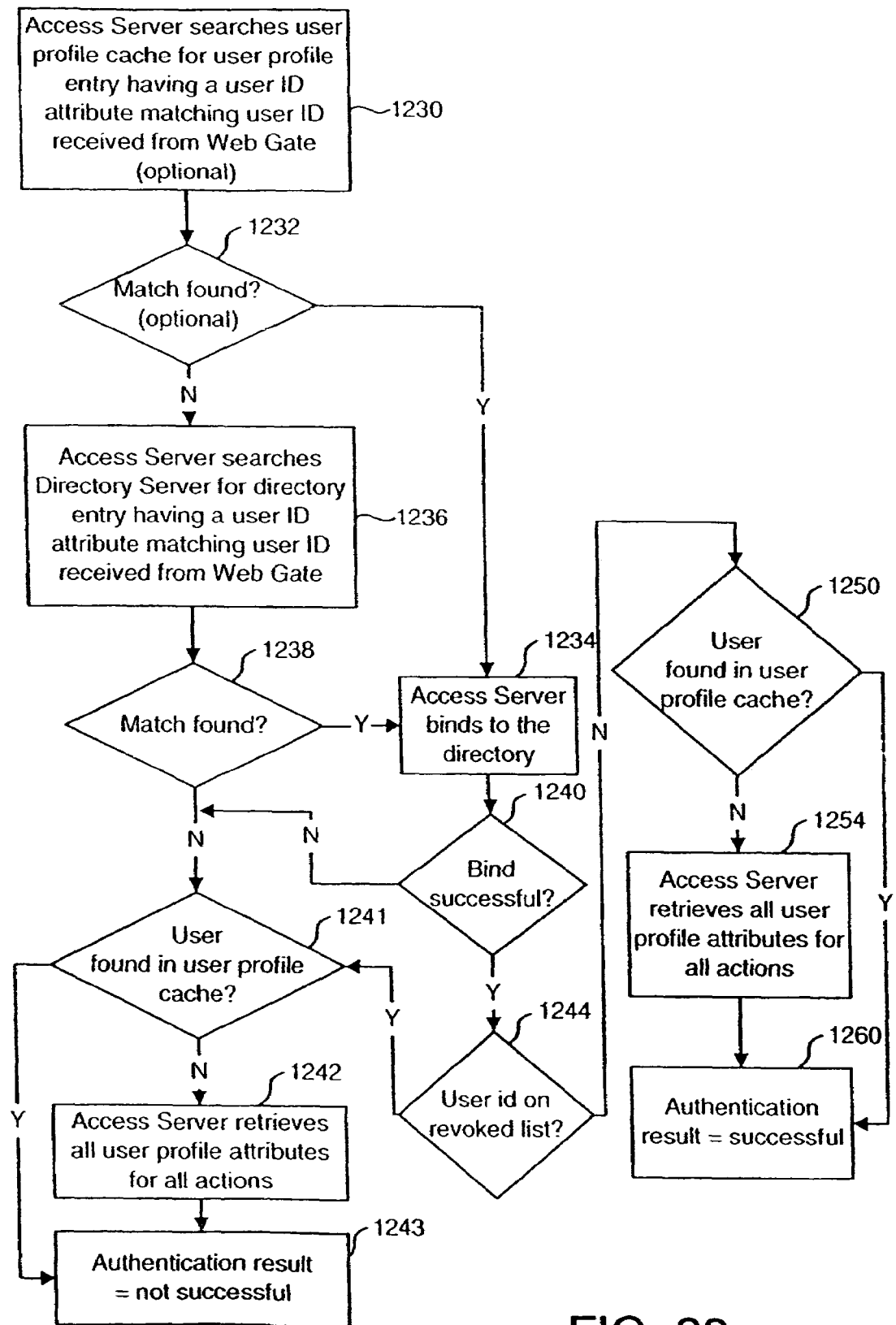
FIG. 33 is a flow chart describing the process performed by an Access Server to authenticate using a user ID and password.

FIG. 33 provides a flow chart describing an exemplar method used by the Access Server to authenticate using a user ID and password (step 1208 of FIG. 32). In one embodiment, the steps of FIG. 33 are performed by authentication module 540. In optional step 1230, authentication module 540 searches user profile cache 576 for a user identity profile entry having a user ID attribute matching the user ID received from Web Gate 28. User profile cache 576 is a hash table of user identity profile attributes that can be used for authentication, authorization, or auditing. In one embodiment, the user ID attribute would appear in user profile cache 576 if it was previously used in a successful authentication. If a match is found (optional step 1232), then authentication module 540 proceeds to step 1234. If no match is found, then authentication module 540 proceeds to step 1236.

In another embodiment, steps 1230 and 1232 of FIG. 33 are not performed. In such an embodiment, the method of FIG. 33 begins with step 1236 where it searches user identity profiles 102 in Directory Server 36 (not user profile cache 576) for a user identity profile having a user ID attribute matching the user ID received from Web Gate 28. If no matching user identity profile attribute is found in Directory Server 36 (step 1238), then the method proceeds to step 1241. If a matching user identity profile attribute is found in Directory Server 36 (step 1238), then authentication module 540 binds to the directory using the distinguished name from the matching user identity profile entry and the password received from Web Gate 28 (step 1234). If the bind is unsuccessful (step 1240), then authentication module 540 proceeds to step 1241 where it determines whether an entry for the current user is found in user profile cache 576. If so, authentication module 540 proceeds to step 1243. Otherwise, authentication module 540 retrieves all profile attributes of the current user appearing in user attribute list 114 and caches them in user profile cache 576 (step 1242). In step 1243, authentication module 540 returns an unsuccessful authentication result.

If the bind is successful (step 1240), then authentication module 540 accesses revoked user list 582 to determine whether the user ID received from Web Gate appears on revoked user list 582. If the user ID is on the revoked user list (step 1244), authentication module 540 proceeds to step 1241. If the user ID is not on the revoked user list, then authentication module 540 determines whether an entry for the user is found in user profile cache 576 (step 1250). If not, authentication module 540 retrieves all profile attributes of the current user appearing in list 114 and caches them in user profile cache 576 (step 1254). If an entry was found, the method skips to step 1260. In step 1260, the method returns a successful authentication result.

Figure 34:
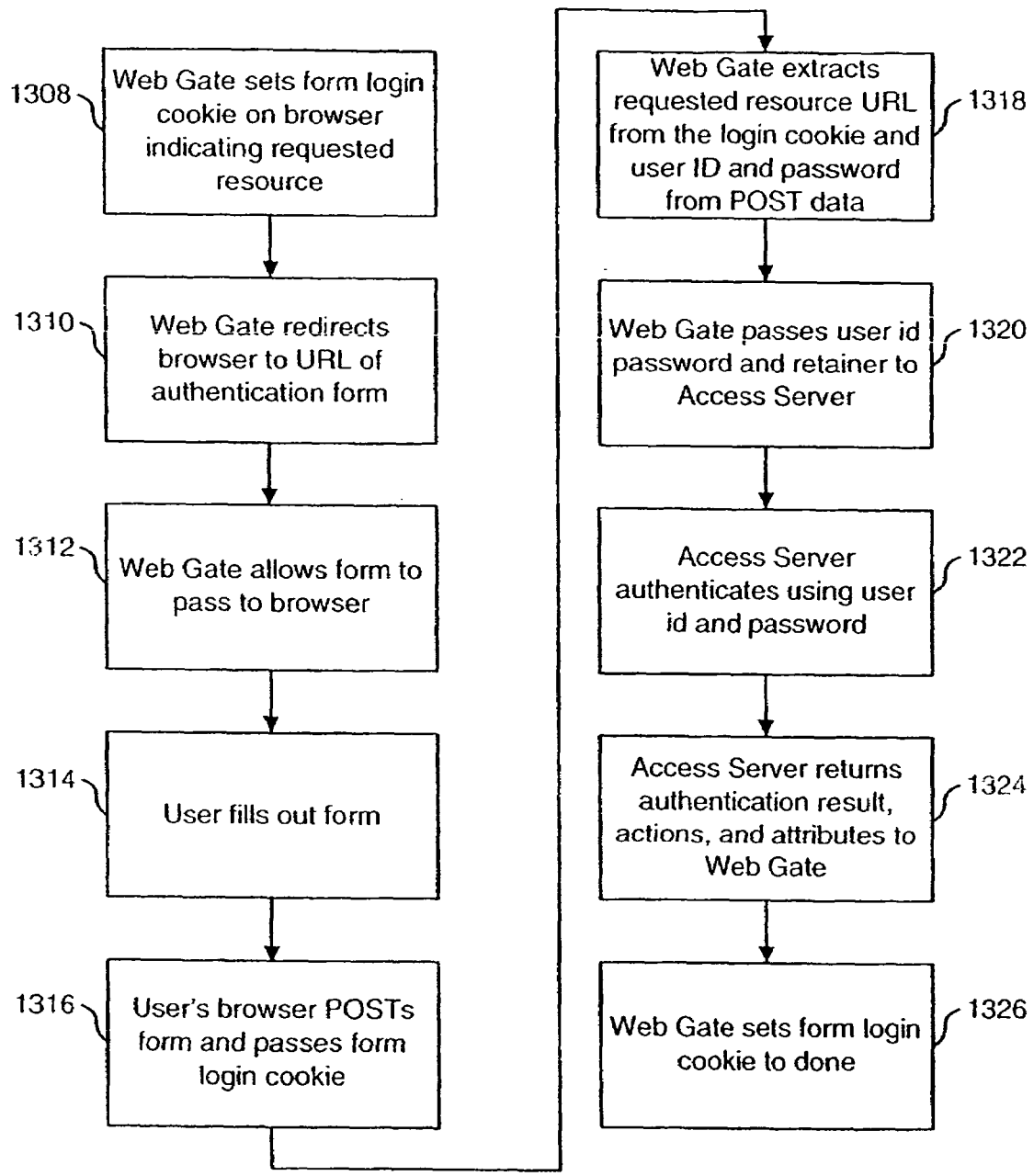
FIG. 34 is a flow chart describing form authentication.

FIG. 34 provides a flow chart describing a method for performing form authentication (step 1130 of FIG. 30). In one embodiment, the steps of FIG. 34 are performed by authentication event handler 512, redirection event handler 504, browser 12, and authentication module 540. In step 1308, authentication event handler 512 sets a "form login" cookie on browser 12. The cookie includes the URL of the requested resource. Authentication event handler 512 then redirects browser 12 to an authentication form URL (step 1310). In step 1312, Web Gate 28 allows the authentication form referenced by the authentication form URL to pass to browser 12. The user then fills out the authentication form (step 1314) and transmits (e.g. post data) the information from the authentication form (step 1316), passing the form login cookie previously set in step 1308. Authentication event handler 512 then extracts the URL of the requested resource from the form login cookie (step 1318), and passes the user ID and password filled out by the user in the authentication form (submitted as POST data) to Access Server 34 (step 1320).

In step 1322, authentication module 540 authenticates the user for the requested resource using the user's id and password received from Web Gate 28, performing the steps of FIG. 33 previously described above. In step 1324, authentication module 540 returns the authentication result, authentication actions, and user attributes to Web Gate 28. Authentication event handler 512 then sets the form login cookie (previously set in step 1308) to indicate that the authentication process is completed (step 1326).

Figure 35:
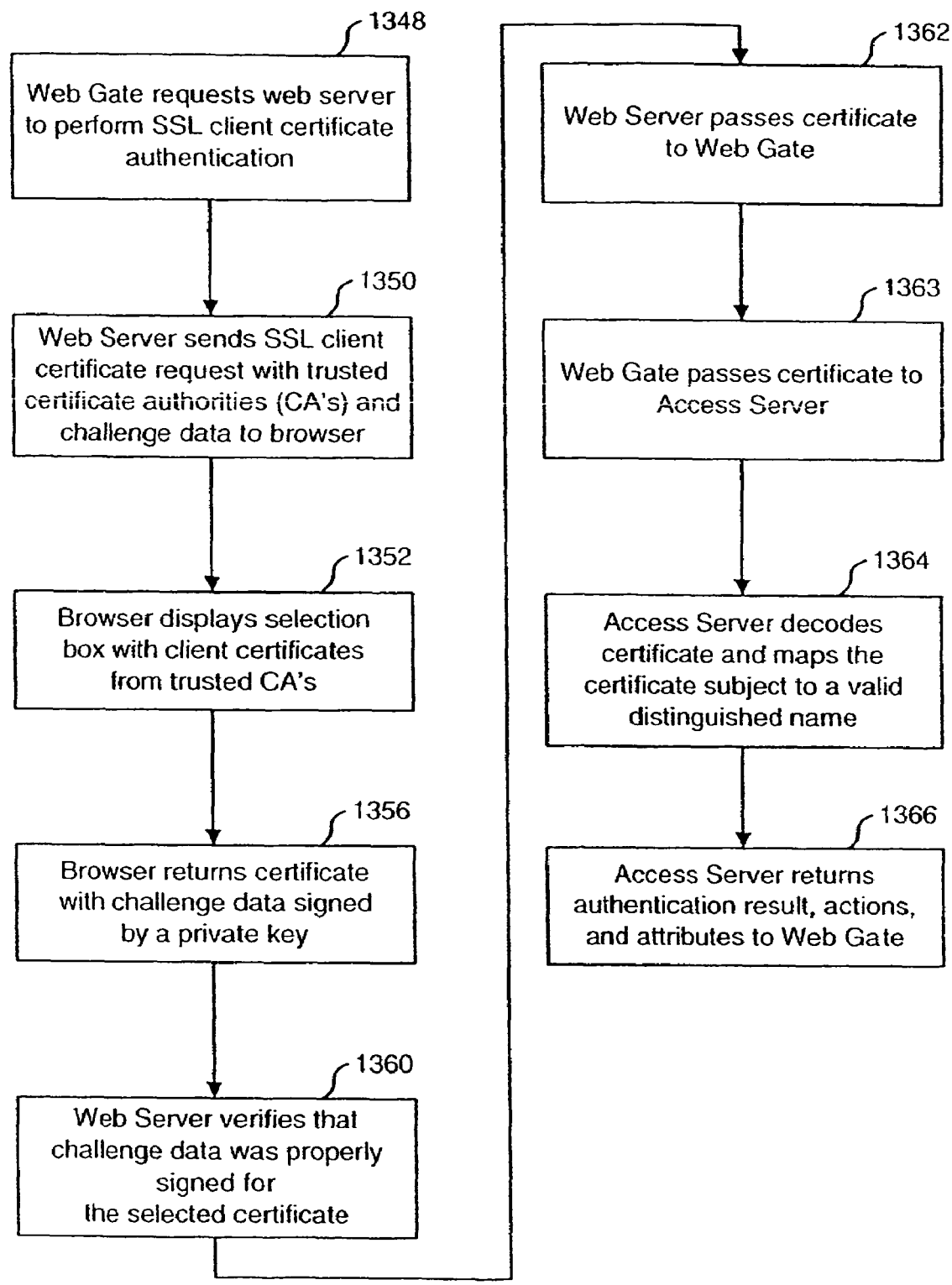
FIG. 35 is a flow chart describing a process for client certificate authentication.

FIG. 35 is a flow chart describing a method for performing certificate authentication (step 1132 of FIG. 30). In one embodiment of the present invention, client certificate authentication is performed using Web Servers employing the Netscape Enterprise Server plug-in interface (NSAPI). In another embodiment, client certificate authentication is performed for Web Servers employing the Microsoft Internet Information Server plug-in interface (ISAPI). In yet another embodiment, client certificate authentication is performed on a plurality of Web Servers, with a first subset of the Web Servers employing NSAPI and a second subset employing ISAPI. Other Web Servers can also be used.

In one embodiment, the steps of FIG. 35 are performed by authentication event handler 512, redirection event handler 504, browser 12, and authentication module 540. In step 1348, authentication event handler 512 requests Web Server 18 to perform SSL client certificate authentication on browser 12. In one embodiment of the present invention performing client certificate authentication on ISAPI Web Servers, authentication event handler 512 redirects browser 12 to a special case URL (i.e. cert_authn.dll) that is configured to accept certificates. In such an embodiment, this redirection occurs within step 1348.

In step 1350, Web Server 18, on behalf of Web Gate 28, sends an SSL client certificate request along with trusted certificate authorities (CA's) and challenge data to browser 12. Browser 12 then displays a selection box with client certificates from trusted CA's, allowing a user of browser 12 to select a certificate (step 1352). Browser 12 then returns the selected certificate with challenge data signed by a private key to Web Server 18 (step 1356). Web Server 18 then verifies that the challenge data was properly signed by the selected certificate (step 1360) and passes a valid certificate to Web Gate 28 (step 1362), which passes the certificate to Access Server 34 (step 1363). In step 1364, authentication module 540 of Access Server 34 then decodes the certificate and maps the certificate subject to a valid distinguished name (further described in FIG. 36). In step 1366, authentication module 540 returns the authentication result, authentication actions, and user attributes to Web Gate 28.

Figure 36:
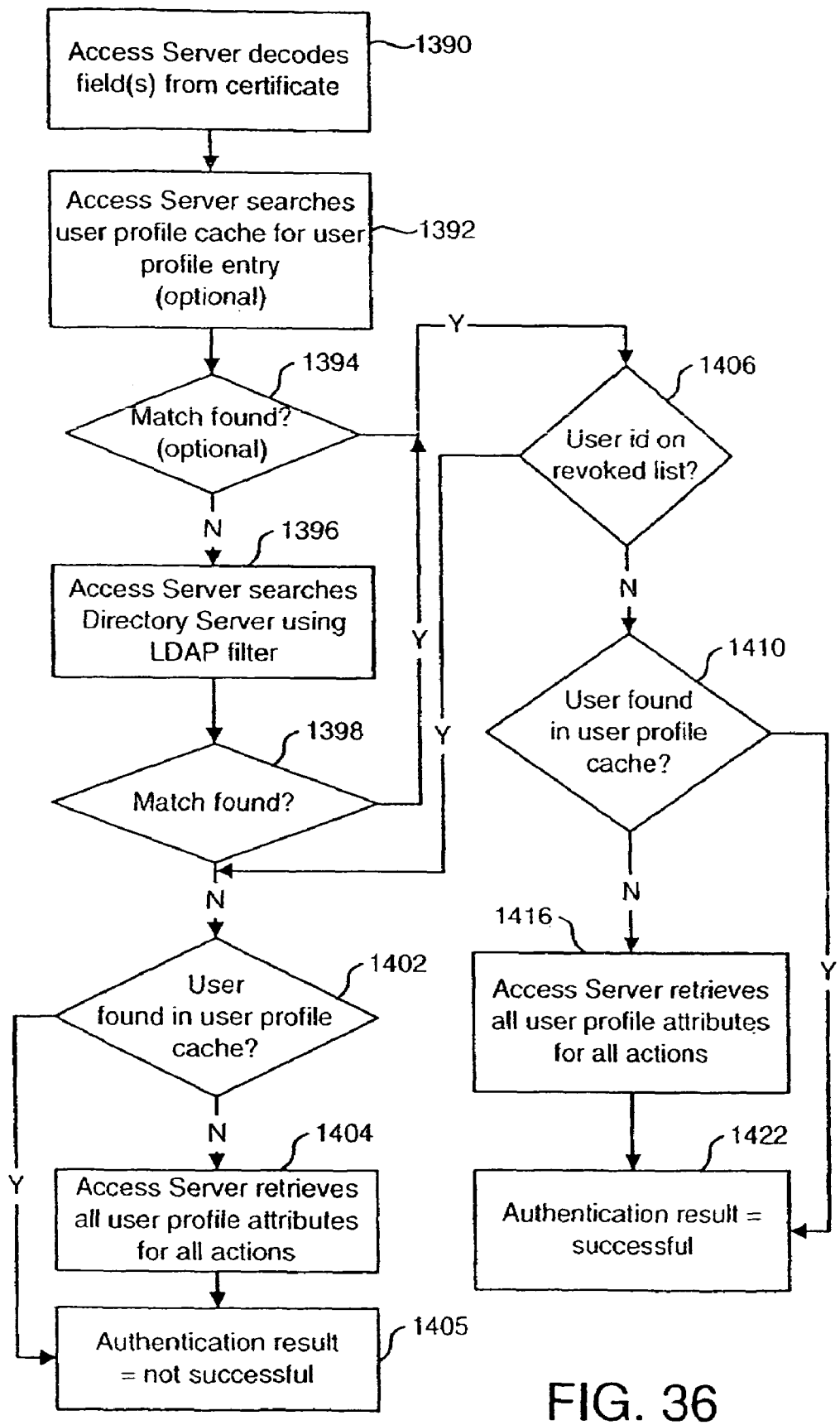
FIG. 36 is a flow chart describing a process for authenticating a user using certificates.

FIG. 36 provides a flow chart describing a method for authenticating using a valid certificate (step 1364 of FIG. 35). In one embodiment, the steps of FIG. 36 are performed by authentication module 540. In optional step 1390, authentication module 540 decodes one or more fields of the certificate passed by Web Gate 28 in step 1362 of FIG. 35. In one embodiment, the user's e-mail address is decoded. In step 1392, authentication module 540 searches user profile cache 576 for a user identity profile entry having one or more attributes matching the decoded field(s). In one embodiment, the user attribute would appear in user profile cache 576 if it was previously used in a successful authentication. If a match is found (optional step 1394), then authentication module 540 proceeds to step 1406. If no match is found, then authentication module 540 proceeds to step 1396.

In another embodiment, steps 1390 and 1392 of FIG. 36 are not performed. In such an embodiment, the method of FIG. 36 begins with step 1396 where it searches user identity profiles 102 in Directory Server 36 for a user identity profile having one or more attributes matching the decoded field(s). If no matching user identity profile attribute is found in Directory Server 36 (step 1398), then the method proceeds to step 1402 where it determines whether an entry for the current user is found in user profile cache 576. If so, authentication module 540 proceeds to step 1405. Otherwise, authentication module 540 retrieves all profile attributes of the current user appearing in user attribute list 114 and caches them in user profile cache 576 (step 1404). In step 1405, authentication module 540 returns an unsuccessful authentication result. If a matching user identity profile is found in step 1398, the method proceeds to step 1406.

In step 1406, authentication module 540 accesses revoked user list 582 to determine whether the user identity profile having the matching user attribute appears on revoked user list 582. If so, authentication module 540 proceeds to step 1402. Otherwise, authentication module 540 continues on to step 1410 and determines whether an entry for the current user is found in user profile cache 576. If not, authentication module 540 retrieves all profile attributes of the current user appearing in list 114 and caches them in user profile cache 576 (step 1416). If an entry was found, the method skips to step 1422. In step 1422, the method returns a successful authentication result.

Figure 37:
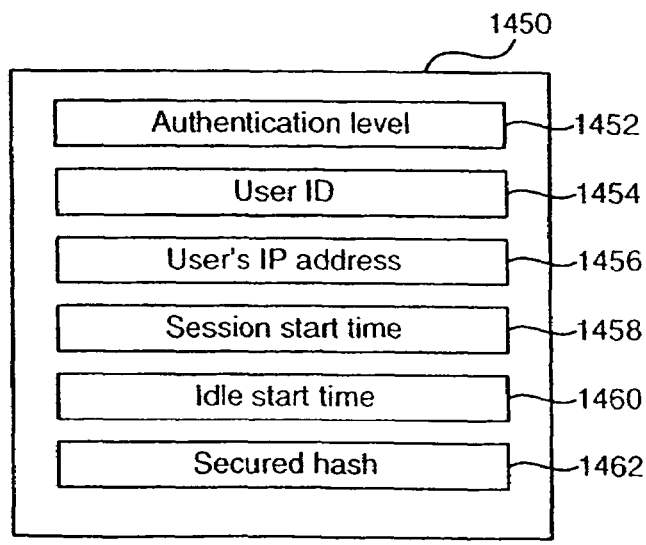
FIG. 37 is a block diagram depicting the components of one embodiment of an encrypted cookie.

FIG. 37 provides a block diagram of an authentication cookie 1450 passed by Web Gate 28 to browser 12 in step 780 of FIG. 22. Cookie 1450 is encrypted with a symmetric cipher so that cookies from all instances of Web Gate 28 in a given deployment of the present invention may be encrypted using the same key. This key (shared secret 110) is stored on Directory Server 36 and distributed to each of the Web Gates 28 by Access Server 34. Shared secret 110 can change as often as desired by an administrator. In one embodiment of the present invention, cookie 1450 is encrypted using RC4 encryption with a 2048 bit key. As previously described, in one embodiment, previously valid keys are grandfathered such that both the current key and the immediately prior key will both work to de-crypt encrypted cookie 1450. The present invention features a one-button key re-generation function. This function is easily scriptable.

In one embodiment, the information stored by cookie 1450 includes the authentication level 1452 of the authentication scheme used to create the cookie, the user ID 1454 of the authenticated user, the IP address 1456 of the authenticated user, and session start time 1458 identifying the time at which cookie 1450 was created. If the time elapsed since the session start time 1458 exceeds a maximum session time, the cookie will become invalid. Idle start time 1460 is also stored, which identifies the time when the previous HTTP request for a protected resource was made in which cookie 1450 was passed. If the time elapsed since the idle start time 1460 exceeds a maximum idle time, the cookie will become invalid. Both of these time limits force users to re-authenticate if they have left a session unattended for longer than the maximum session or idle times. Cookie 1450 also stores a secured hash 1462 of information 1452, 1454, 1456, 1458, and 1460. In one embodiment of the present invention, secured hash 1462 is created using an MD5 hashing algorithm. Most Internet browsers cache a user's supplied authentication information during basic and certificate authentication challenge methods, and then transparently re-send the information upon receiving an authentication challenge from a Web Server. In one embodiment, an administrator can enable a form authentication challenge method requiring end users to re-authenticate upon expiration of the maximum session or maximum idle time limits.

Figure 38:
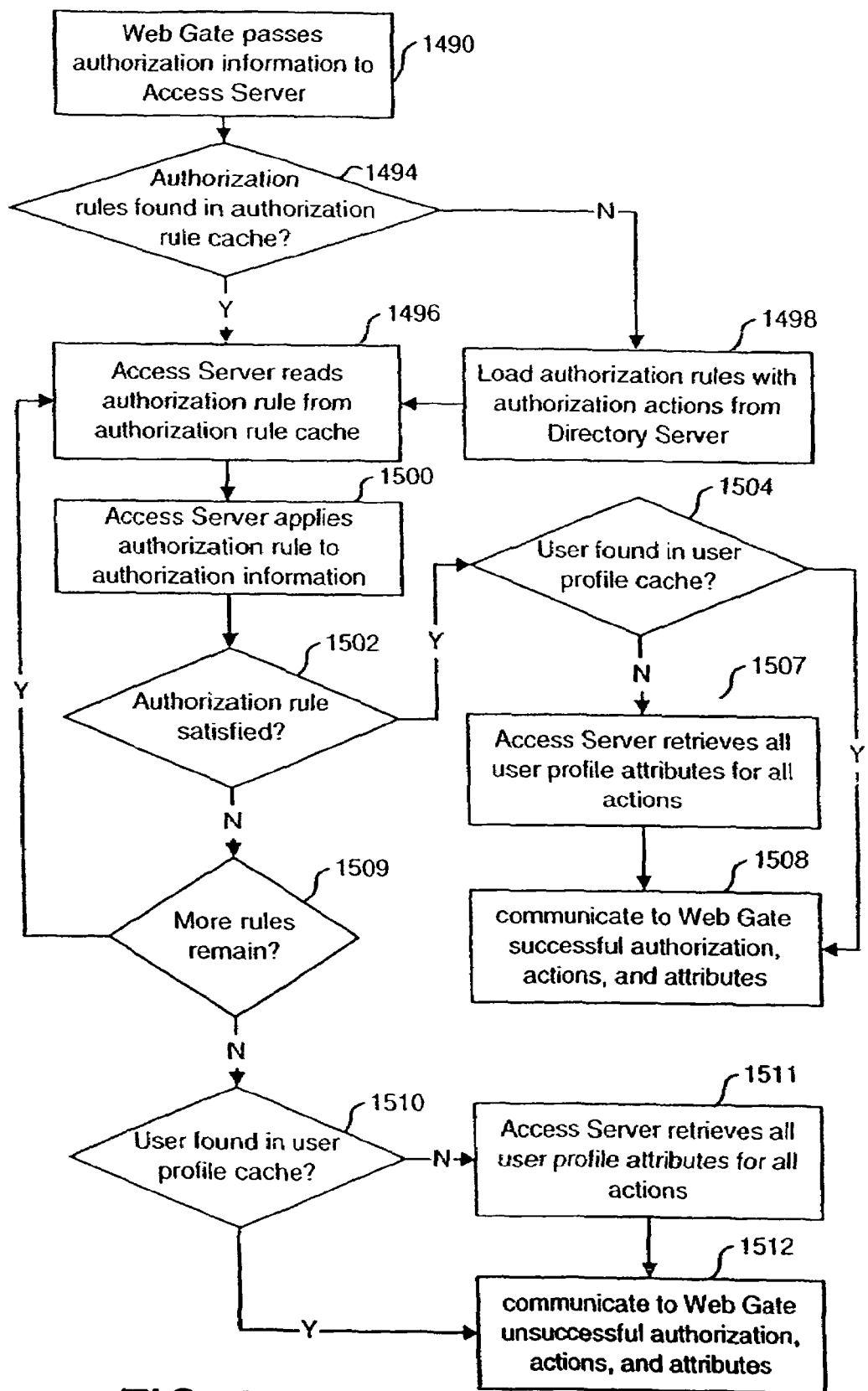
FIG. 38 is a flowchart describing a process for authorization.

FIG. 38 provides a flow chart describing a method for attempting to authorize a user (step 756 of FIG. 22). In one embodiment, the method of FIG. 38 is performed by authorization event handler 516 and authorization module 542. In step 1490, authorization event handler 516 of Web Gate 28 passes authorization information to Access Server 34. In step 1494, authorization module 542 determines whether one or more authorization rules associated with the requested resource are found in authorization rule cache 572. If one or more rules are found, authorization module 542 proceeds to step 1496. Otherwise, authorization module 542 retrieves any authorization rules associated with the requested resource from Directory Server 36 in step 1498. In one embodiment, authorization success and failure actions are retrieved with the authorization rules. After retrieving the authorization rules, authorization module 542 proceeds to step 1496 and reads the first authorization rule associated with the requested resource from authorization rule cache 572. In one embodiment, multiple authorization rules are evaluated in an order determined by the priority set in step 646 of FIG. 17. In another embodiment, second level authorization rules are evaluated prior to first level authorization rules. Authorization module 542 applies the authorization rule (step 1500) to the authorization information previously passed in step 1490.

If the authorization rule is satisfied in step 1502, authorization module 542 determines whether an entry for the user is found in user profile cache 576 (step 1504). If so, authorization module 542 proceeds to step 1508. If not, authorization module 542 retrieves all profile attributes of the current user appearing in user attribute list 114 (step 1507), and communicates the authorization success actions and attributes to Web Gate 28 (step 1508).

If the authorization rule is not satisfied (step 1502), then authorization module 542 determines whether more authorization rules remain to be evaluated (step 1509). If more rules remain, the next rule is read (step 1496) and evaluated (step 1500). If no more rules remain, authorization module 542 determines whether an entry for the user is found in user profile cache 576 (step 1510). If so, authorization module 542 proceeds to step 1512. If not, authorization module 542 retrieves all profile attributes of the current user appearing in user attribute list 114 (step 1511), and communicates the authorization success actions and attributes to Web Gate 28 (step 1512).

Figure 39:
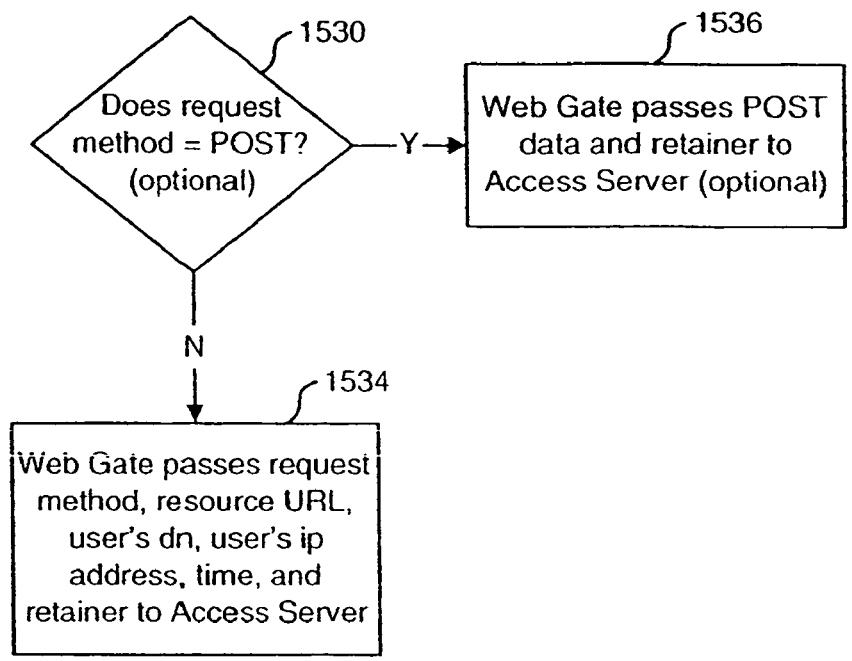
FIG. 39 is a flow chart describing the steps performed when passing authorization information using POST data.

FIG. 39 details the steps performed when passing authorization information to Access Server 34 in step 1490 of FIG.

38. In one embodiment, the steps of FIG. 39 are performed by authorization event handler 516. In one embodiment, authorization can be performed using POST data. In another embodiment, POST data is not used for authorization. If POST data is enabled to be used for authorization, then the method of FIG. 39 begins with optional step 1530. Otherwise, the method begins at step 1534. If the resource request issued by browser 12 in step 750 of FIG. 22 employs a POST request method and POST data is enabled to be used for authorization (step 1530), authorization event handler 516 passes the POST data and retainer 505 to Access Server 34 (step 1536). If the resource request does not employ a POST request method or POST data is not enabled to be used for authorization (step 1530), then authorization event handler 516 passes retainer 505, the request method, the user's distinguished name, the user's IP address, and the time of the request to Access Server 34 in step 1534.

FIG. 40 illustrates the format of an HTTP request. As illustrated in FIG. 40, an HTTP request 1550 comprises request line 1552, zero or more headers 1554, blank line 1556, and body 1558 (used only for POST requests). The HTTP protocol supports various types of requests. The GET request returns whatever information is identified by the request-URI portion of request line 1552. The HEAD request is similar to the GET request, but only a server's header information is returned. The actual contents of the specified document is not returned. This request is often used to test hypertext links for validity, accessibility, and recent modifications. The POST request is used for POSTing electronic mail, news, or sending forms that are filled in by an interactive user. A POST is the only type of request that sends a body. A valid content-linked header field is required in POST requests to specify the length of body 1558. Post data can include zero or more data elements separated by "&" as depicted by line 1562. Each data element is of the form variable name=value.

HTTP request 1550 can contain a variable number of header fields 1560. A blank line 1556 separates header fields 1554 from body 1558. A header field comprises a field name, a string and the field value, as depicted in box 1560. In one embodiment, the field value is an LDAP attribute. Field names are case insensitive. Headers can be divided in three categories: those that apply to requests, those that apply to responses, and those that describe body 1558. Certain headers apply to both requests and responses. Headers that describe the body can appear in a POST request or in any response.

Figure 41:
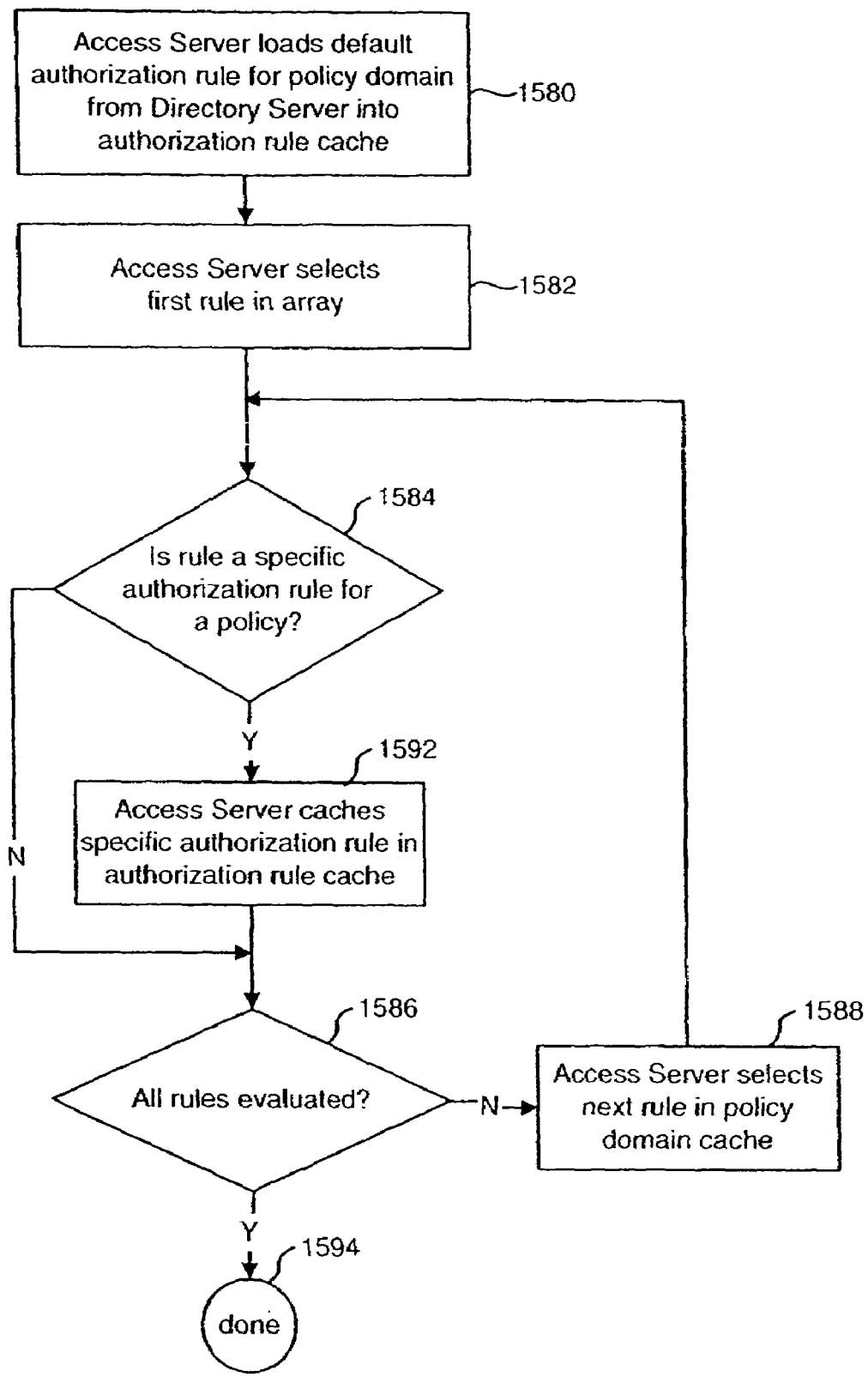
FIG. 41 is a flow chart describing a process for obtaining first and second level authorization rules from a Directory Server.

FIG. 41 provides a flow chart describing a method for loading an authorization rule from the Directory Server (step 1498 of FIG. 38). In one embodiment, the steps of FIG. 41 are performed by authorization module 542. In step 1580, Access Server 34 loads the default authorization rule for the policy domain mapped in step 836 of FIG. 23 from Directory Server 36 into authorization rule cache 572. Access Server 34 then selects a first rule in array 565 (step 1582) and determines whether the selected rule is a second level (specific) rule of a policy associated with the requested resource (step 1584), by calling the method of FIG. 26 previously described above. If yes, then Access Server 34 proceeds to step 1592. Otherwise, Access Server 34 determines whether all rules in array 565 have been evaluated (step 1586). If not, then Access Server 34 selects the next rule in array 565 (step 1588), and returns to step 1584. Once all rules in array 565 have been considered (step 1586), Access Server 34 proceeds to step 1594 and loops back to step 1586. If a second level authorization rule (a rule defined in a policy) was found for the requested resource in step 1584, then authorization module 540 caches the second level authorization rule in authorization rule cache 570 (step 1592) and the method is done (step 1594). If a second level policy authorization rule was not found, then the default authorization rule previously loaded in step 1580 remains in authorization rule cache 572, and the method is done (step 1594).

Figure 42:
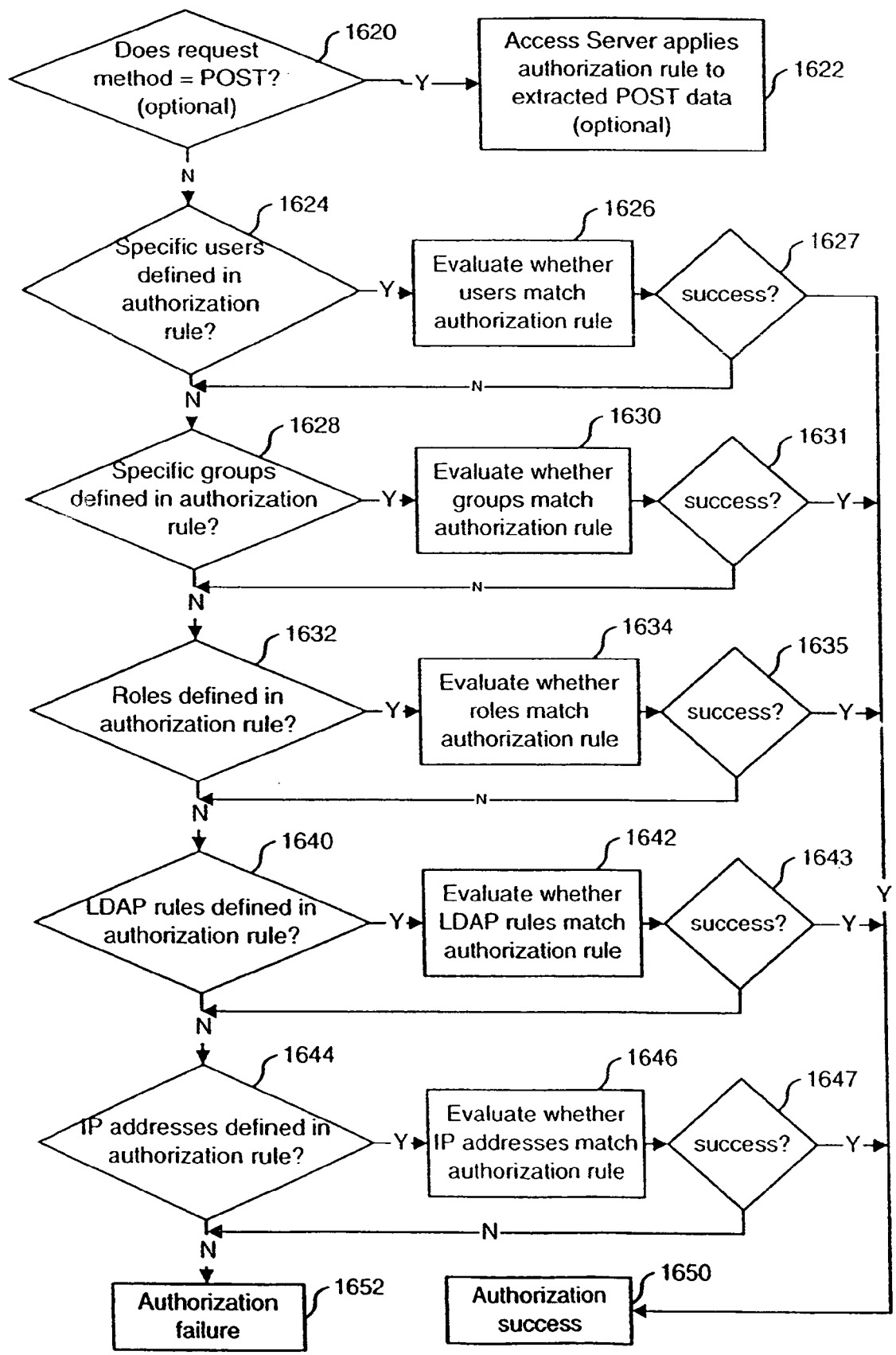
FIG. 42 is a flow chart describing a process for evaluating an authorization rule.

FIG. 42 provides a flow chart describing the method of applying an authorization rule (step 1500 of FIG. 38). In one embodiment, the steps of FIG. 42 are performed by authorization module 542. In one embodiment, authorization can be performed using POST data. In another embodiment, POST data is not used for authorization. If POST data is to be used for authorization, then the method of FIG. 42 begins with optional step 1620. Otherwise, the method begins at step 1624. In optional step 1620, if the resource request employs a POST request method, then authorization module 542 proceeds to optional step 1622 where it applies the authorization rule to the POST data passed in step 1536 of FIG. 39. If the resource request does not employ a POST request method (or if POST data is not enabled to be used for authorization), then authorization module 542 proceeds to step 1624. If specific users are defined (by distinguished name) in the authorization rule, authorization module 542 evaluates whether the distinguished name of the authenticated user matches the user's distinguished name called for by the authorization rule (step 1626). If specific groups are defined in the authorization rule (step 1628), authorization module 542 evaluates whether the group name of the authenticated user matches the group name called for by the authorization rule (step 1630). In one embodiment, the user's group membership is cached in user policy cache 578. If specific roles are defined in the authorization rule (step 1632), authorization module 542 evaluates whether the role of the authenticated user matches the role called for by the authorization rule (step 1634). If specific LDAP rules are defined in the authorization rule (step 1640), authorization module 542 evaluates whether the LDAP rule matches the LDAP rule called for by the authorization rule (step 1642). In one embodiment, the result of the LDAP rule evaluation in step 1642 is cached in user policy cache 578. If specific user IP addresses are defined in the authorization rule (step 1644), authorization module 542 evaluates whether the IP address of the authenticated user matches the IP address called for by the authorization rule (step 1646). If a successful match is found at any point (steps 1627, 1631, 1635, 1643, and 1647), the authorization is successful (step 1650). In one embodiment, successful matches of groups and LDAP rules are stored in user policy cache 578 in steps 1631 and 1643. In another embodiment, multiple matches must be found before an authorization success is found. If no matches are found, authorization is unsuccessful (step 1652).

Figure 43:
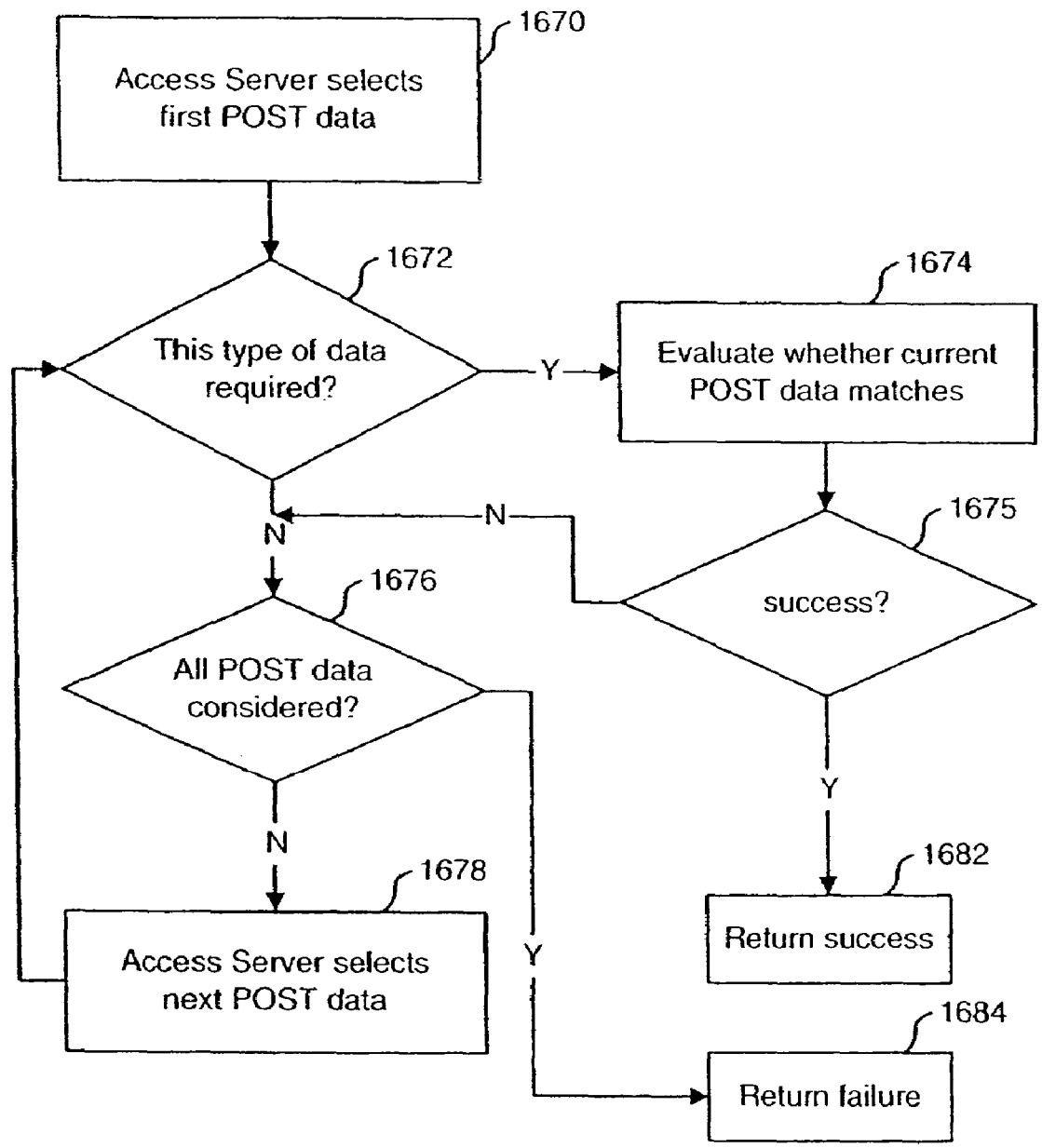
FIG. 43 is a flow chart describing a process for applying an authorization rule to extracted POST data.

FIG. 43 provides a flow chart detailing the steps performed when applying an authorization rule to POST data in optional step 1622 of FIG. 42. In one embodiment, the steps of FIG. 43 are performed by authorization module 542. In step 1670, Access Server 34 selects the first item of POST data received in optional step 1536 of FIG. 39. If the selected POST data is of a type that is called for by the authorization rule being evaluated (step 1672), then Access Server 34 evaluates whether the selected POST data matches data required by the authorization rule (step 1674) and determines whether a successful match has been found (step 1675). For example, if an authorization rule calls for a user's distinguished name, then a distinguished name contained in the POST data will be compared with the distinguished name expected by the authorization rule. If the selected POST data equals the expected distinguished name, then a successful match will be found for the example above. If a match is found (step 1675), Access Server proceeds to step 1682 where it returns a successful authorization. Otherwise, Access Server proceeds to step

1676. If, in step 1672, it is determined that the type of POST data was not called for, then Access Server 34 proceeds directly to step 1676.

In step 1676, Access Server 34 determines whether all of the POST data received in step 1536 has been considered by step 1672. If additional POST data remains to be considered (step 1676), Access Server 34 selects the next available item of POST data (step 1678) and loops back to step 1672. If no POST data remains to be considered and a match still has not been found (step 1676), access Server 34 proceeds to step 1684 and returns an authorization failure.

Figure 44:
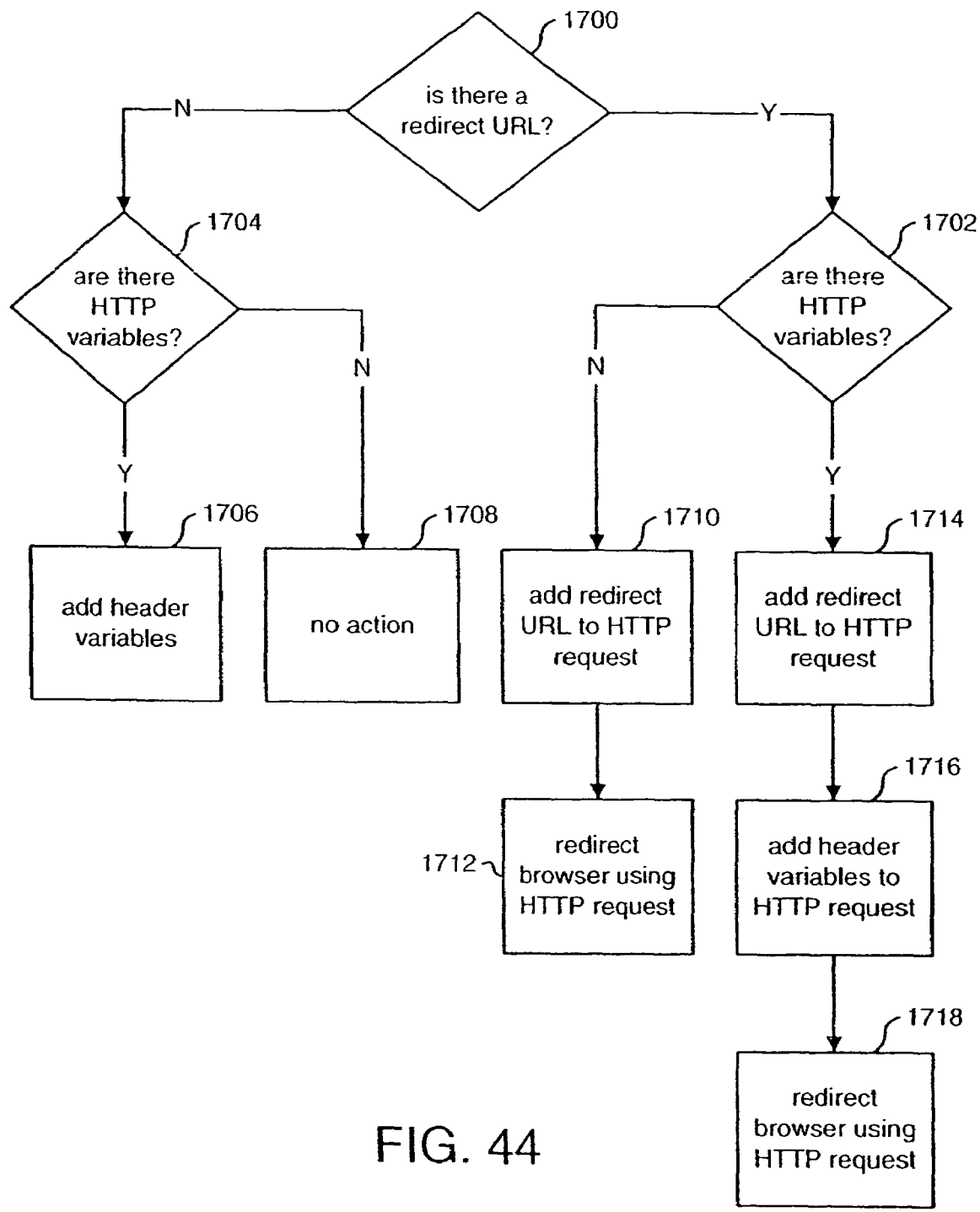
FIG. 44 is a flow chart describing a process for performing authentication success actions.

FIG. 44 is a flow chart describing the process of performing authentication success actions (step 776 of FIG. 22). In step 1700, Web Gate 28 determines whether there is a redirect URL. As described above, when setting up a policy domain or a policy, an administrator can set up a redirect URL for authentication success/failure events as well as authorization success/failure events. An administrator can also set up various variables to add to an HTTP request based on these events. If, in step 1700, it is determined that a redirect URL exists for an authentication success event, then in step 1702 it is determined whether there are any HTTP variables to add to the HTTP request. If it was determined in step 1700 that there was not a redirect URL, then in step 1704, it is determined whether there are any HTTP variables to add to the request. If, in step 1704, it is determined that there are HTTP variables to add to the request in response to the authentication success event, then in step 1706, the header variables are added. If, in step 1704, it is determined that there are no HTTP variables to add to the request, then no action is performed (step 1708). If, in step 1702, it is determined that there are no HTTP variables to add to the request, then in step 1710 the redirect URL is added to the HTTP request and browser 12 is redirected using the HTTP request in step 1712. If in step 1702 it is determined that there are HTTP variables to add to the request, then in step 1714 the redirect URL is added to the HTTP request and, in step 1716, the header variables are added to the HTTP request. In step 1718, the browser is redirected using the newly constructed HTTP request.

When a Web Server receives an HTTP request, the Web Server stores the contents of the HTTP request in a data structure on the Web Server. A Web Gate can edit that data structure using an API for the Web Server. In one embodiment, the downstream application that will be using the header variables is on, accessed using or associated with the same Web Server storing the HTTP request. In that case, the header variable are added (e.g. in step 1706) by storing the header variables in the data structure on the Web Server. Subsequently, the Web Server will provide the header variables to the downstream application.

Figure 45:
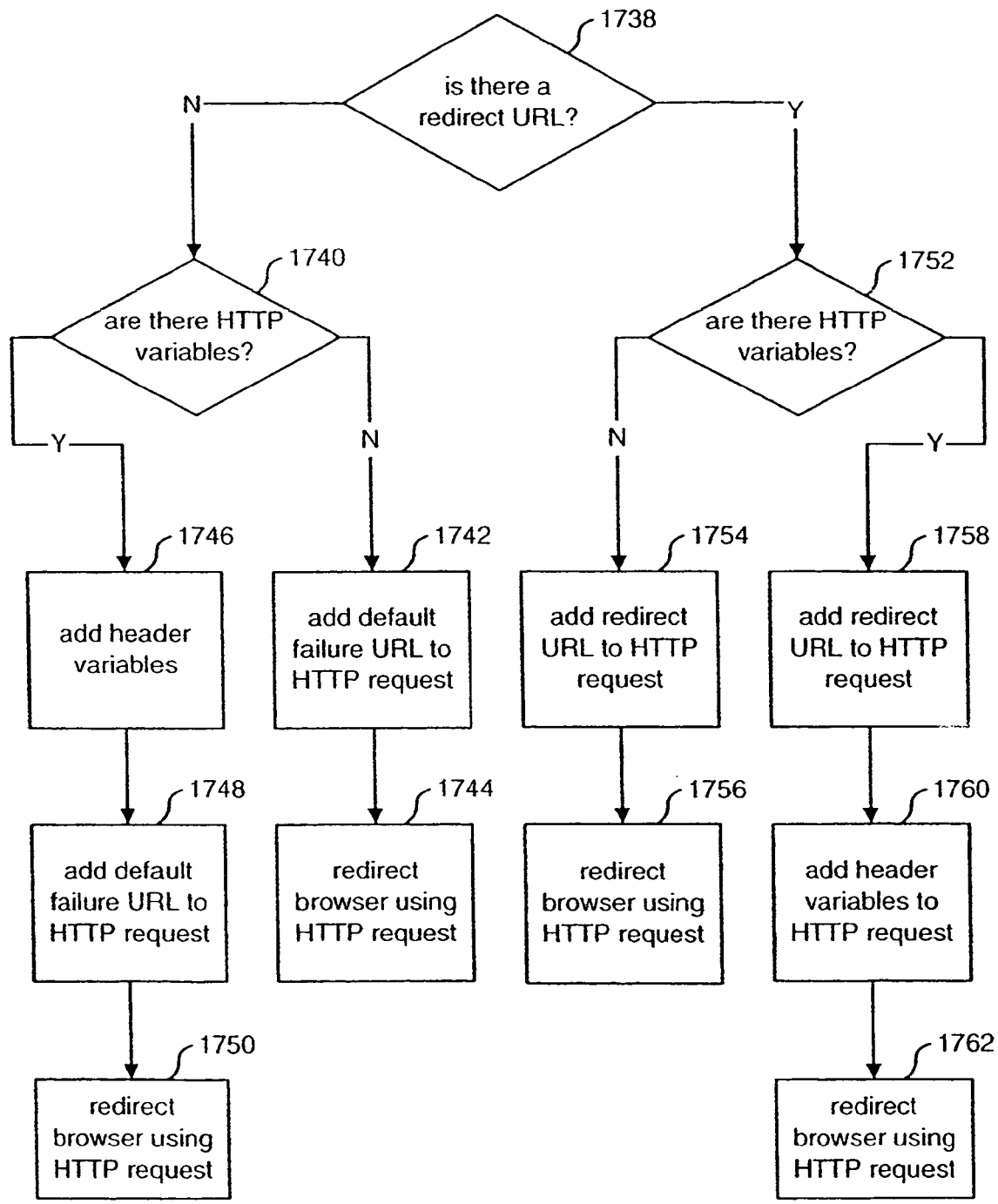
FIG. 45 is a flow chart describing a process for performing authentication and authorization failure actions.

FIG. 45 is a flow chart describing the steps of performing authentication and authorization failure actions (see steps 766 and 798 of FIG. 22, respectively). In step 1738, Web Gate determines whether there is a redirect URL for the authorization failure or authentication failure, whichever event is being considered. If there is no redirect URL, then in step 1740, it is determined whether there are any HTTP variables for the authorization failure or authentication failure. If there are no HTTP variables, then in step 1742, a default failure URL is added to a new HTTP request. The default failure URL is a URL that points to a web page that notifies a user that access is denied to the resource. In other embodiments, other pages can be used as default failure pages. In step 1744, the user's browser 12 is redirected using the HTTP request that includes the default failure URL. If, in step 1740, it is determined that there are HTTP variables to add to the HTTP request for the particular authentication failure or authorization failure event, then in step 1746, those variables are added as header variables to the HTTP request. In step 1748, the default failure URL is added to the HTTP request. The user's browser is redirected using the HTTP request in step 1750.

If, in step 1738, it is determined that there is a redirect URL for the particular authentication failure or authorization failure event, then it is determined whether there are any HTTP variables for this particular action in step 1752. If not, the redirect URL is added to the HTTP request in step 1754 and the browser is redirected using the HTTP request in step 1756. If, in step 1752 it is determined that there are HTTP variables to add to the request, then in step 1758, the redirect URL is added to the HTTP request. In step 1760, the header variables are added to the HTTP request. The user's browser is then redirected using the HTTP request in step 1762.

Figure 46:
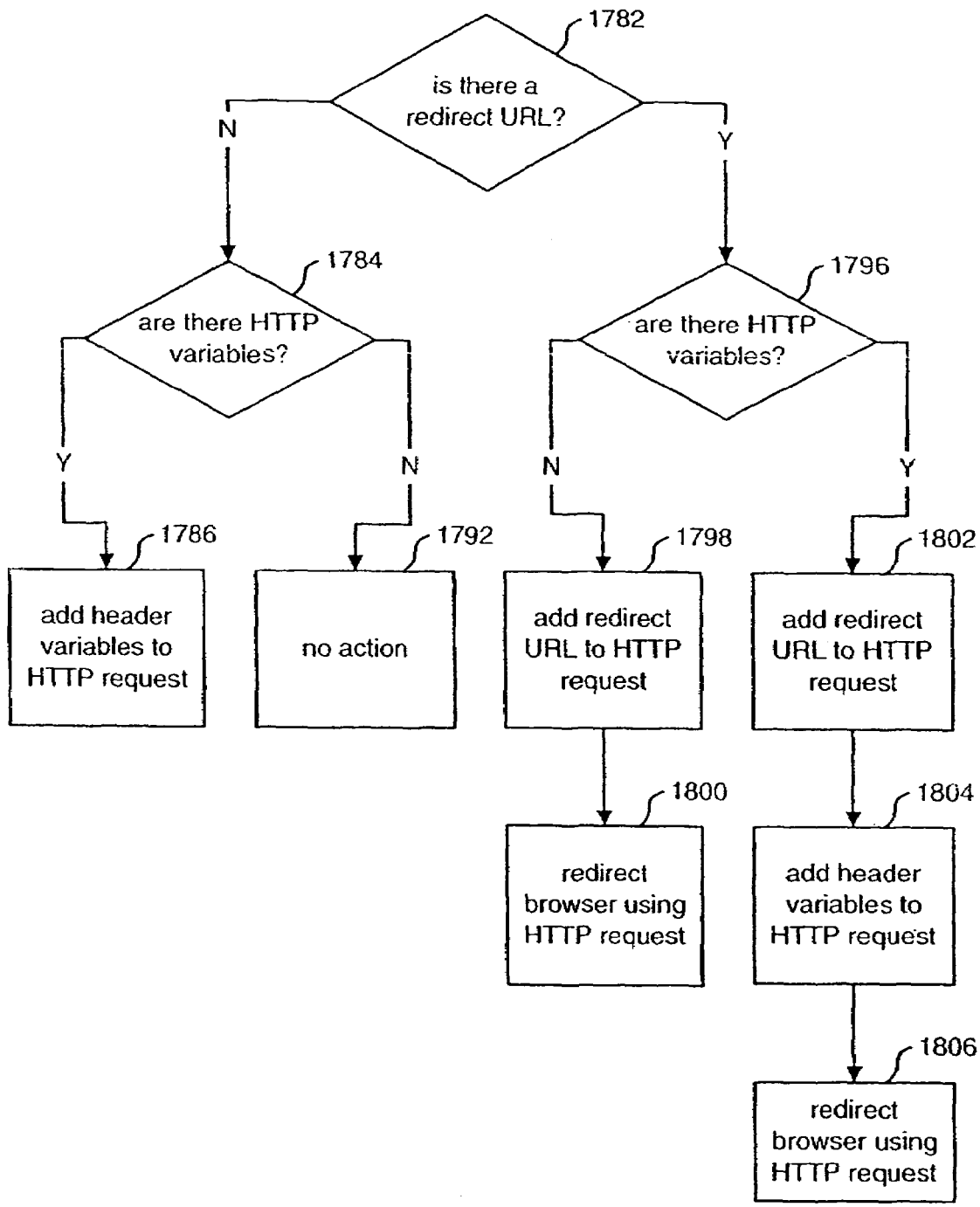
FIG. 46 is a flow chart describing a process for performing authorization success actions.

FIG. 46 is a flow chart describing the process of performing authorization success actions (step 794 of FIG. 22). In step 1782, it is determined whether there is a redirect URL for the authorization success action. If there is no redirect URL, then in step 1784 it is determined whether there are any HTTP header variables to add. If so, the header variables are added in step 1786. For example, the header variables can be added to the data structure for the request that is stored on the Web Server. Subsequently, the Web Server will provide the header variables to the downstream application(s). If, in step 1784 it is determined that there are no HTTP variables to add to the request, then no action is taken.

If it is determined in step 1782 that there is a redirect URL, then in step 1796, it is determined whether there are any HTTP variables to add to the request. If there are not any HTTP variables to add to the request, then the redirect URL is added to the HTTP request in step 1798. In step 1800, the user's browser is redirected using the HTTP request with the redirect URL. If it is determined that there are HTTP variables to add to the request in step 1796, then the redirect URL is added to the HTTP request in step 1802. In step 1804, the HTTP variables are added as header variables to the HTTP request. In step 1806, the user's browser is redirected using the HTTP request.

Figure 47:
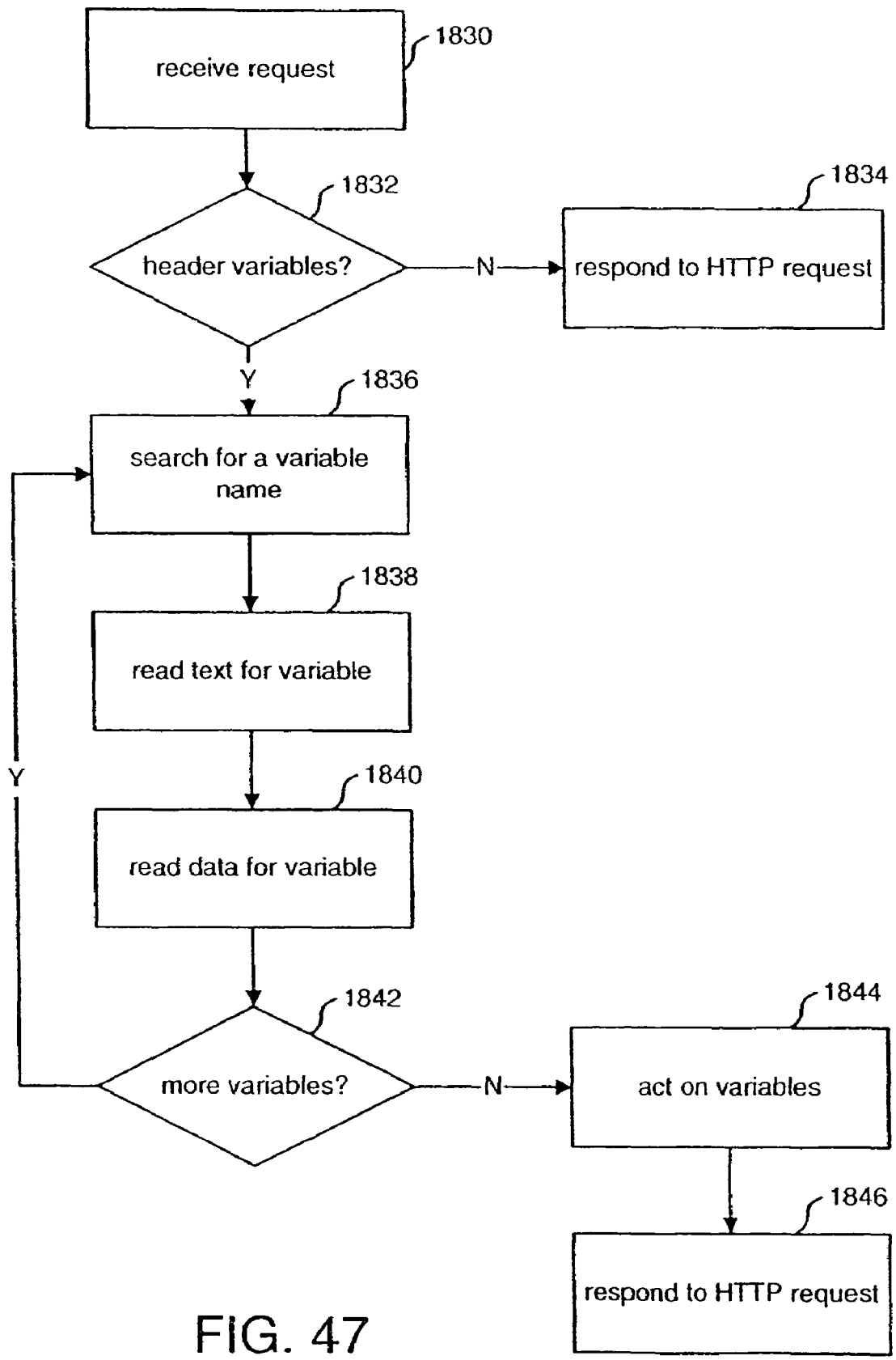
FIG. 47 is a flow chart describing a process for using header variables.

FIG. 47 is a flow chart describing the process of how a downstream application or other resource uses header variables provided by the system of FIG. 1. Upon authorization success, authorization failure, authentication success or authentication failure, various data can be added as header variables. In step 1830, the resource receives the request. In one embodiment, the resource receives request information from a Web Server. In another embodiment, the resource receives a redirected HTTP request. In step 1832, the resource determines whether there are any header variables to consider. If there are no header variables, then in step 1834, the resource responds to the request. Responding to the request can include providing a web page, access to a software process or anything else appropriate for the particular resource. If, in step 1832, it is determined that there are header variables, then in step 1836 the resource searches for a particular variable name. In order to use header variables, the resource must be preprogrammed to know what header variables to expect and how to use them. Thus, the resource will have a list of variable names it seeks. In step 1836, the resource looks for one of the listed variable names in the set of header variables. Once found, the resource reads the string for the found variable in step 1838. In step 1840, the resource reads the variable value (e.g. LDAP attribute). When HTTP variables are set up in actions, a variable name, a string for the variable and data for the variable are provided. In step 1842, it is determined whether any variables to operate on. If so, the method of FIG. 47 loops back to step 1836. If there are no more variables to operate, then in step 1844 the resource acts on the variables by taking the information from the variables and using them in the manner appropriate for the particular resource. In step 1846, the resource responds to the request as appropriate for that particular resource.

One example for using the process of FIG. 47 is to provide an automated login for a downstream application. For example, upon authentication or authorization successes, login information for a particular user and a particular application can be added to the HTTP request as header variables. The downstream application can be programmed to search the header variables for the login and password information and automatically attempt to authorize the user. In another example, user identity profile information is passed to a downstream application without the user accessing the application directly. This user identity profile information would be stored in header variables and provided to the resource being accessed. Thus, the resource being accessed can be fully customized for the user accessing the resource. For example, the resource can address the user by name and title and access preferences for that user. There are an unlimited number of resources that can be accessed by a user and, thus, unlimited ways to use the information contained in header variables.

As discussed above, the Access System monitors and logs various events, including authorization and authentication failure/success events. In other embodiments, other events can be monitored and logged. When an event being monitored occurs, an entry is added to an appropriate audit log. For purposes of the present invention, the terms log and log entry are used broadly because no special format is necessary for the present invention. A log can include any reasonable and organized system for storing information.

Figure 48:
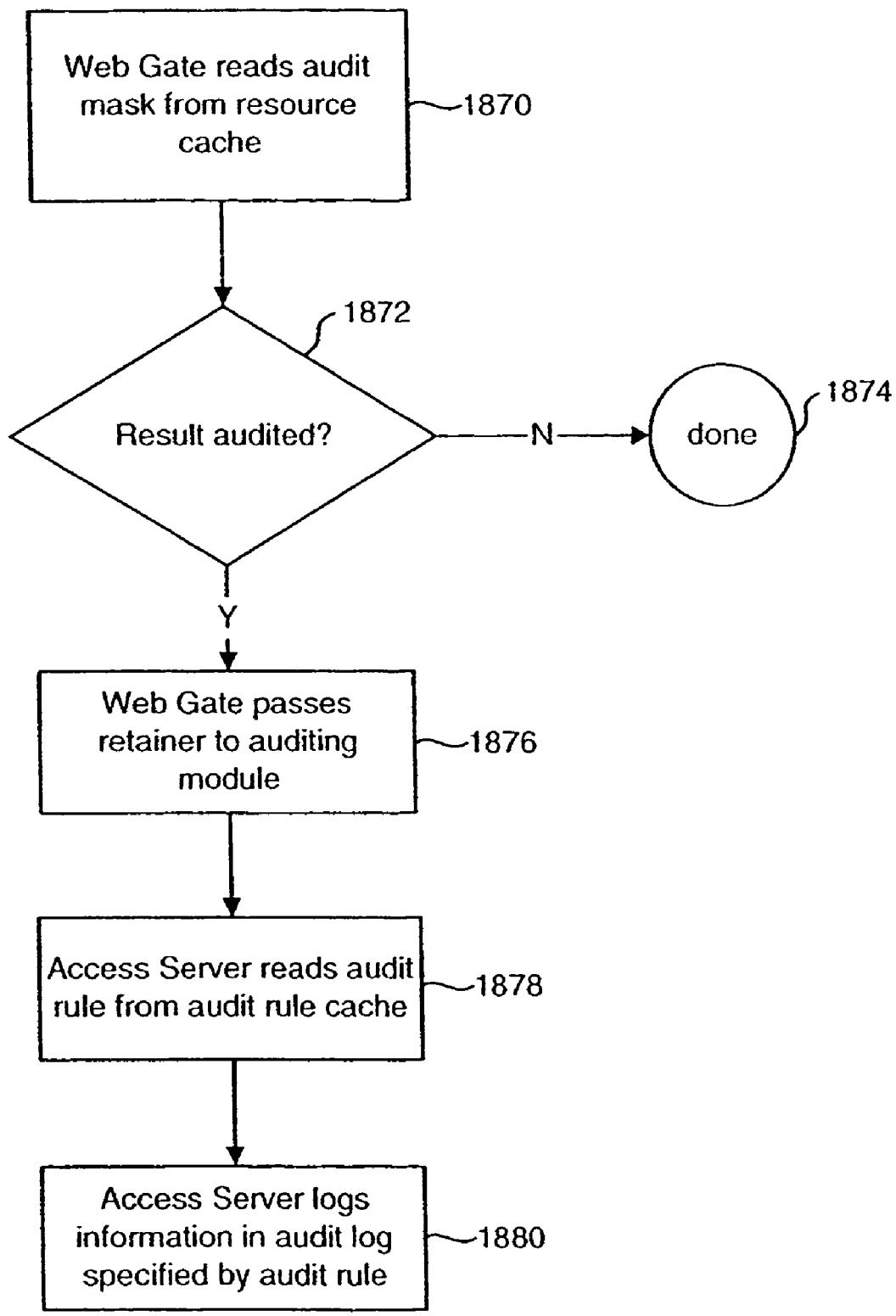
FIG. 48 is a flow chart describing the steps performed by the auditing module of one embodiment of the present invention.

FIG. 48 provides a flow chart detailing the steps performed for logging authentication and/or authorization events (see steps 764, 774, 792, and 796 of FIG. 22). In one embodiment, the steps of FIG. 48 are performed by Web Gate 28 and auditing module 544. The log process is configurable because the audit rule associated with a requested resource can specify any combination of information to be logged in audit logs 546 in response to a detected type of event selected to be audited. For example, in one embodiment of the present invention, an audit rule associated with a requested resource can specify that all or a subset of the attributes of the identity profile for the user making the access request should be logged in one of audit logs 546 for the specific event. In another embodiment, the time of the authentication and an identification authorization event is logged in one or more of audit logs 546. An identification of the resource, the rule evaluated, the type of event, the IP (or other) address of the requesting machine, user ID, an identification of the operation being performed (e.g. GET, etc.) an identification of the Web Gate and/or access server that processed the request, user password and any other suitable information can also be logged.

Storing identity profile information, as well as the other information listed above, allows the system to provide data for load balancing, various business reports, and reports about how the system is being used. For example, knowledge of which resources are being accessed, when resources are being used and who is accessing the resources can allow an administrator to perform load balancing on the system. Reports identifying which content is being accessed the most can help a business allocate resources. Information about how various entities use the system can provide behavioral data to the host. Various other business reports and monitoring can also be useful.

The process of FIG. 48 is commenced by the detection of an access system event. In the embodiment of FIG. 22, both the attempt to authenticate (steps 760 & 762) and the attempt to authorize (steps 756 & 790) can be thought of as the detection of an access system event. Thus, the access system events of the embodiment of FIG. 22 includes authorization success, authorization failure, authentication success and authentication failure. Other access system events can also be monitored for use with the present invention. In other embodiment, detecting an access system event can utilize different means than explicitly described in FIG. 22, as long as the system has a means for knowing that an event occurred. Alternatively, an access system event can be detected using specific monitors or sensors.

In step 1870 of FIG. 48, Web Gate 28 reads audit mask 503 from resource cache 502 in response to an authentication or authorization result. If audit mask 503 indicates that the event is not audited (step 1872), then the method is done (step 1874). If the event is to be audited (step 1872), then Web Gate 28 passes retainer 505 to auditing module 544, thus identifying the applicable policy domain and/or policy for auditing. In step 1878, auditing module 544 reads the audit rule associated with the requested resource from audit rule cache 574. In one embodiment, the audit rule read in step 1878 will be a first level (default) audit rule, a second level (specific) audit rule, or a master audit rule applicable to all resources when neither a first or second level audit rule is found. In step 1880, auditing module 544 logs information specified by the found audit rule into one or more audit logs 546. In one embodiment of the present invention, Access Server 34 informs auditing module 544 of authentication and authorization events to be logged, thus, allowing auditing module 544 to perform steps 1878 and 1880 directly in response to an authentication or authorization result, rather than waiting to be prompted by Web Gate 28.

Figure 49:
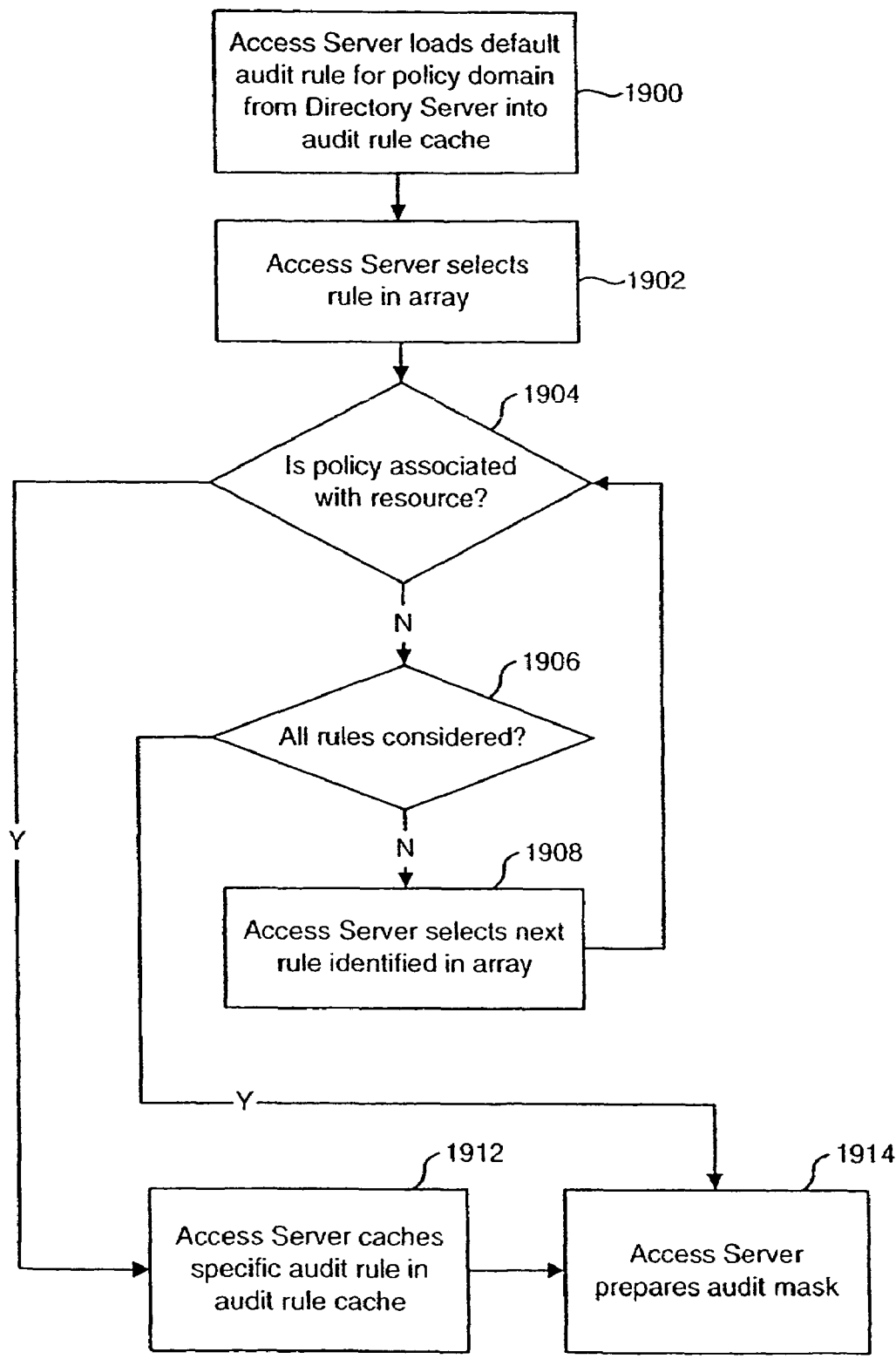
FIG. 49 is a flow chart describing a method for retrieving first and second level audit rules.

FIG. 49 provides a flow chart of a method for loading audit rules (see step 846 of FIG. 23). In step 1900, Access Server 34 loads the default audit rule for the policy domain mapped in step 836 of FIG. 23 from Directory Server 36 into audit rule cache 574. Access Server 34 then selects a rule in array 565 (step 1902) and determines whether the selected rule is a specific audit rule for a policy associated with the requested resource, by using the method of FIG. 26 previously described above (step 1904). If the resource is part of the policy, then Access Server 34 proceeds to step 1912. Otherwise, Access Server 34 determines whether all rules in array 565 have been considered (step 1906). If not, then Access Server 34 selects the next rule in array 565 (step 1908), and returns to step 1904. Once all rules in array 565 have been considered (step 1906), Access Server 34 proceeds to step 1912. If a second level authentication rule was found for the requested resource in step 1904, then authentication module 540 caches the second level audit rule in audit rule cache 574 (step 1912) and proceeds to step 1914. In step 1914, Access Server 34 prepares audit mask 503, identifying the authentication and authorization events to be logged (audited) by auditing module 544 in accordance with the second level audit rule. If a second level audit rule was not found (step 1910), then the first level audit rule previously loaded in step 1484 remains in audit rule cache 574, and Access Server 34 prepares audit mask 503 using the first level audit rule. Thus, when the method of FIG. 49 is done, only one audit rule for the requested resource will remain in audit rule cache 574.

FIG. 50 depicts one embodiment of components used to detect attempted intrusions. The attempted intrusions can be inadvertent or malicious. The goal is to detect attempted intrusions of the access system, which includes the protected resources. FIG. 50 shows audit logs 546 which can be one or more logs for logging various events. For example, there could be one log for logging authentication failure events, one log for logging authorization failure events, etc. Alternatively, there could be one log for logging multiple types of events. In one embodiment, for each log, or each type of event, an audit log sensor 548 monitors the type of event occurring. For example, in one embodiment there is an authentication failure sensor and an authorization failure sensor. If other events are monitored, there can be a sensor for each of the other events. When an authorization failure event occurs and a log entry is added to audit log 546 for the event, the authorization failure sensor will make a copy of the log entry and send it to database server 1934. Each of the audit log sensors 548 will send copies of log entries they detect to database server 1934. In one embodiment, database server 1934 includes an SQL database for storing all of the received log entries. Periodically, database server 1934 sends a set of log entries to security server 1936. In one embodiment, database server 1934 is stored within the local system of FIG. 1 and security server 1936 is located offsite. In one embodiment, database server 1934 is not provided and the various log sensors send their log entries directly to security server 1936. As discussed above, the audit log entries are fully configurable. The log entries sent by the sensors can be exact duplicates of the log entries in the audit logs or they can be reformatted versions or versions that store only a subset of the original information.

FIG. 51 provides a flow chart describing the operation of the components depicted in FIG. 50. In step 1950, an event is logged. The system is fully configurable to allow the sensors to monitor all or a subset of events being logged. The events being monitored by sensors 548 are denoted as registered events. For example, in one embodiment, the system logs all authentication failure, authentication success, authorization failure and authorization success events, while sensors 548 monitor only authentication failure and authorization failure events. In step 1952, it is determined whether the logged event is a registered event. If not, the method of FIG. 51 is done (step 1964). If it is a registered event, then in step 1954 the sensor accesses instructions for the event type. For each event type being monitored by a sensor, the system is configurable to perform any action specified by the administrator. For example, in one embodiment, an action will be to send the log entry to a database server. In another embodiment the action will also include adding information to the log entry such as information from a user identity profile, login information, time, date, etc. In step 1956, sensor 548 accesses the log entry and performs instructions for the event type to the log entry in step 1958. As discussed above, one exemplar instruction requests that the sensor sends the log entry to either database server 1934 or security server 1936. If the sensor is instructed to send the log entry to database server 1934, then database server 1934 receives and stores the log entry in step 1960. In step 1962, database server 1934 will periodically send all or a subset of the log entries to security server 1936.

FIG. 52 is a flow chart describing the operation of security server 1936. In step 1980, security server 1936 receives a log entry. Step 1980 could include receiving a particular log entry directly from a sensor 548 or receiving a set of log entries from database server 1934. In step 1982, the log entries are stored at security server 1936. In step 1984, a rules engine is run on a set of stored log entries. The log entries used in step 1984 could include the newest set of log entries and, optionally, previous log entries going back historically as needed by the rules engine. The rules engine can look for any particular pattern of events. In one embodiment, the steps of FIGS. 51 and 52 are used to detect one or more attempts of intrusion of the system. For intrusion detection, the rules engine looks for patterns over time of an entity attempting to wrongfully access resources in the system of FIG. 1. In such a case, various patterns can be detected. For example, the rules engine may look for three authorization failures for the same entity or three authentication failures with the same login name or password. Security server 1936 correlates events over time to identify persons or actions that constitute security breaches or attempted security breaches.

Figure 53:
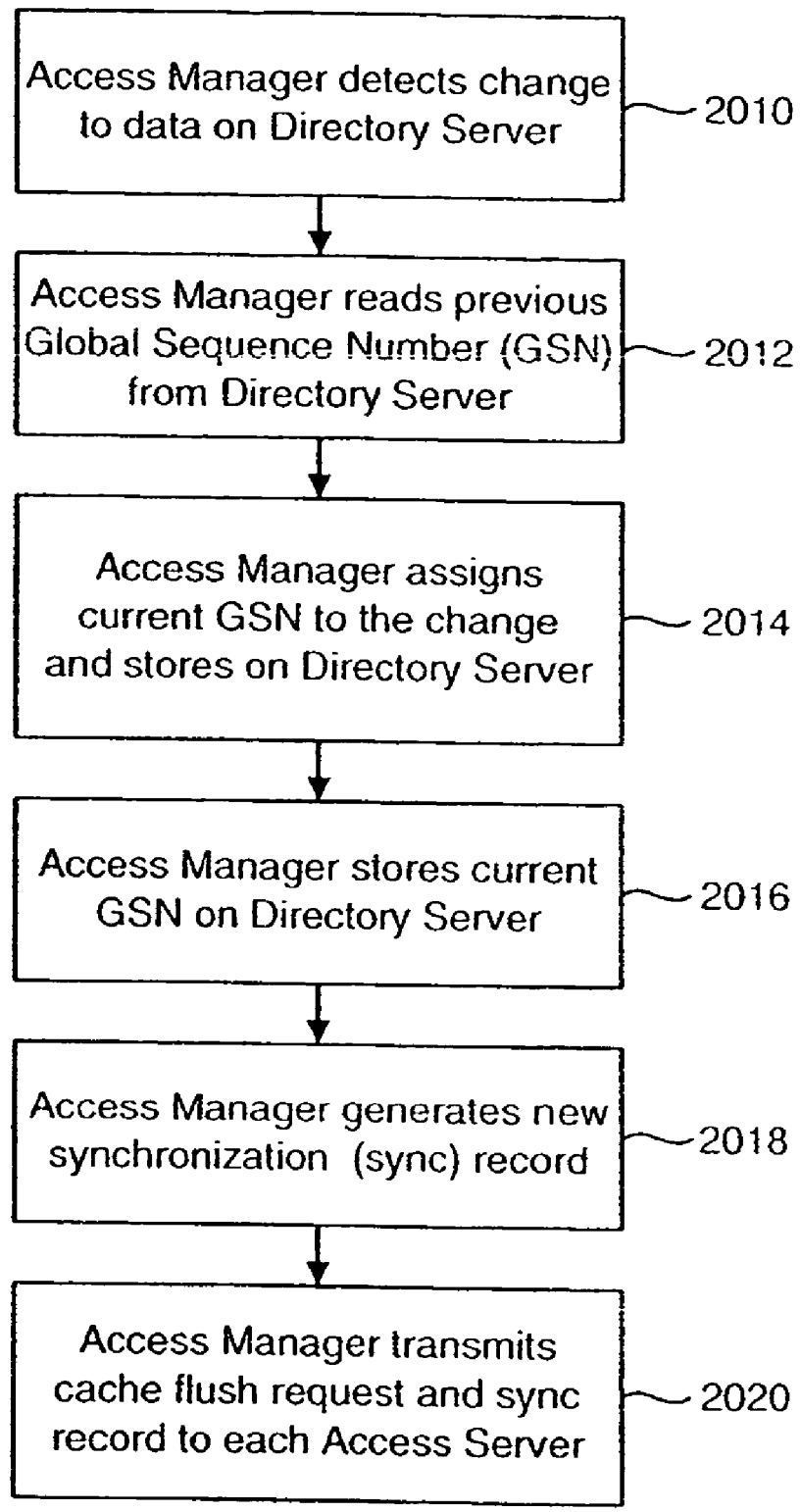
FIG. 53 is a flow chart describing a process for flushing/synchronizing caches performed by an Access Manager.

FIG. 53 provides a flow chart detailing the steps performed by Access Manager 40 for flushing and synchronizing caches of Web Gate 28 and Access Server 34 in accordance with the present invention. If a change is made (by an administrator, user, or otherwise) to a policy domain or a policy stored on Directory Server 36, any affected first level or second level rules cached in the respective caches of Web Gate 28 and Access Server 34 will become stale data. Similarly, if a change is made to user identity profiles 102 or revoked user list 108 on Directory Server 36, previously cached versions of the changed data will become stale. Accordingly, the respective caches of Web Gate 28 and Access Server 34 must be flushed to prevent Web Gate 28, Access Server 34, User Manager 38, Access Manager 40, or System Console 42 from using the stale data.

In step 2010, Access Manager 40 detects a change to data stored on Directory Server 26. In step 2012, Access Manager 40 reads the previous Global Sequence Number (GSN) 112 stored on directory server 36. In step 2014, Access Manager 40 assigns a current GSN to the change detected in step 2010. In one embodiment of the present invention, the current GSN is the next sequential number after the previous GSN 112. In step 2016, Access Manager 40 stores the current GSN on Directory Server 36, replacing the previous GSN 112. In step 2018, Access Manager 40 generates a synchronization (sync) record to facilitate cache flushing. In step 2020, Access Manager 40 passes a cache flush request and the newly generated synchronization record to each Access Server 34.

Figure 54:
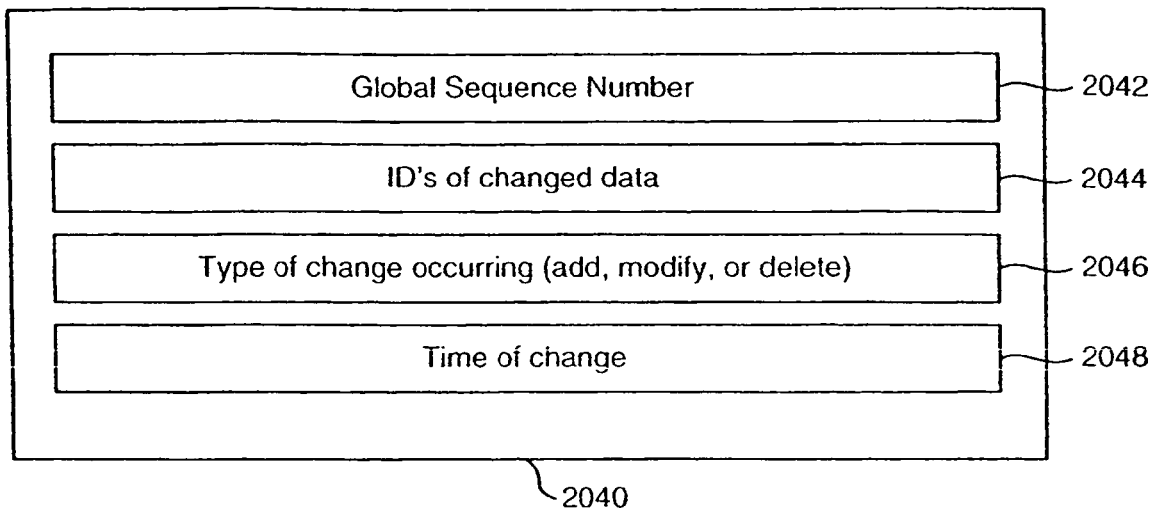
FIG. 54 is a block diagram depicting a synchronization record.

FIG. 54 provides a block diagram of a synchronization record in accordance with the present invention. Synchronization record 2040 includes the current GSN 2042 assigned to the change detected in step 2010 of FIG. 53. Synchronization record 2040 also includes IDs 2044, which identify the data affected by the detected change, such as the policy domain, first level rules, policy, second level rules, etc. Synchronization record 2040 also indicates what type of change 2046 was detected (e.g. whether it be an addition, modification, or deletion). Time 2048 is also stored, indicating the time at which the change was detected in step 2010.

Figure 55:
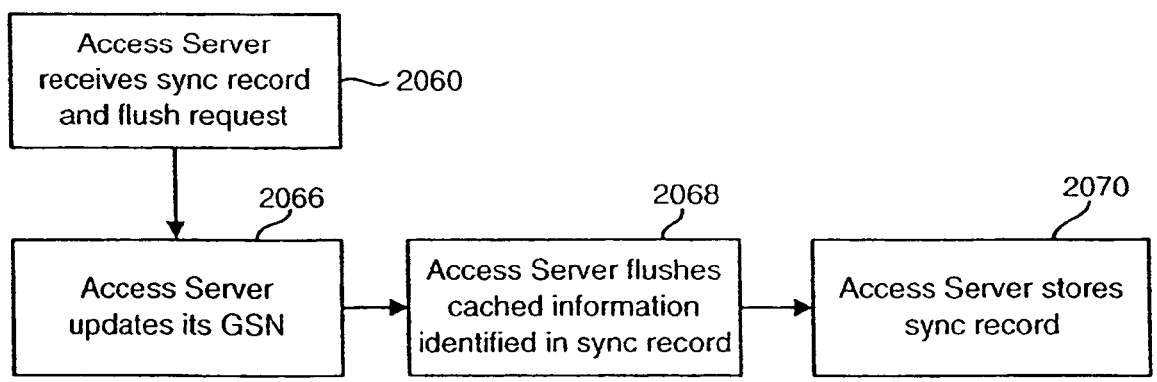
FIG. 55 is a flow chart describing a process for flushing/synchronizing caches performed by an Access Server.

FIG. 55 provides a flow chart detailing steps performed by Access Server 34 in response to receiving a synchronization record 2040 from Access Manager 40. In step 2060, Access Server 34 receives a synchronization record and flush request. Access Server 34 updates its stored GSN by replacing the stored GSN with the synchronization record GSN (step 2066). In step 2068, Access Server 34 then flushes the cached information identified by elements 2044, 2046, and 2048 of synchronization record 2040. Access Server 34 then stores synchronization record 2040 on Access Server 34 (step 2070).

Figure 56:
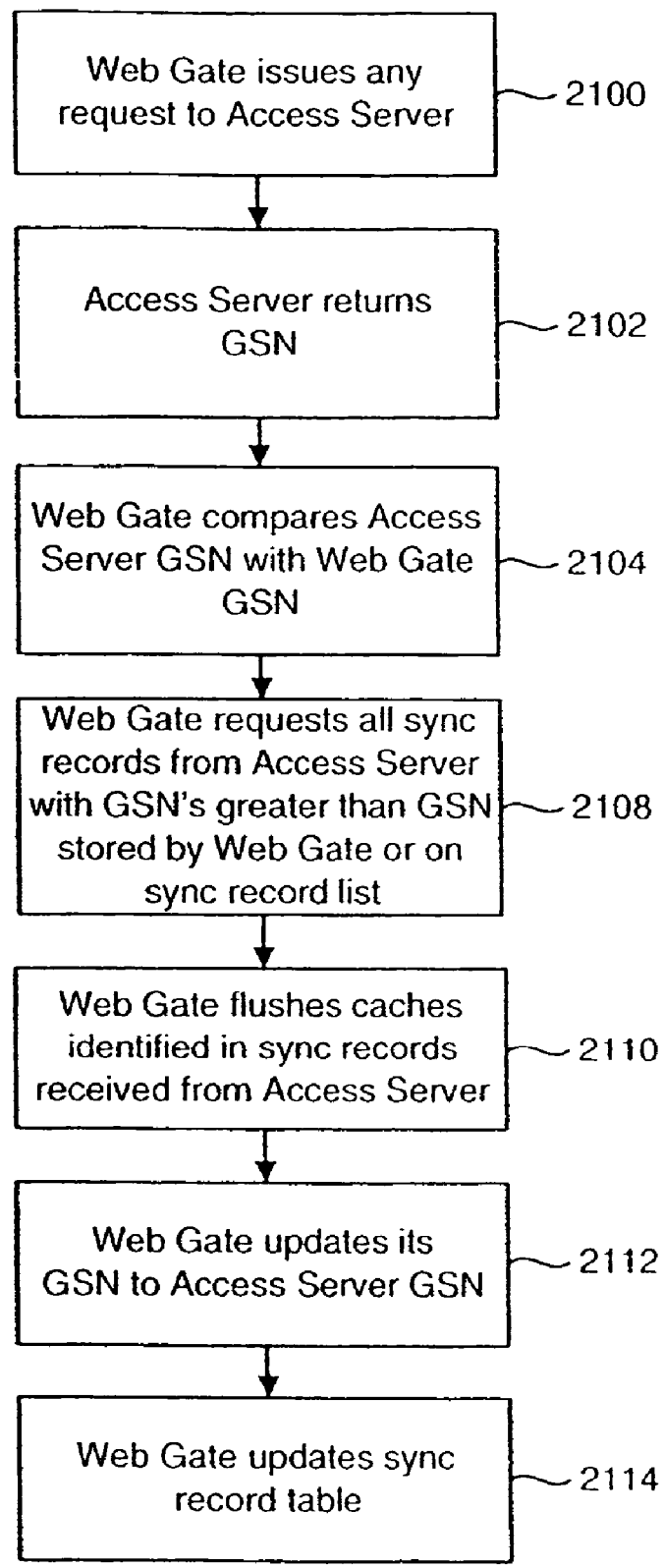
FIG. 56 is a flow chart describing a process for flushing/synchronizing caches performed by a Web Gate.

FIG. 56 provides a flow chart detailing the steps performed by Web Gate 28 for flushing and synchronizing its caches in accordance with the present invention. In step 2100, Web Gate 28 issues a request to Access Server 34. Upon serving the request, Access Server 34 returns the value of its stored GSN 554 (step 2102) to Web Gate 28. Web Gate 28 compares the GSN 544 returned in step 2102 with GSN 510 stored by Web Gate 28 (step 2104). Web Gate 28 requests all synchronization records 550 stored on Access Server 34 having GSN's greater than GSN 510 stored on Web Gate 28 or appearing in sync record table 518. Web Gate 28 flushes data having ID's 2044 (specified in synchronization record 2040 received from Access Server 34) from its caches (step 2110). In step 2112, Web Gate 28 updates its GSN 510 to equal GSN 554 stored on Access Server 34 (step 2112). In one embodiment, Web Gate 28 maintains a sync record table 518 that identifies all sync records that have not yet been processed by Web Gate 28. For example, a sync record will remain unprocessed if its transmission to Web Gate 28 from Access Server 34 is delayed. In step 2114, Web Gate 28 updates table 518 by removing entries for synchronization records processed in step 2110.

Figure 57:
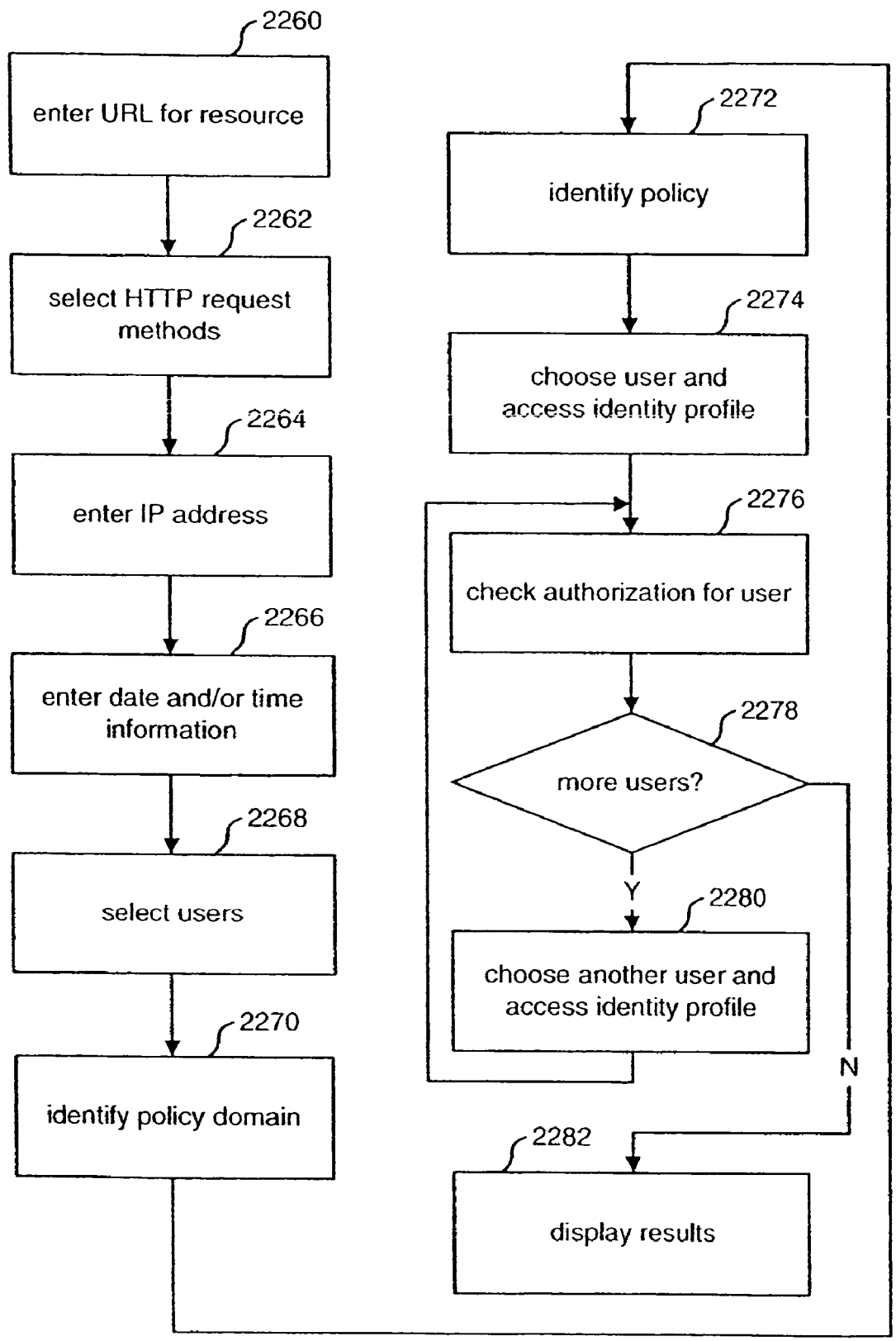
FIG. 57 is a flow chart describing a process for testing access criteria.

FIG. 57 provides a flow chart describing the process of testing access to resources using the system of FIG. 1. Access Manager 40 includes an Access Tester process. The Access Tester allows an administrator, or any other authorized user, to determine who or what entities may access a resource under the current access criteria, whether a particular individual or set of individuals have access to a resource under certain conditions and whether the first level and second level rules, policies or policy domains associated with a resource operate as intended. In one embodiment, an administrator accesses the Access Tester using a GUI on Access Server 40. In one implementation, the system tests access to a resource without actually authenticating or authorizing access to the resource. Thus, the system is testing a successfully authenticated user's access to the resource. In step 2260, the administrator enters a URL (or other identities) for a resource to be tested. In one alternative, multiple URLs can be entered so that the test is performed for multiple resources. In another alternative, the administrator can select to test for all possible resources so that the Access Tester will determine which resources are available to the users identified for the test. In step 2262, the administrator selects the HTTP request methods that the administrator wants to test. If no HTTP request methods are entered, the system will test all HTTP request methods. Protocols other than HTTP can also be used. In accordance with the present invention other protocols besides HTTP can be used. If the administrator wants to know if a particular computer can access the resource, the administrator can enter the computer's IP address in step 2264. If no IP address is entered in step 2264, then the test will not be limited to any particular computer.

In step 2266 of FIG. 57, the administrator can enter date and time restrictions. In one embodiment, the administrator can indicate that any time and day can be used so that the timing and date restrictions do not restrict the test. Alternatively, the administrator can enter a specific time and/or date for testing. The date and time information can identify a specific date and time or ranges of dates and times. As discussed above, policies can be configured to allow certain access by users at certain times on certain dates. In step 2268, the administrator selects which users to test access for. The administrator can request testing for all possible users or subsets thereof. If the user desires to test for selected users, the administrator can identify individual users. Alternatively, the administrator can use filters, rules, or roles to identify subsets of users. Testing for all users allows an administrator to see which users have access to a particular resource. Steps 2260-2268 are information gathering steps. In one embodiment, they are performed by having an administrator enter information into Access Manager 40. In other embodiments, this information is provided to the Access Tester via a file, a software process, information exchange protocols such as XML, etc.

Steps 2270-2282 are performed by the Access Tester in order to test access to the resource in question. In step 2270, the policy domain is identified for the URL entered in step 2260 using the processes described above. In step 2272, the system searches for a policy associated with the URL in accordance with the processes described above. If more than one URL was entered in step 2260, than more than one policy or more than one policy domain may be identified. In step 2274, the Access Tester chooses one user from the set of users selected in step 2268 and the identity profile for the chosen user is accessed (optional). In step 2276, authorization is checked for that user. Step 2276 is performed in a similar manner as described above with respect to step 756 of FIG. 22, except that after it is determined whether the user is authorized, no log entry is created and the user is not actually authorized. If a policy was found in step 2272, then the authorization rules for the policy are used in step 2276. If no policy was found in step 2272, then the default authorization rules for the policy domain are used in step 2276. The information from steps 2262, 2264, and 2266, and the user's identity profile (optional) are used to determine whether the one or more applicable authorization rules are satisfied. If they are satisfied, then it is determined that the particular user is authorized to access the resource under the conditions entered in steps 2260-2268. In step 2278, it is determined whether there are more users from the set of users identified in step 2268. If there are more users, another user is chosen in step 2280 and the identity profile for that user is accessed. After step 2280, the method loops back to step 2276. If there are no more users to consider (step 2278), then the results are displayed in step 2282.

In one embodiment, the method of displaying and/or the contents of the results in step 2282 are configurable. For example, the administrator can select whether the matching policy domain, policy and/or matching rules should be displayed. One embodiment of step 2282 includes displaying a table (not shown) in a GUI listing all users. For each user, the table displays the URL in question, the request method tested, the policy domain, the policy, the authorization rules, date and time information, IP address information, and an indication of whether the user is authorized to access the resource. In one embodiment, only a configurable subset of this information is displayed. It is possible that a user may have multiple entries in the result table, for example, when the date and timing information results in access grants at some times and access denials at other times. The results table allows an administrator to determine whether the policies created for a particular resource or set of resources are appropriate. In addition, the administrator can use the Access Tester to determine whether specific users have appropriate access rights. The Access Tester quickly allows an administrator to verify authorization rules created for particular policy domains and/or policies. In alternative embodiments of step 2282, the results are reported in a file, in XML, on a printer, using voice, etc. In one embodiment, the results reported could include an indication that access is granted, access is denied, there is redirection to a different resource or it is undetermined (e.g. a custom authorization plug-in cannot be loaded).

Various alternatives to the above-described embodiments are also within the spirit of the present invention. For example, in one embodiment, the system of FIG. 1 can include a separate Identity Server which will perform many (or all) of the tasks associated with managing the Identity System. In one embodiment, such an Identity Server would include a Publisher, a User Manager, a Group Manager and an Organization Manager.

The Publisher is an application that lets a user publish LDAP-based directory information about users, reporting structures, departments, offices and other resources stored in enterprise directories. The User Manager is responsible for password management, certificate management, and delegation administration of user identity profiles. For example, the User Manager can create and delete users, roles, rights and credentials.

The Group Manager manages groups. When a company is setting up an Extranet/Internet or ASP services, the company will need to provide only certain groups of people with access to the application/resources that they are making available. The entities in a group can be determined by specifically adding a person or group, or by identifying a specific attribute or value in user identity profiles. Companies can use these methods to use roles/rights management, or to grant/deny access to the applications that they will need. The Group Manager will manage this group functionality, including supporting multiple types of groups, managing group ownership, group membership, group administration, etc.

The Organization Manager is used to manage organizations. When companies are dealing with outside partners, suppliers, or other organizations (internal or external), the companies need a way to manage those organizations including creating the entity, modifying it or deleting it. There are three fundamental data structures that are used to organize directory data in the directory server: (1) User objects for the actual information about the user; (2) group objects for collections of users; and (3) organization objects, which are containers for user, group and other organization objects. Organizations can be created and removed from the system. Additionally, organizations can be managed by a manager, self managed, or managed in a delegated fashion.

The system can also be implemented with multiple Identity Servers. Each Identity Server will have its own cache or set of caches. In one scenario, if one of the Identity Servers change it cache, it will communicate to the others to flush their cache.

Another alternative embodiment will include Public Key Infrastructure (PKI) integration. By deploying PKI, customers can issue certificates to various users. PKI is a key technology for enabling e-business and e-commerce by making transactions and interactions that are more secure between companies and across the Internet.

Another embodiment includes Pre and Post Processing (PPP). PPP server-side hooks allow customers to extend the business logic of the Identity Systems by communicating with other systems before and after an event happens in the Identity System (or Access System). Customers can hook shared libraries, Pearl scripts or any other applications that can be called from specific well defined points in the processing logic of the application. As an example, during the user creation work flow process, a customer might want to call out to another system that creates an account for a user and provides information that should be stored in the user identity profile. As part of the call out, information can be returned to the Identity System. PPP can be used to perform data validation and password management. PPP could also be used as a notification engine (e.g. when a given action occurs, send an email).

In one embodiment, the system is implemented as a three-tier architecture. This allows the Identity System to be placed behind a firewall, while the only component exposed outside the firewall (or in the DMZ) is a Web Server with a Web Pass plug-in. The Web Pass plug-in is a plug-in for the Web Server that communicates with the Identity Server. The Web Pass Plug-in is analogous to the Web Gate for the access system. This allows customers to run the system with enhanced security and provides another point to do fail over, load balance and utilize redundant servers.

In another embodiment, the system of FIG. 1 can accept input in XML format and provide output in XML format. Additionally, the system will make use of XML remote procedure calls (RPC).

In an alternative implementation, the system could attempt to validate data on input. If a user or application enters data into the system that is outside predefined constraints, the data will be rejected.

In another embodiment, Access System authentication policies and schemes can be used by third party applications through an API. For example, the API allows third party developers to create clients to perform authentication while running on application servers. Authenticated user sessions can be shared among application components, allowing creation of session tokens compatible with Access System cookies and re-creation of user sessions from session tokens imported from Web Gates or other components. In one embodiment, Java servlets, Enterprise Java Beans (EJB's), and standalone Java, C++, and C programs are supported.

In one variation, Access System authorization rules and actions can be created by third party developers through an API. In one embodiment, these custom authorization rules and actions are programmed in C code. In another embodiment, custom authorization rules and actions can reside in an Access System with preexisting authorization rules and actions.

In another embodiment, "affiliate" Web Gates are installed on remote Web Servers to provide single sign-on authentication across multiple organizations. The affiliate Web Gates can access Web Gates of the Access System, but cannot directly communicate with Access Server 34. For example, a first company may maintain a web site protected by an Access System in accordance with the present invention. If the first company agrees to allow customers of a second company to access a subset of resources on the first company's web site, an affiliate Web Gate will be installed on the second company's web server. When a customer of the second company requests resources from this subset, the affiliate Web Gate will request a Web Gate of the Access System to authenticate the customer. The Access System Web Gate will return a successful or unsuccessful authentication result to the affiliate Web Gate.

FIG. 4, above, shows a hierarchical directory structure. Other data structures can also be used. One example of a suitable alternative is a flat data structure that does not include a hierarchy. Another suitable example includes a fat tree, which is a hierarchy that has few levels and each level is wide (a lot of nodes). One additional feature that can be used with various data structures is the implementation of a variable search base. In some embodiments, a user can access the entire hierarchy, subject to access rules and localized access filters. In other embodiments, users will be limited to only accessing portions of the hierarchy. For example, the system can be set up so that users underneath a particular node in the hierarchy can only access other nodes below that particular node. This restriction on access is done before applying any access criteria and localized access filters, and can be thought of as restricting the search base. In effect, the top root of the hierarchy can then vary on a per user or group basis.

Another alternative embodiment for the Identity System is allow the flow of managing user identity profiles to be configurable so that they can match the procedures of the company or entity.

Policy domain information and policy information can be stored with a resource, with a resource's information in the directory server or in a location on the directory server (or elsewhere) for storing sets of policy domain information and policy information. Additionally, the above described system can work with one directory server or multiple directory servers.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for flushing cache memories in an Access System, comprising the steps of:
   detecting, at an administrative server, a change to authorization data residing on an LDAP directory server, said change caused by an administrator or user having some delegated administrator authority, using a graphical user interface, said authorization data used to determine whether another user is authorized to access said resource;
   assigning a first global sequence number to said detected change;
   transmitting a synchronization record to an Access Server of said system, said synchronization record identifying said changed authorization data;
   flushing only said authorization data identified by a previous synchronization record from a cache of said Access Server;
   storing said first global sequence number in said Access Server;
   storing said synchronization record in said Access Server;
   transmitting said first global sequence number from said Access Server to a component of said system, said component storing a second global sequence number, said component comprising a Web gateway;
   comparing said first global sequence number to said second global sequence number;
   requesting all synchronization records comprising global sequence numbers generated after said second global sequence number;
   requesting all synchronization records identified by a list of synchronization records stored by said component;
   transmitting synchronization records to said component;
   flushing from a cache of said component all data identified by said synchronization records transmitted to said component; and
   storing said first global sequence number in said component.

2. A method for flushing cache memories in a network-based system, the method comprising:
   providing a graphical user interface for an administrator or user having some delegated administrator authority to modify authorization data, said authorization data residing on a directory server and used for determining if a user has authorization to a resource;
   receiving, via the graphical user interface, a change to said authorization data;
   detecting at an administration server for said system said change to said authorization data;
   an administration server transmitting a synchronization record to an Access Server of said system, said synchronization record identifying said changed authorization data, wherein said Access Server determines whether said user has permission to access said resource, when said user accesses said resource;
   comparing said synchronization record with a previous synchronization record identifying said authorization data; and
   flushing only said authorization data identified in said previous synchronization record from a cache of said Access server.

3. The method of claim 2, wherein said authorization data comprises access rules.

4. The method of claim 2, further comprising:
   assigning a first global sequence number to said detected change in authorization data; and
   storing said first global sequence number in said Access Server.

5. The method of claim 4, further comprising:
   a component receiving from said Access server a second synchronization record having said first global sequence number;
   comparing said first global sequence number to a second global sequence number stored by said component;
   requesting all synchronization records comprising global sequence numbers generated after said second global sequence number; and
   flushing from said caches of said component all data identified by said synchronization records transmitted to said component.

6. The method of claim 5, said method further comprising the steps of:
   requesting all synchronization records identified by a list of synchronization records stored by said component; and
   removing said transmitted synchronization records from said list.

7. The method of claim 4, wherein:
   said detecting is performed by an Access Manager running on an Administration Server.

8. The method of claim 4, wherein:
   said synchronization record comprises:
   said first global sequence number;
   an identification of said changed data;
   a description of a type of said detected change; and
   a time at which said step of detecting occurred.

9. The method of claim 5, wherein: said component is a Web Server plug-in.

10. The method of claim 9, wherein: said plug-in is an NSAPI Web Server plug-in or ISAPI Web Server plug-in or Web Gateway.

11. The method of claim 2, wherein: said user is authenticated for access to said resource using said user's log-on information before determining whether said user is authorized to access said resource using a policy rule.

12. The method of claim 5, wherein: said caches of said Web gateway comprise:
   a resource cache; and
   an authentication scheme cache.

13. The method of claim 2, wherein:
   said system is an Access System.

14. The method of claim 13, wherein:
   said authorization data includes an attribute of a user identity profile.

15. The method of claim 13, wherein:
said authorization data is a default authorization rule specifying a default method for verifying said user access to resources mapped to a policy domain, said authorization data used only after said user is authenticated to said system.

16. The method of claim 13, wherein:
said authorization data is a policy authorization rule specifying a method for verifying user access to resources matched to a policy rule.

17. The method of claim 13, wherein:
said authorization data is a first level authorization rule for granting user access to resources in said Access System.

18. The method of claim 13, wherein:
said authorization data is a second level authorization rule for granting user access to a subset of resources in said Access System.

19. The method of claim 2, wherein:
said system is an Access Management System providing security for resources across one or more web servers.

20. The method of claim 19, wherein:
said authorization data includes a policy domain.

21. The method of claim 2, wherein:
said directory server is an LDAP directory server.

22. The method of claim 2, wherein:
said directory server utilizes LDAP, said system further comprising:
an Administration Server coupled to a plurality of Access Servers;
said plurality of Access Servers utilizing LDAP; and
a plurality of Web Servers running Web Server plug-ins, said plurality of Web Servers coupled to said plurality of Access Servers.

23. The method of claim 2, wherein:
said detected change is a modification to said authorization data.

24. The method of claim 2, wherein:
said detected change is a deletion of said authorization data.

25. The method of claim 2, wherein:
said detected change is an addition of said authorization data.

26. One or more processor readable storage devices having processor readable code embodied on said processor readable storage devices, said processor readable code for programming one or more processors, said processor readable code comprising:
code for detecting, at an administration server, a change to authorization data residing on a directory server, wherein said authorization data comprises a rule to access data by a user and said change to said authorization data is caused by an administrator via a graphical user interface;
code for determining at an Access Server whether said user has permission to access said resource, when said user attempts to access said resource;
code for transmitting a synchronization record to said Access server of said system from said administration server, said synchronization record identifying said changed authorization data;
code for comparing said synchronization record with a previous synchronization record identifying said authorization data; and
code for flushing said authorization data identified in said previous synchronization record from a cache of said Access Server.

27. One or more processor readable storage devices according to claim 26, wherein said processor readable code further comprises:
code for storing said synchronization record in said Access Server.

28. One or more processor readable storage devices according to claim 26, wherein said processor readable code further comprises:
code for assigning a first global sequence number to said detected change; and
code for storing said first global sequence number in said Access Server.

29. One or more processor readable storage devices according to claim 28, wherein said processor readable code further comprises:
code for comparing said first global sequence number to a second global sequence number stored by a component;
code for requesting all synchronization records comprising global sequence numbers generated after said second global sequence number; and
code flushing from said caches of said component all changed authorization data identified by said synchronization records transmitted to said component.

30. One or more processor readable storage devices according to claim 29, wherein said processor readable code further comprises:
code for requesting all synchronization records identified by a list of synchronization records stored by said component; and
code for removing said transmitted synchronization records from said list.

31. An apparatus, comprising:
a communication interface;
one or more storage devices; and
one or more processors in communication with said one or more storage devices and said communication interface, said one or more storage devices comprising processor readable code for programming said one or more processors, said processor readable code comprising:
code for detecting a change to authorization data residing on a directory server, wherein said authorization data comprises a rule to access data by a user and said change to said authorization data is caused by an administrator or user having some delegated administrator authority via a graphical user interface;
code for transmitting a synchronization record from an administration server to an Access Server of said system, said synchronization record identifying said authorization data;
code for comparing said synchronization record with a previous synchronization record identifying said authorization data; and
code for flushing said authorization data identified in said previous synchronization record from a cache of said Access Server.

32. An apparatus according to claim 31, wherein said processor readable code further comprises:
code for authenticating said user by using said user's log-on information before determining if said user is authorized to access said resource.

33. An apparatus according to claim 31, wherein said processor readable code further comprises:
code for assigning a first global sequence number to said detected change; and
code for storing said first global sequence number in a Web Gateway component.

34. An apparatus according to claim 33, wherein said processor readable code further comprises:
  code for comparing said first global sequence number to a second global sequence number stored by said component;
  code for requesting all synchronization records comprising global sequence numbers generated after said second global sequence number; and
  code for flushing from said caches of said component all changed data identified by said synchronization records transmitted to said component.

35. An apparatus according to claim 34, wherein said processor readable code further comprises:
  code for requesting all synchronization records identified by a list of synchronization records stored by said component; and
  code for removing said transmitted synchronization records from said list.

36. A system, comprising:
  a web server comprising a component;
  a directory server in communication with the web server;
  an Access Server in communication with the web server and the directory server; and
  an administration server in communication with the Access Server and the directory server, wherein the administration server comprises computer readable code executable by the administration server, the computer readable code comprising:
    code for detecting a change to access rule data residing on the directory server; and
    code for transmitting a synchronization record for reception by the Access Server, wherein the synchronization record identifies a set of data to be flushed from a cache at the Access Server;
    code for comparing said synchronization record with a previous synchronization record identifying said authorization data;
  wherein the Access Server causes the component to flush from one or more caches of the component the set of data identified in the previous synchronization record.

37. The system recited by claim 36, wherein the component is a web server plug in.

* * * * *

UNITED STATES PATENT AND TRADEMARK OFFICE
CERTIFICATE OF CORRECTION

PATENT NO. : 7,398,311 B2
APPLICATION NO. : 11/542311
DATED : July 8, 2008
INVENTOR(S) : Joshi et al.

It is certified that error appears in the above-identified patent and that said Letters Patent is hereby corrected as shown below:

On page 3, in column 1, under "U.S. Patent Documents", line 16, delete "Zhang et al." and insert -- Pham et al. --, therefor.

On page 3, in column 2, under "Other Publications", line 40, delete "Wirsless" and insert -- Wireless --, therefor.

On sheet 4 of 46, in Figure 4, Ref. Numeral 130, line 1, delete "enity" and insert -- entity --, therefor.

On sheet 6 of 46, in Figure 7, Ref. Numeral 268, line 1, after "localized" insert -- access --.

In column 5, line 22, delete "hierarchly" and insert -- hierarchically --, therefor.

In column 15, line 24, delete "In" and insert -- in --, therefor.

In column 21, line 17, delete "X509" and insert -- X.509 --, therefor.

In column 21, line 47, delete "fist" and insert -- first --, therefor.

In column 25, line 59, after ")))" insert -- . --.

In column 30, line 49, delete "11134)," and insert -- 1134), --, therefor.

In column 37, line 10, delete "access" and insert -- Access --, therefor.

UNITED STATES PATENT AND TRADEMARK OFFICE
CERTIFICATE OF CORRECTION

PATENT NO.        : 7,398,311 B2
APPLICATION NO.   : 11/542311
DATED             : July 8, 2008
INVENTOR(S)       : Joshi et al.

It is certified that error appears in the above-identified patent and that said Letters Patent is hereby corrected as shown below:

In column 39, line 54, delete "access server" and insert -- Access Server --, therefor.

Signed and Sealed this

Third Day of November, 2009

David J. Kappos
*Director of the United States Patent and Trademark Office*